(12) United States Patent
Chakraborty et al.

(10) Patent No.: US 12,483,278 B2
(45) Date of Patent: Nov. 25, 2025

(54) SPUR AND IMAGE SUPPRESSION IN A RADIO FREQUENCY SIGNAL GENERATOR

(71) Applicant: International Business Machines Corporation, Armonk, NY (US)

(72) Inventors: Sudipto Chakraborty, Plano, TX (US); Pat Rosno, Rochester, MN (US); John Francis Bulzacchelli, Somers, NY (US); Daniel Ramirez, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 17/987,077

(22) Filed: Nov. 15, 2022

(65) Prior Publication Data
US 2024/0162921 A1    May 16, 2024

(51) Int. Cl.
*H04B 1/00*    (2006.01)
*H04B 1/04*    (2006.01)
(Continued)

(52) U.S. Cl.
CPC ......... *H04B 1/0028* (2013.01); *H04B 1/0483* (2013.01); *H04B 1/12* (2013.01); *H04B 17/11* (2015.01)

(58) Field of Classification Search
CPC ...... H04B 17/14; H04B 17/19; H04B 17/104; H04B 1/40; H04B 1/30; H04B 1/0475;
(Continued)

(56) References Cited

U.S. PATENT DOCUMENTS 6,421,397 B1    7/2002  McVey
7,280,805 B2   10/2007  Xu et al.
(Continued)

FOREIGN PATENT DOCUMENTS

EP    1703633 A2    9/2006
EP    2779472 A2    9/2014

OTHER PUBLICATIONS

T. Sato et al., "A 5 GByte/s Data-Transfer Scheme with Bit-to-Bit Skew Control for Sychronous DRAM," IEEE Journal of Solid-State Circuits, May 1999, pp. 653-660, vol. 34, No. 5.
(Continued)

*Primary Examiner* — Golam Sorowar
(74) *Attorney, Agent, or Firm* — Erik Johnson; Ryan, Mason & Lewis, LLP

(57) ABSTRACT

A device comprises a radio frequency (RF) signal generator and a calibration system. The RF signal generator is configured to upconvert a baseband signal to an RF signal using first and second LO signals. The RF signal generator comprises first and second signal paths to process first and second differential signals. The calibration system comprises calibration control circuitry and actuator circuitry. In response to digital control signals generated by the calibration control circuitry, the actuator circuitry is configured to: inject currents into the first and second signal paths to adjust offsets of the first and second differential signals, and to balance amplitudes of the first and second differential signals; and adjust at least one of respective duty cycles of the first and second local oscillator signals, and a phase difference between the first and second local oscillator signals.

20 Claims, 17 Drawing Sheets

(51) Int. Cl.
    *H04B 1/12*           (2006.01)
    *H04B 17/11*         (2015.01)

(58) Field of Classification Search
    CPC ...... H04B 1/28; H04B 1/1027; H04B 1/0003; H04B 1/406; H04B 15/02; H04B 15/04; H04B 17/20; H04B 2215/064; H04B 1/0483; H04B 1/707; H04B 1/713; H04B 17/101; H04B 1/0458; H04B 1/16
    See application file for complete search history.

(56) References Cited

U.S. PATENT DOCUMENTS

| | | | |
|---|---|---|---|
| 7,346,313 | B2 | 3/2008 | Cafarella |
| 7,436,253 | B2 | 10/2008 | Zolfaghari |
| 7,734,261 | B2 | 6/2010 | Bury |
| 7,995,982 | B2 | 8/2011 | Kawabe et al. |
| 8,208,530 | B2 | 6/2012 | Tan et al. |
| 9,025,648 | B2 | 5/2015 | Azary |
| 9,344,302 | B2 | 5/2016 | Dhayni |
| 9,407,206 | B2 | 8/2016 | Lin et al. |
| 9,787,415 | B2 | 10/2017 | Fan et al. |
| 9,859,997 | B1 | 1/2018 | Lin et al. |
| 10,879,923 | B1 | 12/2020 | Chakraborty et al. |
| 10,958,217 | B2 | 3/2021 | D'Alessandro |
| 10,985,769 | B2 | 4/2021 | Patukuri et al. |
| 11,012,104 | B2 | 5/2021 | McLaurin et al. |
| 11,057,069 | B2 | 7/2021 | Meng |
| 11,228,478 | B1 | 1/2022 | Neofytou et al. |
| 11,277,118 | B2 | 3/2022 | Hong et al. |
| 2012/0213266 | A1* | 8/2012 | Su ............ H04B 17/21 375/226 |
| 2020/0382088 | A1 | 12/2020 | Saha |
| 2021/0367687 | A1 | 11/2021 | Nayebi et al. |
| 2022/0190848 | A1* | 6/2022 | Jiang ............ H03L 7/18 |
| 2023/0353160 | A1* | 11/2023 | Fortier ............ H03K 5/1565 |
| 2023/0421199 | A1* | 12/2023 | Reggiannini ........ H04B 1/525 |
| 2024/0106490 | A1* | 3/2024 | Mishra ............ H04B 1/44 |
| 2024/0283473 | A1* | 8/2024 | Chamas ............ H04B 1/30 |

OTHER PUBLICATIONS

Y. Yoon et al., "An Area-Efficient and Wide-Range Inter-Signal Skew Compensation Scheme With the Embedded Bypass Control Register Operating as a Binary Search Algorithm for DRAM Applications," IEEE Transactions on Circuits and System—II: Express Briefs, Oct. 2020, pp. 1775-1779, vol. 67, No. 10.

J. Meng et al., "I/Q Linear Phase Imbalance Estimation Technique of the Wideband Zero-IF Receiver," Electronics, Oct. 28, 2020, 14 pages, vol. 9, No. 11.

X. Peng et al., "A Blind Calibration Model for I/Q Imbalances of Wideband Zero-IF Receivers," Electronics, Nov. 6, 2020, 16 pages, vol. 9, No. 11.

S. Jayasuriya et al., "A Baseband Technique for Automated LO Leakage Suppression Achieving <−80dBm in Wideband Passive Mixer-First Receivers," Proceedings of the IEEE 2014 Custom Integrated Circuits Conference, Sep. 15-17, 2014, 4 pages.

H. Minn et al., "In-phase and Quadrature Timing Mismatch Estimation and Compensation in Millimeter-wave Communication Systems," IEEE Transactions on Wireless Communications, Jul. 2017, 15 pages, vol. 16, No. 7.

Y. Shen et al., "A Wideband IQ-Mapping Direct-Digital RF Modulator for 5G Transmitters," IEEE Journal of Solid-State Circuits, Feb. 4, 2022, 11 pages.

* cited by examiner

200

300

400

600-1

700

730

760

SPUR AND IMAGE SUPPRESSION IN A RADIO FREQUENCY SIGNAL GENERATOR

BACKGROUND

This disclosure relates generally to radio frequency (RF) signal generators and, in particular, to techniques for spur and image suppression in RF signal generators such as arbitrary waveform generator (AWG) systems. For various applications, an RF signal generator comprises a quadrature architecture in which a baseband signal is upconverted to an RF signal using a single-sideband (SSB) upconversion system which mixes quadrature local oscillator (LO) signals using quadrature baseband signals. For SSB upconversion, generating high-fidelity RF signals without LO leakage or sideband image spurs (or significantly suppressed spurs), requires a precise amplitude balance and phase balance between in-phase (I) and quadrature-phase (Q) signal components. More specifically, an amplitude and phase imbalance between the quadrature I/Q signal components can lead to degraded image rejection performance, which results in the presence of unwanted sideband spurs at the output. Moreover, a DC offset between positive and negative components in the same phase (e.g., $I^+$ and $I^-$) can result in an LO leakage spur. Measuring and calibrating I/Q imbalances is particularly important when the signal paths for I and Q channels are realized using single-ended baseband filter structures. Due to device mismatches, the single-ended filter elements may present inherent amplitude imbalances that compromise RF performance.

Conventional techniques for detecting and calibrating amplitude and phase imbalances of I/Q signals in an RF signal generator typically utilize on-chip or off-chip calibration instrumentation which is configured to perform RF measurements to analyze RF output signals that are generated by the RF signal generator. For example, a conventional on-chip calibration instrumentation implements an RF down-conversion receiver, which is disposed in a feedback path of a transmitter and configured to extract baseband signal components from the RF output signal. The on-chip calibration instrumentation compensates for imbalances that are detected in the extracted baseband signal components. In addition, conventional on-chip and off-chip calibration instrumentation can be implemented using complex spectrum analyzer systems and circuitry. The conventional calibration systems which perform RF measurements are significantly costly in terms of hardware complexity, resource usage, and area overhead needed for on-chip implementation. In addition, conventional calibration systems which perform RF measurements consume a significant amount of power, which is prohibitive at cryogenic temperatures due to the limited cooling capacity.

SUMMARY

Exemplary embodiments of the disclosure include techniques for calibrating signal currents in an RF signal generator, such as an AWG system, to suppress unwanted sideband images and spurious signals.

In an exemplary embodiment, a device comprises a radio frequency signal generator and a calibration system configured to calibrate the radio frequency signal generator. The radio frequency signal generator is configured to upconvert a baseband signal to a radio frequency signal using a first local oscillator signal and a second local oscillator signal. The radio frequency signal generator comprises a first signal path to process a first differential signal, and a second signal path to process a second differential signal. The calibration system comprises calibration control circuitry and actuator circuitry. In response to digital control signals generated by the calibration control circuitry, the actuator circuitry is configured to: inject currents into the first signal path and into the second signal path to adjust an offset of the first differential signal, to adjust an offset of the second differential signal, and to adjust amplitudes of the first differential signal and the second differential signal to balance the amplitudes; and adjust at least one of: respective duty cycles of the first local oscillator signal and the second local oscillator signal; and a phase difference between the first local oscillator signal and the second local oscillator signal.

Advantageously, the calibration system comprises low-power and small footprint calibration hardware that is configured to (i) calibrate current imbalances in the first and second signal paths (e.g., I and Q signal paths) of an RF signal generator to correct DC offsets of the first and second differential signals (e.g., a differential in-phase signal and a differential quadrature-phase signal), and correct amplitude imbalances between the first and second differential signals, and (ii) calibrate duty cycle errors and phase error of the first and second local oscillator signals (e.g., an in-phase local oscillator signal and a quadrature-phase local oscillator signal) in clock signal paths of the RF signal generator.

Another exemplary embodiment includes a system which comprises a quantum processor comprising at least one superconducting quantum bit, an arbitrary waveform generator, and a calibration system. The arbitrary waveform generator comprises at least one arbitrary waveform generator channel that is configured to utilize a first local oscillator signal and a second local oscillator signal to convert a baseband signal to a radio frequency control pulse which controls the at least one superconducting quantum bit. The at least one arbitrary waveform generator channel comprises a first signal path to process a first differential signal, and a second signal path to process a second differential signal. The first differential signal comprises a differential in-phase signal component of the baseband signal, and the second differential signal comprises a differential quadrature-phase signal component of the baseband signal. The calibration system is configured to calibrate the at least one arbitrary waveform generator channel. The calibration system comprises calibration control circuitry and actuator circuitry. In response to digital control signals generated by the calibration control circuitry, the actuator circuitry is configured to: inject currents into the first signal path and into the second signal path to adjust an offset of the first differential signal, to adjust an offset of the second differential signal, and to adjust amplitudes of the first differential signal and the second differential signal to balance the amplitudes; and adjust at least one of: respective duty cycles of the first local oscillator signal and the second local oscillator signal; and a phase difference between the first local oscillator signal and the second local oscillator signal.

In another exemplary embodiment, as may be combined with the preceding paragraphs, the actuator circuitry comprises a first plurality of digitally controllable current actuator circuits, and a second plurality of digitally controllable current actuator circuits. The first plurality of digitally controllable current actuator circuits are coupled to the first signal path and to the second signal path at least at one of (i) a first current mode interface between a baseband digital-to-analog converter stage and a baseband filter stage (ii) a second current mode interface between the baseband filter stage and a mixer stage. The first plurality of digitally controllable current actuator circuits are configured to inject the currents into the first signal path and the second signal path to adjust the offset of the first differential signal and the offset of the second differential signal. The second plurality of digitally controllable current actuator circuits are configured to adjust reference currents of the baseband digital-to-analog converter stage to balance the amplitudes of the first differential signal and the second differential signal.

In another exemplary embodiment, as may be combined with the preceding paragraphs, the actuator circuitry comprises a plurality of digitally controllable current actuator circuits which are configured to inject currents into a first local oscillator clock signal path and a second local oscillator clock signal path to adjust the duty cycles of the first local oscillator signal and the second local oscillator signal.

In another exemplary embodiment, as may be combined with the preceding paragraphs, the actuator circuitry comprises a plurality of digitally controllable segmented driver actuator circuits which are included in buffer circuitry for driving local oscillator inputs of a mixer stage with the first local oscillator signal and the second local oscillator signal. The plurality of digitally controllable segmented driver actuator circuits are selectively controlled in response to digital control signals generated by the calibration control circuitry to adjust a drive strength of the buffer circuitry and thereby adjust the phase difference between the first local oscillator signal and the second local oscillator signal.

In another exemplary embodiment, as may be combined with the preceding paragraphs, the calibration system further comprises a current measurement circuit which is configured, during a calibration process, to measure a first current and a second current in the first signal path, and to measure a first current and a second current in the second signal path. The calibration control circuitry is configured to determine a difference between the measured first current and the measured second current in the first signal path, and generate a first digital control signal based on the determined difference between the measured first current and the measured second current in the first signal path. The calibration control circuitry is configured to determine a difference between the measured first current and the measured second current in the second signal path, and generate a second digital control signal based on the determined difference between the measured first current and the measured second current in the second signal path. The calibration control circuitry is configured to determine a difference between the measured first current in the first signal path and the measured first current in the second signal path, and generate a third digital control signal based on the determined difference between the measured first current in the first signal path and the measured first current in the second signal path. In response to at least one of the first digital control signal, the second digital control signal, and the third digital control signal, the actuator circuitry generates the currents that are injected into the first signal path and the second signal path to at least one of: compensate for the determined difference between the measured first current and the measured second current in the first signal path and thereby adjust the offset of the first differential signal; compensate for the determined difference between the measured first current and the measured second current in the second signal path and thereby adjust the offset of the second differential signal; and compensate for the determined difference between the measured first current in the first signal path and the measured first current in the second signal path and thereby adjust and balance the amplitudes of the first differential signal and the second differential signal.

In another exemplary embodiment, as may be combined with the preceding paragraphs, the device and system further comprise first sensor circuitry and second sensor circuitry. The first sensor circuitry comprises low pass filter circuitry that is configured to measure the duty cycle of the first local oscillator signal and to measure the duty cycle of the second local oscillator signal and generate first sensor signals which comprise direct current voltages that are proportional to the respective measured duty cycles of the first local oscillator signal and the second local oscillator signal. The second sensor circuitry comprises exclusive-OR circuitry and low pass filter circuitry, which is configured to measure the phase difference between the first local oscillator signal and the second local oscillator signal and generate a second sensor signal which comprises a direct current voltage that is proportional to the measured phase difference. The calibration control circuitry is configured to process the first sensor signals and the second sensor signal and generate one or more digital control signals to cause the actuator circuitry to at least one of: adjust the duty cycles of the first local oscillator signal and the second local oscillator signal; and adjust the phase difference between the first local oscillator signal and the second local oscillator signal.

In another exemplary embodiment, as may be combined with the preceding paragraphs, the device and system further comprise local oscillator signal generator circuitry comprising clock receiver circuitry and divider circuitry. The clock receiver circuitry is configured to receive and buffer a differential clock signal comprising a non-inverted clock signal and an inverted clock signal, and to drive an input of the divider circuitry. The divider circuitry is configured to receive the differential clock signal output from the clock receiver circuitry and convert the differential clock signal into quadrature local oscillator signals comprising the first local oscillator signal and the second local oscillator signal. The clock receiver circuitry comprises a plurality of digitally controllable current actuator circuits which are configured to inject current into a first clock signal path to adjust a duty cycle of the non-inverted clock signal, and to inject current into a second clock signal path to adjust a duty cycle of the inverted clock signal.

In another exemplary embodiment, as may be combined with the preceding paragraphs, the device and system further comprise a first sensor comprising low pass filter circuitry which is coupled to outputs of the clock receiver circuitry and configured to measure the duty cycles of the differential clock signals and generate first sensor signals which comprise direct current voltages that are proportional to the respective measured duty cycles of the differential clock signals. The calibration control circuitry is configured to process the first sensor signals and generate digital control signals to cause the plurality of digitally controllable current actuator circuits of the clock receiver circuitry to inject currents into the first clock signal path and the second clock signal path, as needed, to adjust the duty cycles of the differential clock signals.

In another exemplary embodiment, as may be combined with the preceding paragraphs, the device and system further comprise buffer circuitry coupled to an output of the divider circuitry, and configured to drive local oscillator inputs of a mixer stage with the first local oscillator signal and the second local oscillator signal. The buffer circuitry comprises a plurality of digitally controllable segmented driver actuator circuits that are selectively controlled in response to digital control signals generated by the calibration control circuitry to adjust a phase difference between the first local oscillator signal and the second local oscillator signal to obtain substantially orthogonal phases between the first local oscillator signal and the second local oscillator signal.

Another exemplary embodiment includes a method which comprises performing a calibration process to calibrate a radio frequency signal generator which is configured to upconvert a baseband signal to a radio frequency signal using a first local oscillator signal and a second local oscillator signal, the radio frequency signal generator comprising a first signal path to process a first differential signal, and a second signal path to process a second differential signal. Performing the calibration process comprises: measuring a first current and a second current in the first signal path to determine an offset of the first differential signal based on a difference between the measured first current and the measured second current in the first signal path; measuring a first current and a second current in the second signal path to determine an offset of the second differential signal based on a difference between the measured first current and the measured second current in the second signal path; determining a difference between an amplitude of the first differential signal and an amplitude of the second differential signal based on a difference between the measured first current in the first signal path and the measured first current in the second signal path; and injecting currents into the first signal path and into the second signal path to at least one of: adjust the offset of the first differential signal; adjust the offset of the second differential signal; and balance the amplitudes of the first differential signal and the second differential signal.

In another embodiment, performing the calibration process further comprises: receiving and buffering a differential clock signal comprising a non-inverted clock signal and an inverted clock signal, wherein the differential clock signal is utilized to generate quadrature local oscillator signals comprising the first local oscillator signal and the second local oscillator signal; determining a duty cycle of the non-inverted clock signal and a duty cycle of the inverted clock signal; injecting current into a first clock signal path to adjust the duty cycle of the non-inverted clock signal; and injecting current into a second clock signal path to adjust a duty cycle of the inverted clock signal.

In another exemplary embodiment, as may be combined with the preceding paragraphs, performing the calibration process further comprises: measuring a phase difference between the first local oscillator signal and the second local oscillator signal to determine a phase error; and correcting the phase error by at least one of: injecting current into at least one of the first clock signal path and the second clock signal path to adjust the duty cycle of at least one of the non-inverted clock signal and the inverted clock signal of the differential clock signal; and adjusting a drive strength of buffer circuitry, which drives local oscillator signal inputs of a mixer stage with the first local oscillator signal and the second local oscillator signal, to adjust a phase delay of at least one of the first local oscillator signal and the second local oscillator signal and thereby adjust a phase difference between the first local oscillator signal and the second local oscillator signal to correct the phase error.

Other embodiments will be described in the following detailed description of exemplary embodiments, which is to be read in conjunction with the accompanying figures.

DETAILED DESCRIPTION

Exemplary embodiments of the disclosure will now be described in further detail with regard to systems and methods for calibrating signals in an RF signal generator system, such as an AWG system, to suppress unwanted sideband images and spurious signals. It is to be understood that the various features shown in the accompanying drawings are schematic illustrations that are not drawn to scale. Moreover, the same or similar reference numbers are used throughout the drawings to denote the same or similar features, elements, or structures, and thus, a detailed explanation of the same or similar features, elements, or structures will not be repeated for each of the drawings. Further, the term "exemplary" as used herein means "serving as an example, instance, or illustration." Any embodiment or design described herein as "exemplary" is not to be construed as preferred or advantageous over other embodiments or designs.

Further, it is to be understood that the phrase "configured to" as used in conjunction with a circuit, structure, element, component, or the like, performing one or more functions or otherwise providing some functionality, is intended to encompass embodiments wherein the circuit, structure, element, component, or the like, is implemented in hardware, software, and/or combinations thereof, and in implementations that comprise hardware, wherein the hardware may comprise discrete circuit elements (e.g., transistors, inverters, etc.), programmable elements (e.g., application specific integrated circuit (ASIC) chips, field-programmable gate array (FPGA) chips, etc.), processing devices (e.g., central processing units (CPUs), graphics processing units (GPUs), etc.), one or more integrated circuits, and/or combinations thereof. Thus, by way of example only, when a circuit, structure, element, component, etc., is defined to be configured to provide a specific functionality, it is intended to cover, but not be limited to, embodiments where the circuit, structure, element, component, etc., is comprised of elements, processing devices, and/or integrated circuits that enable it to perform the specific functionality when in an operational state (e.g., connected or otherwise deployed in a system, powered on, receiving an input, and/or producing an output), as well as cover embodiments when the circuit, structure, element, component, etc., is in a non-operational state (e.g., not connected nor otherwise deployed in a system, not powered on, not receiving an input, and/or not producing an output) or in a partial operational state.

Figure 1:
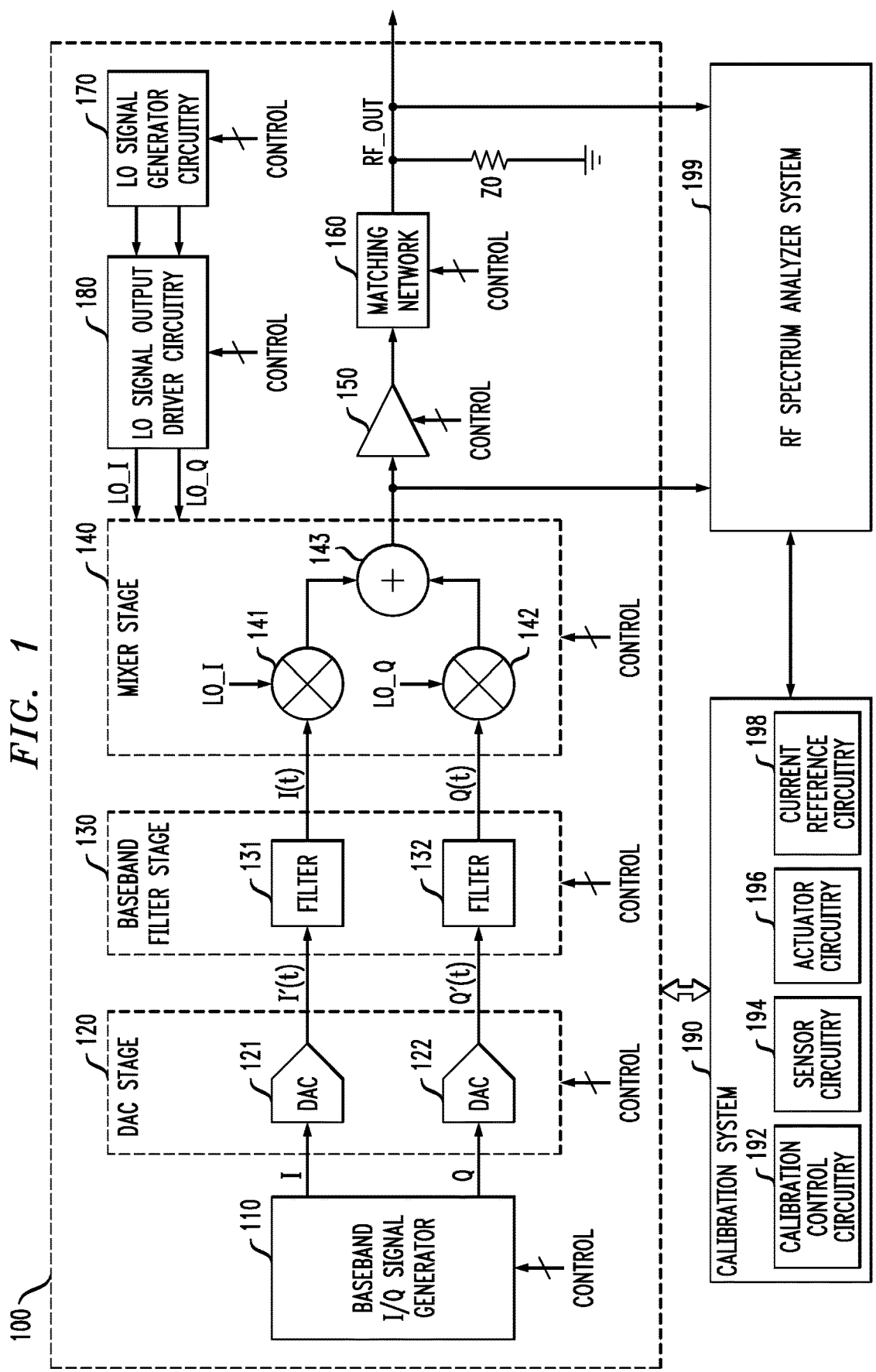
FIG. 1 schematically illustrates an RF signal generator system and a calibration system which is configured to calibrate signals in the RF signal generator system to suppress unwanted sideband image and spurious signals, according to an exemplary embodiment of the disclosure.

FIG. 1 schematically illustrates an RF signal generator system and a calibration system which is configured to calibrate signals in the RF signal generator system to suppress unwanted sideband image and spurious signals, according to an exemplary embodiment of the disclosure. In particular, FIG. 1 schematically illustrates an RF signal generator system 100 which comprises a baseband I/Q signal generator 110, a digital-to-analog converter stage 120 (or DAC stage 120), a baseband filter stage 130, a mixer stage 140, an amplifier/attenuation stage 150, an impedance matching network 160, local oscillator (LO) signal generator circuitry 170, and LO signal output driver circuitry 180, the functions of which will be explained in further detail below. A calibration system 190 comprises calibration control circuitry 192, sensor circuitry 194, actuator circuitry 196, and current reference circuitry 198, the functions of which will be explained in further detail below.

As schematically illustrated in FIG. 1, the DAC stage 120 comprises inputs that are coupled to outputs of the baseband I/Q signal generator 110. The baseband filter stage 130 comprises inputs that are coupled to outputs of the DAC stage 120. The mixer stage 140 comprises inputs that are coupled to outputs of the baseband filter stage 130. The amplifier/attenuation stage 150 comprises inputs that are coupled to outputs of the mixer stage 140, and an output that is coupled to an input of the impedance matching network 160, and an output of the impedance matching network 160 is coupled to an output node (RF_OUT) of the RF signal generator system 100. The LO signal generator circuitry 170 is configured to generate LO signals (e.g., quadrature LO signals) via the LO signal output driver circuitry 180. The LO quadrature signals at the output of the output driver circuitry 180 are utilized by the mixer stage 140 to perform upconversion of an in-phase baseband signal I(t) and a quadrature baseband signal Q(t) using an in-phase LO signal (LO_I) and a quadrature-phase LO signal (LO_Q). The LO signal output driver circuitry 180 is configured to control the input of the LO signals to the mixer stage 140 for different modes of operation of the RF signal generator system 100 (e.g., real-time operating mode, and calibration mode), as will be discussed in further detail below.

It is to be understood that the RF signal generator system 100 can be implemented for various applications. For example, in some embodiments, the RF signal generator system 100 comprises an RF transmitter for a wireless application, wherein an output of the RF signal generator system 100 is coupled to an antenna system which is configured to transmit an RF output signal that is generated by the RF signal generator system 100. In other embodiments, the RF signal generator system 100 comprises a waveform generator (e.g., an arbitrary waveform generator, or a function generator) in which the output of the RF signal generator system 100 is coupled to an input of a sensor device, wherein the RF output signal that is generated by the RF signal generator system 100 is configured to excite the sensor device. In other embodiments, the RF signal generator system 100 comprises an AWG system which is implemented for a quantum computing application, wherein the RF signal generator system 100 is configured to generate an RF control pulse for controlling the operation of, e.g., a superconducting quantum bit (qubit), an active superconducting coupler circuit which couples two superconducting qubits, or other superconducting quantum devices, etc.

In the context of the exemplary embodiments discussed herein, an RF signal comprises a signal which has a frequency ranging from, e.g., about 20 kHz to about 300 GHz. In some embodiments, the RF signal generator system 100 comprises an analog quadrature system that is configured to generate quadrature (I/Q) signals (e.g., baseband I/Q signals and LO I/Q signals) and perform quadrature modulation (or I/Q signal modulation) to generate RF signals for a given application. As is known in the art, a quadrature signal comprises an in-phase (I) signal component, and a quadrature-phase (Q) signal component. A pair of signals that are in quadrature have the same frequency but differ in phase by 90 degrees. For example, by convention, the I signal is cosine waveform, and the Q signal is a sine waveform. For illustrative purposes, exemplary embodiments of the disclosure will be described in the context of quadrature RF signal generator systems, although the exemplary signal processing circuitry and methods as discussed herein can be implemented with other types of RF signal generator systems and modulation techniques.

In the exemplary embodiment of FIG. 1, the baseband I/Q signal generator 110 is configured to generate digital quadrature signals I and Q which represent input baseband data for a given application. For example, for quantum computing applications, the baseband I/Q signal generator 110 is configured to implement pulse-shaping techniques to generate RF control pulses with desired envelope shapes (e.g., Gaussian pulses, cosine pulses (e.g., sum of half cosines), hyperbolic secant pulses, etc.), which are applied to superconducting qubits or active qubit coupler circuits to perform single qubit gate operations, entanglement gate operations, etc. In some embodiments, the baseband I/Q signal generator 110 implements digital signal processing techniques based on a combination of hardware and software to generate the digital quadrature baseband signals I and Q.

The DAC stage 120 is configured to convert the digital quadrature signals I and Q to analog baseband signals I'(t) and Q'(t) having a target baseband frequency. In particular, the DAC stage 120 comprises multi-bit DAC circuits including a first DAC circuit 121 (or I DAC circuit 121) and a second DAC circuit 122 (or Q DAC circuit 122). The first DAC circuit 121 is configured to convert the digital baseband component I to an analog baseband component I'(t) having a baseband frequency, and the second DAC circuit 122 is configured to convert the digital baseband component Q to an analog baseband component Q'(t) having the same baseband frequency, but phase-shifted by 90 degrees relative to I'(t). The DAC stage 120 generates and outputs the analog baseband signals I'(t) and Q'(t) at a given sampling rate ($f_S$) or sampling frequency, e.g., baseband frequencies in a range of about 100 kHz to about 1 GHz depending on the given application. In some embodiments, the first and second DAC circuits 121 and 122 implement a configurable hardware framework in which various operating parameters of the DAC stage 120 can be adjusted by digital control signals that are input to the DAC stage 120. For example, in some embodiments, the digital control can be utilized to adjust DAC operating parameters including, but not limited to, the sampling rate, full scale analog output (voltage or current), etc.

Based on the Nyquist Sampling Theorem, the highest fundamental output frequency $f_O$ signal a DAC with sampling frequency $f_S$ can generate is equal to half the sampling rate or $f_S/2$ (referred to as the first Nyquist zone). In the frequency domain, when generating a sinusoidal waveform of frequency $f_O$, the fundamental baseband frequency $f_O$ will appear as a spectral component at $f_O$, and there will be additional higher frequency components that are generated at the output of the DAC stage 120, which are referred to as "images" and which are a function of $f_S$ and $f_O$. For example, the higher frequency components are determined as $|(n \times f_S) \pm f_O|$, where n=1, 2, 3, . . . . The images have the same information content as the fundamental spectral components, but at higher frequencies and at smaller amplitudes. The unwanted images are suppressed/rejected using, e.g., the baseband filter stage 130.

The baseband filter stage 130 is configured to filter the analog baseband signals I'(t) and Q'(t) output from the DAC stage 120 and thereby generate filtered analog baseband signals I(t) and Q(t). The baseband filter stage 130 comprises a first filter circuit 131 and a second filter circuit 132. The first filter circuit 131 is configured to filter the in-phase analog signal I'(t) output from the first DAC circuit 121, and the second filter circuit 132 is configured to filter the quadrature-phase analog signal Q'(t) output from the second DAC circuit 122. In some embodiments, the first and second filter circuits 131 and 132 comprise low-pass filters that are configured to pass the fundamental spectral components of the respective analog signals I'(t) and Q'(t), while suppressing the image components of the respective analog signals I'(t) and Q'(t). In other embodiments, the first and second filter circuits 131 and 132 can be configured as bandpass filters to pass a desired band of higher frequency image components of the respective analog signals I'(t) and Q'(t), while suppressing the fundamental spectral components and other image components of the respective analog signals I'(t) and Q'(t). In other embodiments, the first and second filter circuits 131 and 132 can be configured as high-pass filters, as may be desired for a given application.

In some embodiments, the baseband filter stage 130 comprises configurable filter circuits in which, e.g., the cutoff frequencies of the first and second filter circuits 131 and 132 can be adjusted, or where the first and second filter circuits 131 and 132 can be configured to have different filter types (e.g., low-pass, band-pass, etc.) as desired for a given application. For example, in some embodiments, a bandpass filter can be configured using two low pass filters using known signal filtering techniques and architectures. In some embodiments, the filter configurations are digitally controlled by the digital control signals that are input to the baseband filter stage 130.

For example, a higher DAC sampling frequency can be utilized as needed to transmit baseband data and/or relax the filter response of the downstream filters of the baseband filter stage 130. Indeed, an increase in the DAC sampling frequency results in the possibility of accommodating higher baseband transmission frequency (i.e., the analog signals I'(t) and Q'(t) have a higher baseband frequency). In addition, an increase in the DAC sampling frequency results in an increase in the separation between the center frequency $f_O$ of the baseband component and the center frequencies $n \times f_S \pm f_O$ of the higher frequency images, which relaxes the required sharpness of the filter cutoffs at corner frequencies of the filters. However, the higher DAC sampling rate results in increased power consumption. So, a tradeoff in power consumption with DAC sampling frequency, and the sharpness of the filter cutoffs at the corner frequencies of the filters are factors that should be considered.

In some embodiments, the mixer stage 140 is configured to perform analog I/Q signal modulation, e.g., single-sideband (SSB) upconversion, by mixing the filtered analog signals I(t) and Q(t), which are output from the baseband filter stage 130, with quadrature LO signals (e.g., an in-phase LO signal (LO_I) and a quadrature-phase LO signal (LO_Q)) to generate and output an analog RF signal (e.g., a single-sideband modulated RF output signal). The local oscillator signals LO_I and LO_Q each have the same LO frequency, but the LO_Q signal is phase-shifted by 90 degrees relative to the LO_I signal. For SSB signal generation, the filtered analog signals I(t) and Q(t) are upconverted with the LO_I and LO_Q signals respectively. It is desirable to ensure that the amplitude modulation level applied to the LO_I signal is well matched to the amplitude modulation level applied to the LO_Q signal. Otherwise, the in-phase (I) and quadrature-phase (Q) signal components of the RF output generated by the RF signal generator system 100 will be imbalanced, leading to degraded image rejection performance and the presence of unwanted sideband spurs.

More specifically, the mixer stage 140 comprises a first mixer circuit 141 (e.g., I mixer circuit), a second mixer circuit 142 (e.g., Q mixer circuit), and a signal combiner circuit 143. The first mixer circuit 141 is configured to mix the filtered analog signal I(t) with the LO_I signal and generate a first RF signal output. The second mixer circuit 142 is configured to mix the filtered analog signal Q(t) with the LO_Q signal and generate a second RF signal output. The first and second RF signals output from the first and second mixer circuits 141 and 142 are input to the signal combiner circuit 143 and combined (e.g., added or subtracted) to generate a single-sideband RF signal output.

In some embodiments, a quadrature phase-shifter circuit is implemented to generate the quadrature LO signals LO_I and LO_Q. For example, a quadrature phase-shifter circuit is configured to receive an LO signal as input and output the quadrature LO signals LO_I and LO_Q based on the LO input signal. In this configuration, the LO_I signal comprises the same frequency and phase as the input LO signal, and the LO_Q signal comprises the same frequency as the input LO signal, but with a phase shift of 90 degrees relative to LO_I. The quadrature phase-shifter circuit can be implemented using one of various quadrature phase shifting techniques known to those of ordinary skill in the art.

The mixer stage 140 performs an up-conversion mixing process which is configured to generate an RF analog signal which has a center frequency that is greater than the baseband frequency of the baseband signals output from the DAC stage 120. In some embodiments, the LO frequency of the mixer stage 140 is in a range of 100 MHz to about 10 GHz, depending on the application. More specifically, as is understood by those of ordinary skill in the art, as a result of the mixing operations of the first and second mixer circuits 141 and 142, the first and second RF signals that are output from the respective first and second mixer circuits 141 and 142 each comprise a double-sideband RF signal. A double-sideband signal comprises an upper sideband (USB) and a lower sideband (LSB) which are disposed at equal distances above and below the LO frequency. The upper sideband comprises a spectral band of frequencies that is higher than the LO frequency, and the lower sideband comprises a spectral band of frequencies that is lower than the LO frequency. The upper and lower sidebands each carry the same information content of the I/Q signals. For example, assume that the filtered analog signals I(t) and Q(t) (i.e., the modulating signals) have a center frequency $f_M$ (intermediate frequency) and that the LO signal has a frequency $f_{LO}$. The first and second RF signals that are output from the first and second mixer circuits 141 and 142 will each have (i) an upper sideband of spectral components, which is frequency-band centered at a frequency of $(f_{LO}+f_M)$ and (ii) a lower sideband of spectral components, which is frequency-band centered at a frequency of $(f_{LO}-f_M)$.

In some embodiments, the signal combiner circuit 143 is configured to add the first and second RF signals which are output from the first and second mixer circuits 141 and 142, in which case the signal combiner circuit 143 will output the "real" lower sideband signal as a single-sideband modulated RF signal (with a suppressed carrier frequency) having a center frequency which is upconverted from the frequency $f_M$ of the baseband signals I(t) and Q(t) to a center frequency $(f_{LO}-f_M)$ of the lower sideband. In other embodiments, the signal combiner circuit 143 is configured to subtract the first and second RF signals which are output from the first and second mixer circuits 141 and 142, in which case the signal combiner circuit 143 will output the "real" upper sideband signal as a single-sideband modulated RF signal (with a suppressed carrier) having a center frequency which is upconverted from the frequency $f_M$ of the baseband signals I(t) and Q(t) to a center frequency $(f_{LO}+f_M)$ of the upper sideband. In other embodiments, the mixer stage 140 is configured as a double-sideband modulator (with a suppressed carrier frequency). More specifically, the mixer stage 140 can be configured to provide double-sideband modulation by maintaining the LO_Q input to the second mixer 142 at a constant zero voltage level (i.e., LO_Q=0). In this instance, the second mixer circuit 142 will have a zero output (i.e., no RF signal is output from the second mixer circuit 142), and the output of the signal combiner circuit 143 will be the double-sideband RF signal output from the first mixer circuit 141.

The amplifier/attenuation stage 150 is configured to receive the upconverted RF signal, which is output from the mixer stage 140, and amplify or attenuate the modulated RF signal to a desired power level, and drive the output of the RF signal generator system 100 (e.g., drive an antenna, sensor device, qubit, etc., which is coupled to the output of the RF signal generator system 100). In some embodiments, the amplifier/attenuation stage 150 comprises a programmable gain, wherein gain can be expressed as a difference between the input signal level (at the input to the amplifier/attenuation stage 150) and the output signal level (at the output of the amplifier/attenuation stage 150) or, more specifically, as a ratio of output to input signals. In some embodiments, the amplifier/attenuation stage 150 is utilized to increase the power level of the RF output signal to a level which is sufficient to transmit (wirelessly, or wired) the modulated RF signal at a given power level and over a required transmission distance. In other embodiments, the amplifier/attenuation stage 150 comprises a programmable gain attenuation stage. The programmable gain attenuation stage comprises a programmable amplifier which is configured to amplify a modulated RF signal with a gain factor of 1, or less than 1. In this manner, the programmable gain attenuation stage can attenuate the power level of modulated RF signals that are output from the mixer stage 140, as desired, for a given application.

The impedance matching network 160 is configured to match a source impedance or load impedance of the output of the amplifier/attenuation stage 150 to a characteristic impedance of an output load (e.g., antenna input, diplexer, test and measurement system, etc.) of the RF signal generator system 100 for the purpose of transferring maximum signal power to the output. In some embodiments, the impedance matching network 160 comprises a balun to convert a differential/balanced output of the amplifier/attenuation stage 150 to a single-ended/unbalanced output. In some embodiments, the resonance parameters (e.g., impedance and bandwidth) of the impedance matching network 160 remain substantially invariant, wherein the impedance matching network 160 is designed with a center frequency which corresponds to a desired operating frequency of the load. In other embodiments, the impedance matching network 160 is configured with a plurality of injection points to provide different impedance matching and filtering characteristics. The different injection points can be selected by digital control signals applied to the impedance matching network 160. The impedance matching network 160 can have high pass, low pass, and band-pass characteristics, wherein the different injection points can be selected to provide different impedance matching and response characteristics. In some embodiments, the impedance matching network 160 is designed with a high-Q factor, wherein the center frequency of the impedance matching network 160 can be adjusted to provide sufficient impedance matching for different transmission frequencies which are generated by, e.g., changing the sampling frequency of the DAC stage 120 and/or changing the LO frequency of the mixer stage 140, depending on the given application.

In some embodiments, the LO signal generator circuitry 170 is configured to generate quadrature LO signals LO_I and LO_Q with a target center frequency, which are utilized by the mixer stage 140 to perform I/Q modulation and up-conversion. In some embodiments, for a differential signal framework, the LO signal generator circuitry 170 is configured to generate complementary quadrature LO signals, which include complementary in-phase LO signals LO_I and $\overline{LO\_I}$, and complementary quadrature-phase LO signals LO_Q and $\overline{LO\_Q}$. Ideally, the complementary quadrature LO signals LO_I, LO_Q, $\overline{LO\_I}$, and $\overline{LO\_Q}$ have the same amplitude and center frequency, but different phases of 0°, 90°, 180°, and 270°, respectively.

The LO signal generator circuitry 170 is implemented using known circuit architectures and LO signal generation techniques. For example, in some embodiments, the LO signal generator circuitry 170 comprises a phase-locked loop (PLL) system which is configured to generate an LO signal with a target center frequency, and phase-shifter circuitry which converts the LO signal generated by the PLL system, into quadrature LO signals LO_I and LO_Q. For differential quadrature LO signals, in some embodiments, the LO signal generator circuitry 170 can implement a quadrature phase-shifter circuit which is configured to receive as input a complementary pair of LO signals, LO and $\overline{LO}$, and generate the complementary quadrature LO signals LO_I, LO_Q, $\overline{LO\_I}$, and $\overline{LO\_Q}$. In some embodiments, the quadrature phase-shifter circuit can be implemented using a quadrature polyphase phase-shifter circuit having a single polyphase filter stage, or multiple polyphase filter stages, as is known to those of ordinary skill in the art. An exemplary embodiment of the LO signal generator circuitry 170 will be discussed in further detail below in conjunction with, e.g., FIG. 5.

The LO signal output driver circuitry 180 comprises LO signal driver stages which are configured to drive the LO inputs of the first and second mixer circuits 141 and 142 in the mixer stage 140 with the quadrature LO signals that are generated and output from the LO signal generator circuitry 170. As explained in further detail below, in a normal operating mode of the RF signal generator system 100, the LO signal output driver circuitry 180 is configured to drive the LO inputs of the first and second mixer circuits 141 and 142 with the quadrature LO signals LO_I and LO_Q (or complementary quadrature LO signals) to perform normal I/Q upconversion. In a calibration mode of the RF signal generator system 100, the LO signal output driver circuitry 180 is configured to selectively drive the LO inputs of the first and second mixer circuits 141 and 142 with DC voltages that are configured to selectively activate and deactivate switching transistors of the first and second mixer circuits 141 and 142 to perform DC measurements of baseband currents, the details of which will be explained in further detail below. Exemplary embodiments of the LO signal output driver circuitry 180 will be discussed in further detail below in conjunction with FIGS. 5, 6A, 6B, 6C, 7A, and 7B.

As shown in FIG. 1, the various signal processing stages 110, 120, 130, 140, 150, 160, 170, and 180 of the RF signal generator system 100 comprise control signal input ports that receive digital control signals from either the calibration system 190 or some processor or microcontroller which is configured to control operation of the RF signal generator system 100. The calibration system 190 can generate digital control signals to configure the RF signal generator system 100 to operate in calibration mode and control the execution of a calibration process that is performed in calibration mode to calibrate I/Q signals of the RF signal generator system 100. Further, in some embodiments, some or all of the stages 110, 120, 130, 140, 150, 160, 170, and 180 have a configurable hardware framework in which various operating parameters of the stages can be adjusted by the digital control signals to adjust normal mode operations of the RF signal generator system 100.

In the exemplary I/Q upconversion architecture of the RF signal generator system 100 shown in FIG. 1, it is desired to eliminate or otherwise substantially minimize imbalance between the baseband I and Q signals for purposes of image rejection. Indeed, an I/Q imbalance can result in an unwanted spectral component at the image frequency. As noted above, the SSB mixer is configured to upconvert an intermediate frequency (IF) of a baseband signal to only one of sideband signal center frequencies of $f_{LO}-f_{IF}$ or $f_{IF}+f_{LO}$, without creating an image of the other sideband signal, which is particularly useful when using low IF frequencies, as preselection filtering is difficult in that case. For example, if a desired RF signal is to be generated at frequency $f_{RF}=f_{LO}-f_{IF}$, then the sideband signal (image signal) at $f_{IF}+f_{LO}$ will be suppressed by the sideband suppression provided by the SSB mixer. However, an imbalance in the amplitude of the baseband I and Q signals can result in the presence of relatively high spectral power for the unwanted spectral component at the image frequency.

Furthermore, for differential I/Q schemes which utilize differential analog I signals (I(t), $\overline{I(t)}$) and differential analog Q signals (Q(t), $\overline{Q(t)}$), an imbalance between the differential analog I signals I(t) and $\overline{I(t)}$ and/or an imbalance between the differential analog Q signals Q(t) and $\overline{Q(t)}$, can result in LO leakage. For example, an imbalance between the differential analog baseband signals I(t) and $\overline{I(t)}$ and/or the differential analog baseband signals Q(t) and $\overline{Q(t)}$ can be a DC offset of the baseband analog signals generated by the DAC stage 120. A DC offset between differential baseband signals means that the signals are not completely complementary due to the existence of a DC term. In the mixer stage 140, the DC offset of a complementary baseband signal pair results in a DC term that is multiplied by the LO frequency, so that the output of the mixer stage 140 comprises an unwanted LO frequency component, which would otherwise be suppressed if the differential signals were properly balanced (e.g., zero offset of the differential signals).

In this regard, in the exemplary RF signal generator system 100, the use of analog RF components can introduce various sources of errors such as DC offset, quadrature phase error, and gain imbalance. For example, such sources of errors include, but are not limited to, gain (amplitude) imbalance between the analog I and Q signals at the output of the DAC stage 120, DC offsets of the analog I and Q signals at the output of the DAC stage 120, DC offsets of the filtered analog I and Q signals at the output of the baseband filter stage 130, phase error (or quadrature phase error) between analog I and Q signals, and phase error between the LO_I and LO_Q signals that are input to the mixer circuits 141 and 142 (wherein phase error or quadrature phase error denotes a deviation in angle from 90 degrees between the I and Q signals), etc.

To ensure accuracy of the RF signal generator system 100, it is important that the amplitude relationship between baseband I and Q signals remains constant even after translation to RF (e.g., after mixing the filtered analog I and Q signals with the LO_I and LO_Q signals). Insufficient image suppression is caused by a combination of gain imbalance and phase error. Gain imbalance between translated I and Q baseband signals is not the only source of error that can affect system performance. In fact, similar problems can be observed when errors such as DC offset and quadrature phase error (phase error between the in-phase and quadrature-phase LO) are prevalent. Thus, two common measurements—carrier and sideband (image) suppression—are used to characterize the aggregate effect of each of these errors. Both I/Q gain imbalance and quadrature phase error translate into an unsuppressed sideband signal. In addition, DC offset errors of the baseband I and Q signals (e.g., DC offset between I$^+$ and I$^-$ or DC offset between Q$^+$ and Q$^-$), translate to an unwanted spectral image at the exact frequency of the LO (referred to as LO leakage or unsuppressed carrier).

In some embodiments, the calibration system 190 is configured to detect various errors such as DC offsets, quadrature phase error, and gain imbalance, etc., in the RF signal generator system 100, and generate compensation control signals to substantially minimize or otherwise eliminate such errors. For example, the calibration system 190 is configured to perform functions such as (i) generating control signals to configure the RF signal generator system 100 to operate in a calibration mode, (ii) detecting imbalances between the baseband I and Q signals in the I/Q signal paths of the RF signal generator system 100 using DC measurement techniques, and generating DC correction signals in the I/Q signal paths to compensate for detected imbalances between the baseband I and Q signals in the I/Q signal paths of the RF signal generator system 100, (iii) detecting phase error between the quadrature LO signals (LO_I and LO_Q) and generating correction signals that are applied to the LO signal generator circuitry 170 and/or the LO signal output driver circuitry 180 to correct the detected phase errors between the quadrature LO signals, and other functions, as discussed in further detail below.

The calibration control circuitry 192 is configured to control functions for calibrating analog current signals in the I/Q signal paths of the RF signal generator system 100 and calibrating the quadrature LO signals (LO_I and LO_Q). For example, in some embodiments, the calibration control circuitry 192 generates various control signals (e.g., digital control signals) for configuring the RF signal generator system 100 to operate in a calibration mode to perform certain calibration processes such as measuring and calibrating static DC currents in the I/Q signal paths of the RF signal generator system 100. Further, the calibration control circuitry 192 is configured to utilize sensor signals generated by the sensor circuitry 194, as well as data from a look-up table, to generate control signals (e.g., digital control signals) that are provided to the actuator circuitry 196 to perform various calibration operations as discussed in further detail below. In some embodiments, the calibration control circuitry 192 comprises control logic which implements a finite state machine to process sensor signals that are provided by the sensor circuitry 194 and generate digital control signals that are applied to the actuator circuitry 196.

In some embodiments, the sensor circuitry 194 comprises various sensor circuits which are configured to generate signals that are indicative of errors such as DC offsets and I/Q phase error. For example, the sensor circuitry 194 comprises a current sensor circuit which is configured to measure current signals that need to be calibrated to maintain sufficient image rejection. In addition, the sensor circuitry 194 comprises a sensor circuit (e.g., low pass filter circuit) that is configured to generate a sensor signal (e.g., DC voltage signal) which is indicative of a duty cycle of a clock signal that is used to generate quadrature LO signals, wherein the duty cycle of the clock signal needs to be calibrated to minimize I/Q phase error. Further, in some embodiments, the sensor circuitry 194 comprises a sensor circuit that is configured to generate a sensor signal (e.g., DC voltage signal) that is indicative of phase error between LO_I and LO_Q signals that are input to the I and Q mixers. Moreover, in some embodiments, the sensor circuitry 194 comprises a sensor circuit (e.g., spectral analyzer) that is configured to perform RF measurements to measure the USB/LSB spectrum.

In some embodiments, the actuator circuitry 196 comprises various actuator circuits that are configured to generate error correction/compensation signals in response to digital control signals provided by the calibration control circuitry 192, to thereby substantially minimize or otherwise eliminate errors such as DC offsets, quadrature phase error, and gain imbalance, etc., of I/Q baseband and LO signals of the RF signal generator system 100. For example, in some embodiments, the actuator circuitry 196 comprises current mode actuator circuits that are configured to inject compensation currents into the I/Q signal paths to achieve I/Q amplitude balancing and DC offset cancellation. Further, in some embodiments, the actuator circuitry 196 comprises current mode actuator circuits that are configured to inject compensation currents into the LO clock signal path to perform clock signal duty cycle calibration and I/Q phase error calibration (fine phase error adjustment). Moreover, in some embodiments, the actuator circuitry 196 comprises a buffer/driver actuator circuit that is configured to provide LO signal delay adjustments to achieve I/Q phase error calibration (coarse phase error adjustment).

In some embodiments, the current reference circuitry 198 is configured as a current bias source to generate an accurate reference current that is utilized by the current mode actuators of the actuator circuitry 196 to generate compensation currents for calibration operations. In some embodiments, for quantum computing systems, the current reference circuitry 198 can be implemented as part of the "room temperature" electronics, while the sensor and actuator circuitry are implemented in low temperature or cryogenic temperature environments. In other embodiments, the current reference circuitry 198 can be implemented in low temperature or cryogenic temperature environments.

As further shown in FIG. 1, the calibration system 190 can be configured to utilize RF measurements that are performed by an RF spectrum analyzer system 199. For example, the RF spectrum analyzer system 199 can be enabled to perform spectral analysis of RF signals that are generated by the RF signal generator system 100 at a current mode interface between the mixer stage 140 and the amplifier/attenuation stage 150 and/or at the output (RF_OUT) of the RF signal generator system 100. The RF spectrum analyzer system 199 may comprise an off-chip or an on-chip RF spectrum analyzer, which is configured to perform RF spectral measurements and analysis in room temperature or low/cryogenic temperature environments. As explained in further detail below, the calibration control circuitry 192 can utilize the RF measurements provided by the RF spectrum analyzer system 199 to generate control signals, as needed, to digitally control the actuator circuitry 196 to perform calibration operations.

While FIG. 1 schematically illustrates the components of the calibration system 190 separate from the RF signal generator system 100 for ease of illustration, in some embodiments, the sensor circuitry 194 and actuator circuitry 196 comprise sensor and actuator circuits that are distributed over the I/Q signal paths and LO signal paths to capture sensor data (e.g., measured DC quantities) at different nodes of the I/Q signal and LO signal paths and generate compensation signals to reduce/remove various errors such as gain imbalance, DC offsets, quadrature phase error, etc. Exemplary configurations of the calibration system 190 for use with an RF signal generator system, such as an AWG system, will now be discussed in further detail in conjunction with FIGS. 2-8B.

Figure 2:
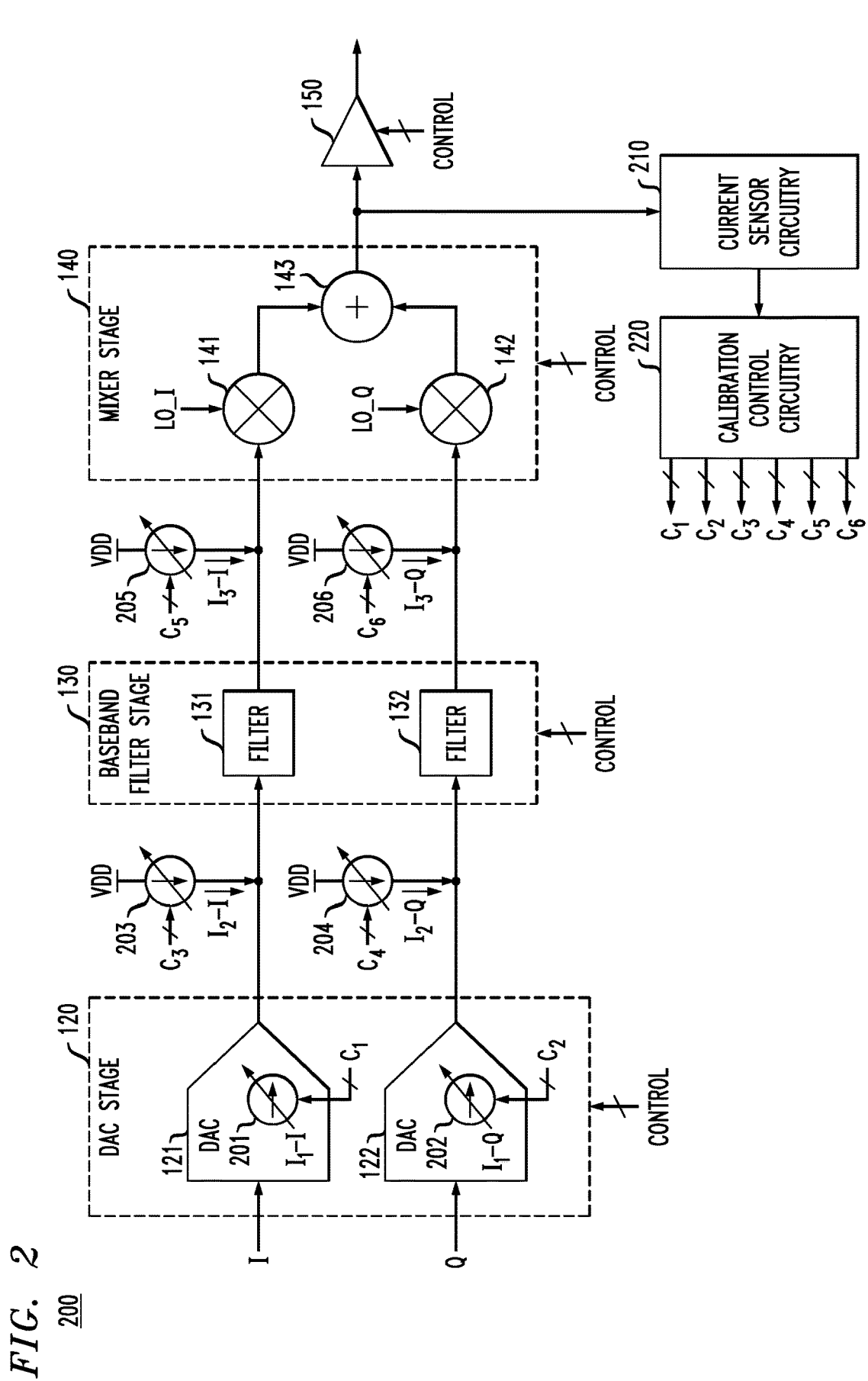
FIG. 2 schematically illustrates a calibration system which comprises actuator and sensor circuitry to provide amplitude balancing and offset cancellation in signal paths of an RF signal generation system, according to an exemplary embodiment of the disclosure.

For example, FIG. 2 schematically illustrates a calibration system which comprises actuator and sensor circuitry to provide amplitude balancing and offset cancellation in signal paths of an RF signal generation system, according to an exemplary embodiment of the disclosure. In particular, FIG. 2 schematically illustrates a calibration system 200 which comprises current actuator circuits 201, 202, 203, 204, 205, and 206, current sensor circuitry 210, and calibration control logic 220. The calibration system 200 schematically illustrates an exemplary embodiment of the calibration system 190 of FIG. 1 for a current mode embodiment of the RF signal generator system 100 having a current mode interface between the DAC stage 120 and the baseband filter stage 130 (referred to herein as DAC-BBF interface), a current mode interface between the baseband filter stage 130 and the mixer stage 140 (referred to herein as BBF-MIX interface), and a current mode interface between the mixer stage 140 and the amplifier/attenuation stage 150 (referred to herein as MIX-AMP interface).

As schematically illustrated in FIG. 2, the current actuator circuit 201 is configured to adjust a reference current ($I_1$–I) of the I DAC circuit 121, and the current actuator circuit 202 is configured to adjust a reference current ($I_1$–Q) of the Q DAC circuit 122. In some embodiments, the current actuator circuit 201 is controlled by a first digital control signal $C_1$, and the current actuator circuit 202 is controlled by a second digital control signal $C_2$. The current actuator circuits 201 and 202 are utilized to adjust the reference currents of the I and Q DAC circuits 121 and 122 in the DAC stage 120. Since the output current of a current-mode DAC is proportional to its reference current, adjusting the reference currents of the I and Q DAC circuits 121 and 122 by means of the actuator circuits 201 and 202 provides an effective mechanism for balancing the amplitudes of the currents in the I/Q signal paths of the RF signal generator system 100.

The current actuator circuits 203 and 204 are configured to inject compensation currents into the I and Q signal paths at the interface between the DAC stage 120 and the baseband filter stage 130. In particular, as schematically shown in FIG. 2, the actuator circuit 203 is controlled by a third digital control signal $C_3$ to inject a compensation current $I_2$–I into the I signal path, and the actuator circuit 204 is controlled by a fourth digital control signal $C_4$ to inject a compensation current $I_2$–Q into the Q signal path. The actuator circuits 203 and 204 are utilized to adjust currents in the I/Q signal paths to enable DC offset cancellation of the I and Q current signals at the output of the DAC stage 120.

The actuator circuits 205 and 206 are configured to inject compensation currents into the I and Q signal paths at the current mode interface between the baseband filter stage 130 and the mixer stage 140. In particular, as schematically shown in FIG. 2, the actuator circuit 205 is controlled by a fifth digital control signal $C_5$ to inject a compensation current $I_3$–I into the I signal path, and the actuator circuit 206 is controlled by a sixth digital control signal $C_6$ to inject a compensation current $I_3$–Q into the Q signal path. The actuator circuits 205 and 206 are utilized to adjust currents in the I/Q signal paths to enable DC offset cancellation of the I and Q current signals at the output of the baseband filter stage 130 or at an output of an input stage of the mixer stage 140 (e.g., as schematically shown and discussed below in conjunction with FIG. 3A).

In some embodiments, as schematically shown in FIG. 2, the current sensor circuitry 210 is coupled to an output of the mixer stage 140 and is configured to measure currents in the signal paths at the output of the mixer stage 140, which need to be calibrated to achieve sufficient image rejection. In some embodiments, the current sensor circuitry 210 is configured to measure DC (i.e., static) currents in the signal paths. In other embodiments, the current sensor circuit 210 is configured to measure RF currents in the signal paths (via spectral analysis). The current sensor circuitry 210 is configured to provide data regarding measured currents to the calibration control logic 220.

The calibration control logic 220 is configured to process the measured current data to detect current mismatches resulting from amplitude imbalance and/or DC offsets. The calibration control logic 220 generates the digital control signals $C_1$, $C_2$, $C_3$, $C_4$, $C_5$, and $C_6$ to cause the respective actuator circuits 201, 202, 203, 204, 205, and 206 to generate compensation currents, as needed, to balance the amplitudes/gain of the analog I and Q currents generated by the DAC stage 120, and/or achieve DC offset cancellation of the analog I and Q currents at the DAC-BBF interface and/or the BBF-MIX interface.

In some embodiments, the actuator circuits 201 and 202 of the DAC stage 120 comprise digitally programmable reference current circuits for the DAC circuits 121 and 122. In such embodiments, the actuator circuits 201 and 202 are configured to adjust the reference current levels that are used by the DAC circuits 121 and 122 for generating the respective analog I and Q signals, in response to the respective digital control signals $C_1$ and $C_2$, to provide current adjustments for I/Q amplitude balancing. Further, in some embodiments, the actuator circuits 203, 204, 205, and 206 comprise digitally programmable current sources which are configured to inject compensation currents into the I/Q signal paths in response to the respective digital control signals $C_3$, $C_4$, $C_5$, and $C_6$ to provide current adjustments for DC offset cancellation. In some embodiments, the actuator circuits 203, 204, 205, and 206 each comprise a digitally programmable current mode DAC circuit, which is utilized to implement DC offset compensation.

It is to be understood that FIG. 2 illustrates an exemplary embodiment of a calibration system 200 that is configured to achieve DC offset cancellation by utilizing either the digitally programmable current actuator circuits 203 and 204 to inject digitally adjustable DC compensation currents in the I/Q signal paths at the DAC-BBF interface or by utilizing the digitally programmable current actuator circuits 205 and 206 to inject digitally adjustable DC compensation currents in the I/Q signal paths at the BBF-MIX interface.

In some embodiments, the calibration system 200 is configured to provide DC offset cancellation by utilizing a combination of DC offset compensation at both the DAC-BBF interface and the BBF-MIX interface, with at least one set of current actuator circuits 203/204 and 205/206 activated, or by using both sets of current actuator circuits 203/204 and 205/206, wherein the injection of the DC offset compensation currents at the different current mode interfaces is partitioned based on factors such as, e.g., dominant sources of mismatch, signal loading, etc. Advantageously, the injection of DC compensation currents at one or both of the current mode DAC-BBF and BBF-MIX interfaces of a current-mode RF signal generator system architecture provides a lower-power, high-performance, and high-bandwidth signal calibration framework to generate DC currents to enable cancellation of I/Q DC offsets which result from imbalances of the static I⁺ and I⁻ currents (the static Q⁺ and Q⁻ currents) in the I/Q signal paths and thus suppress LO leakage out of the mixer stage 140.

Figure 3A:
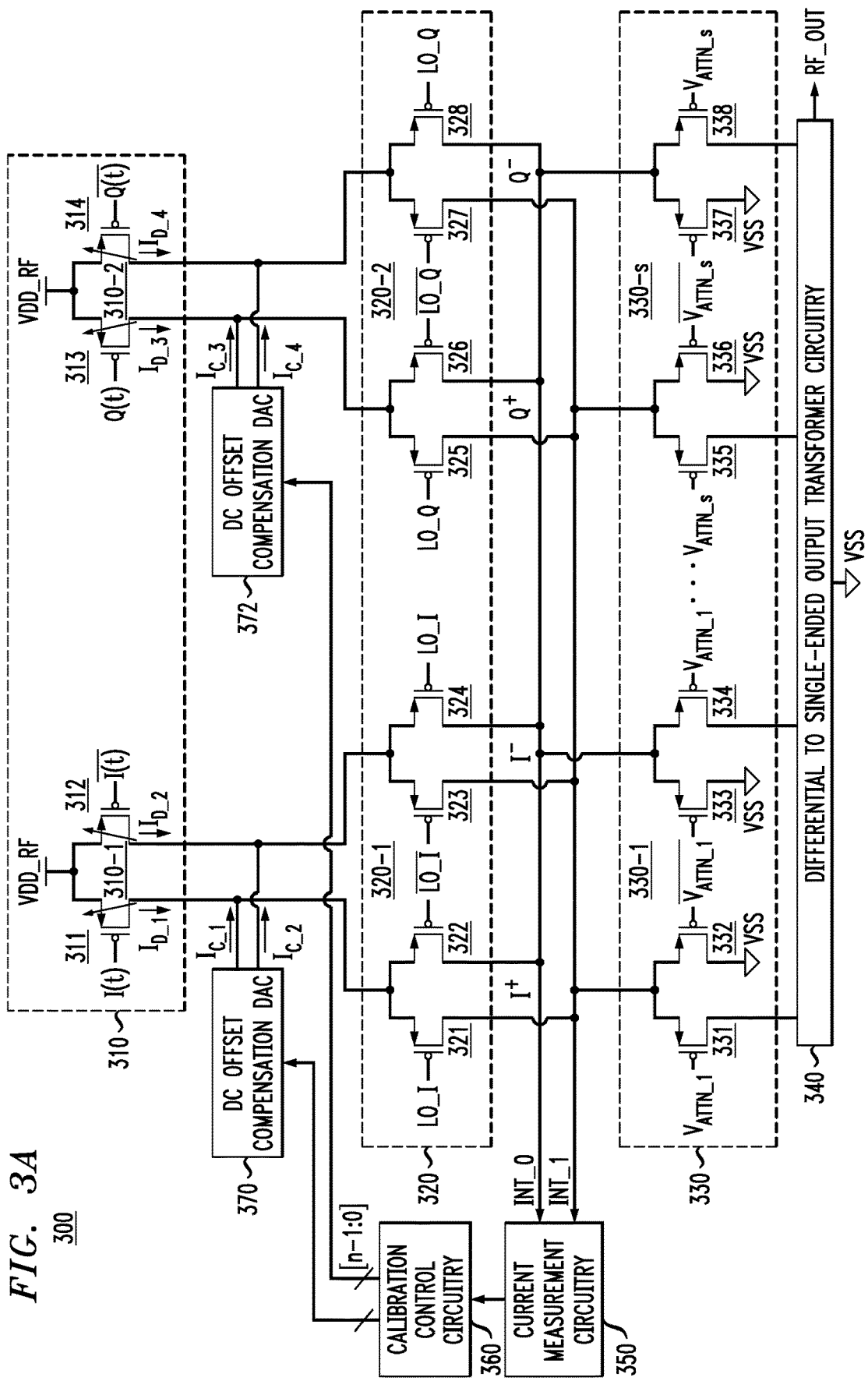
FIG. 3A schematically illustrates an RF signal generator system and a calibration system which is configured to calibrate signals in the RF signal generator system to suppress unwanted sideband image and spurious signals, according to an exemplary embodiment of the disclosure.
Figure 3B:
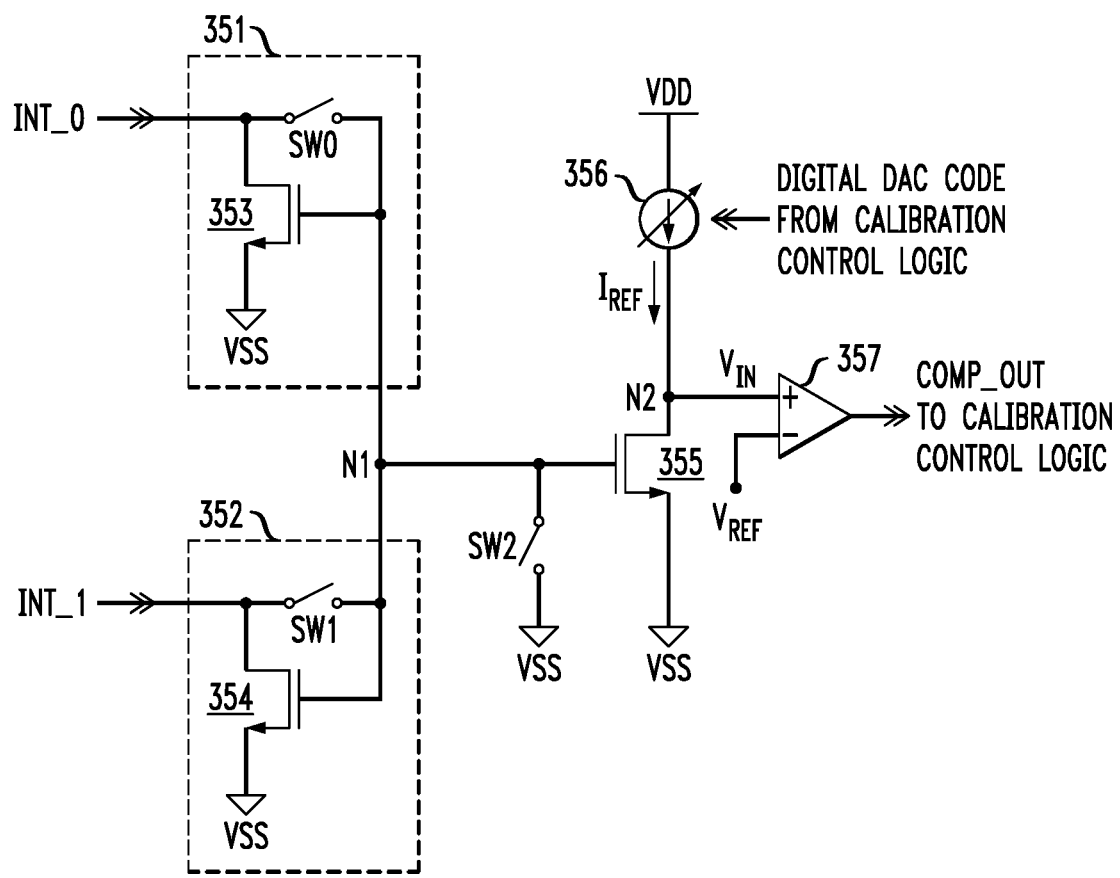
FIG. 3B schematically illustrates current measurement circuitry which is implemented by a calibration system to measure currents, according to an exemplary embodiment of the disclosure.

In some embodiments, the RF signal generator system 100 (FIGS. 1 and 2) comprises a current mode architecture which facilitates the injection of compensation currents in the I/Q baseband signal paths to enable high-performance and low power consumption calibration techniques for suppressing LO leakage and unwanted sideband images. For example, FIGS. 3A and 3B schematically illustrate a calibration system which comprises actuator and sensor circuitry to provide signal amplitude balancing and offset cancellation in signal paths of an RF signal generation system, according to another exemplary embodiment of the disclosure. In particular, FIG. 3A schematically illustrates a current mode output stage of an RF signal generator system 300 which comprises actuator and sensor circuitry to detect DC offsets and calibrate static I/Q currents to cancel DC offsets, according to an exemplary embodiment of the disclosure.

More specifically, FIG. 3A schematically illustrates an RF signal generator system 300 comprising a baseband signal input stage 310, a current-commutating mixer stage 320, a signal attenuation stage 330, and transformer circuitry 340 (alternatively, output transformer stage 340). In addition, FIG. 3A schematically illustrates a calibration system comprising current measurement circuitry 350, control logic circuitry 360, and current actuator circuitry comprising a first DC offset compensation DAC 370, and a second DC offset compensation DAC 372.

The RF signal generator system 300 schematically illustrates a current mode RF signal generator framework which is configured to operate with complementary in-phase baseband signals I(t) and $\overline{I(t)}$, complementary quadrature-phase baseband signals Q(t) and $\overline{Q(t)}$, and complementary quadrature LO signals comprising complementary in-phase LO signals LO_I and $\overline{LO\_I}$, and complementary quadrature-phase LO signals LO_Q and $\overline{LO\_Q}$. In some embodiments, the baseband signal input stage 310 and the current-commutating mixer stage 320 schematically illustrate an exemplary embodiment of the mixer stage 140 (as schematically shown in FIGS. 1 and 2). Further, in some embodiments, the signal attenuation stage 330 schematically illustrates an exemplary embodiment of the amplifier/attenuation stage 150 (as schematically shown in FIGS. 1 and 2). Moreover, in some embodiments, the output transformer stage 340 represents an exemplary embodiment of the impedance matching network 160 of FIG. 1, wherein the output transformer stage 340 comprises circuitry for transforming a differential output signal to a single-ended output signal. The output transformer stage 340 can be implemented using various techniques and circuit configurations for transforming a differential output signal to a single-ended output signal, which are suitable for the given application and which are well known to those of ordinary skill in the art.

The baseband signal input stage 310 comprises a plurality of baseband input transistors 311, 312, 313, and 314. In some embodiments, the baseband input transistors 311, 312, 313, and 314 are p-type metal-oxide-semiconductor (PMOS) transistors. The transistors 311 and 312 comprise a first differential transistor pair 310-1, wherein the transistors 311 and 312 have source terminals that are commonly connected to a positive supply voltage node VDD (e.g., VDD_RF, where VDD_RF is about 900 mV or less), and respective gate terminals which receive as input the complementary in-phase baseband signals I(t) and $\overline{I(t)}$, respectively. The transistors 313 and 314 comprise a second differential transistor pair 310-2, wherein the transistors 313 and 314 have source terminals that are commonly connected to the positive supply voltage node VDD (e.g., VDD_RF) and respective gate terminals which receive as input the complementary quadrature-phase baseband signals Q(t) and $\overline{Q(t)}$, respectively. The transistors 311, 312, 313, and 314 each comprise a drain terminal that is connected to a respective one of a plurality of differential transistor pairs in the current-commutating mixer stage 320.

In some embodiments, the transistors 311, 312, 313, and 314 of the baseband signal input stage 310 comprise variable gain elements (as schematically illustrated by the slanted arrows across the transistors) which are configurable to adjust the baseband signal gain in the I/Q signal paths. For example, in some embodiments, each baseband input transistor 311, 312, 313, and 314 comprises a variable-width transistor that is structurally configured and controlled using known techniques to vary the effective gate width of the transistor structure and, thus, adjust a maximum amount of drain current $I_{D\_1}$, $I_{D\_2}$, $I_{D\_3}$, and $I_{D\_4}$ that flows through the respective transistors 311, 312, 313, and 314, when operating in saturation mode.

For example, in some embodiments, each baseband input transistor 311, 312, 313, and 314 can be structurally configured to include a plurality of transistor segments that are coupled in parallel, wherein the number of segments that are active/inactive at a given time (via a digital switching control system) can be adjusted to change the effective gate width of a given baseband input transistor. In this regard, the effective widths of the transistors 311, 312, 313, and 314 in the baseband signal input stage 310 can be configured to adjust the baseband signal gain in the I/Q signal paths over a target gain range (e.g., gain range of 20 dB) with multiple gain step settings within the gain range. For example, in some embodiments, DC baseband currents can be adjusted to one of various target current levels over a given range wherein a highest baseband current level is about 10× greater than a lowest baseband current level (e.g., a range from about 35 uA to about 350 uA).

The current-commutating mixer stage 320 comprises a differential I mixer 320-1, and a differential Q mixer 320-2. The differential I mixer 320-1 comprises a plurality of mixing transistors 321, 322, 323, and 324 (alternatively, I mixer switching transistors 321, 322, 323, and 324). The differential Q mixer 320-2 comprises mixing transistors 325, 326, 327, and 328 (alternatively, Q mixer switching transistors 325, 326, 327, and 328). In some embodiments, as shown in FIG. 3A, the mixing transistors 321, 322, 323, 324, 325, 326, 327, and 328 are PMOS transistors.

In the differential I mixer 320-1, the mixing transistors 321 and 322 comprise a first differential mixer transistor pair having source terminals that are commonly connected to the drain terminal of the transistor 311 in the baseband signal input stage 310, and respective gate terminals which receive as input the complementary in-phase LO signals LO_I and $\overline{LO\_I}$, respectively. The mixing transistors 323 and 324 comprise a second differential mixer transistor pair having source terminals that are commonly connected to the drain terminal of the transistor 312 in the baseband signal input stage 310, and respective gate terminals which receive as input the complementary in-phase LO signals $\overline{LO\_I}$ and LO_I, respectively.

In the differential Q mixer 320-2, the mixing transistors 325 and 326 comprise a first differential mixer transistor pair having source terminals that are commonly connected to the drain terminal of the transistor 313 in the baseband signal input stage 310, and respective gate terminals which receive as input the complementary quadrature-phase LO signals LO_Q and LO_Q, respectively. The mixing transistors 327 and 328 comprise a second differential mixer transistor pair having source terminals that are commonly connected to the drain terminal of the transistor 314 in the baseband signal input stage 310, and respective gate terminals which receive as input the complementary quadrature-phase LO signals $\overline{LO\_Q}$ and LO_Q, respectively.

The current-commutating mixer stage 320 comprises two output nodes, denoted INT_0 and INT_1. As schematically shown in FIG. 3A, the mixing transistors 321, 323, 325, and 327 have drain terminals that are commonly coupled to the output node INT_1 of the current-commutating mixer stage 320, and the mixing transistors 322, 324, 326, and 328 have drain terminals that are commonly coupled to the output node INT_0 of the current-commutating mixer stage 320. The differential I mixer 320-1 and the differential Q mixer 320-2 are configured to provide analog I/Q modulation and up-conversion, where the connections of the mixing transistors of the differential I and Q mixers 320-1 and 320-2 (with the mixing transistors operating in triode mode) allow for the summation/subtraction of the output currents of the mixing transistors 321, 322, 323, 324, 325, 326, 327, and 328 to achieve the SSB I/Q modulation, as is understood by those of ordinary skill in the art. As explained in further detail below, in some embodiments, the output nodes INT_0 and INT_1 comprise intermediate nodes of the baseband I and Q signal paths which are tapped by the calibration system to measure I/Q baseband currents of the RF signal generator system 300 during a calibration process.

The signal attenuation stage 330 is configured to adjust a signal strength of the RF output signal. More specifically, in the exemplary embodiment of FIG. 3A, the signal attenuation stage 330 is configured to adjust the amount of differential current that flows from the output nodes INT_0 and INT_1 to the output transformer stage 340. In this regard, the signal attenuation stage 330 serves to adjust the signal level of the signal output from the current-commutating mixer stage 320. The signal attenuation stage 330 comprises a plurality of attenuation segments 330-1, . . . , 330-s which are digitally controlled by respective pairs of differential control signals $[V_{ATTN\_1}, \overline{V_{ATTN\_1}}], \ldots [[V_{ATTN\_s}, \overline{V_{ATTN\_s}}]$. As schematically illustrated in FIG. 3A, the first attenuation segment 330-1 comprises a first differential pair of transistors 331 and 332, and a second differential pair of transistors 333 and 334. In addition, the attenuation segment 330-s comprises a first differential pair of transistors 335 and 336, and a second differential pair of transistors 337 and 338. In some embodiments, the transistors 331, 332, 333, 334, 335, 336, 337, and 338 of the signal attenuation stage 330 are PMOS transistors. The number (s) of attenuation segments 330-1, . . . , 330-s that are implemented will depend on the desired range and resolution of gain adjustment.

In the first attenuation segment 330-1, the first differential pair of transistors 331 and 332 have source terminals that are commonly connected to the mixer output node INT_1, and gate terminals that receive as input the differential control signals $V_{ATTN\_1}$ and $\overline{V_{ATTN\_1}}$, respectively. The transistor 331 has a drain terminal that is coupled to the output transformer stage 340, and the transistor 332 has a drain terminal that is coupled to a negative power supply node VSS (e.g., 0V ground voltage). In addition, the second differential pair of transistors 333 and 334 have source terminals that are commonly connected to the mixer output node INT0, and gate terminals that receive as input the differential control signals $\overline{V_{ATTN\_1}}$ and $V_{ATTN\_1}$, respectively. The transistor 333 has a drain terminal that is coupled to the negative power supply node VSS, and the transistor 334 has a drain terminal that is coupled to the output transformer stage 340.

Similarly, in the attenuation segment 330-s, the first differential pair of transistors 335 and 336 have source terminals that are commonly connected to the mixer output node INT_1, and gate terminals that receive as input the differential control signals $V_{ATTN\_s}$ and $\overline{V_{ATTN\_s}}$, respectively. The transistor 335 has a drain terminal that is coupled to the output transformer stage 340, and the transistor 336 has a drain terminal that is coupled to a negative power supply node VSS. In addition, the second differential pair of transistors 337 and 338 have source terminals that are commonly connected to the mixer output node INTO, and gate terminals that receive as input the differential control signals $\overline{V_{ATTN\_s}}$ and $V_{ATTN\_s}$, respectively. The transistor 337 has a drain terminal that is coupled to the negative power supply node VSS, and the transistor 338 has a drain terminal that is coupled to the output transformer stage 340.

In operation, the amount of differential current that flows from the output nodes INT_0 and INT_1 to the output transformer stage 340 can be adjusted based on the number of attenuation segments 330-1, . . . , 330-s that are activated. A given attenuation segment is "deactivated" (and does not contribute to attenuation of the RF output signal) when the corresponding differential control signals $V_{ATTN}$ and $\overline{V_{ATTN}}$ are logic "0" and logic "1", respectively. For instance, the first attenuation segment 330-1 will be "deactivated" when $V_{ATTN\_1}$ is logic "0" and $\overline{V_{ATTN\_1}}$ is logic "1" such that the transistors 331 and 334 will be in a turned "On" state and allow some current to flow from the output nodes INT_1 and INT_0 to the output transformer stage 340, while the transistors 332 and 333 will be in a turned "Off" state. On the other hand, the first attenuation segment 330-1 will be "activated" (and will contribute to attenuation of the RF output signal) when $V_{ATTN\_1}$ is logic "1" and $\overline{V_{ATTN\_1}}$ is logic "0" such that the transistors 331 and 334 will be in a turned "Off" state, and the transistors 332 and 333 will be in a turned "On" state and allow some current to flow from the output nodes INT_1 and INT_0 to the negative power supply node VSS (e.g., ground). Since this current flowing from the output nodes INT_1 and INT_0 to the negative power supply node VSS (e.g., ground) does not contribute to the current flowing through the output transformer stage 340, the RF output signal level is reduced.

In this configuration, the amount of differential current that flows from the output nodes INT_0 and INT_1 to the output transformer stage 340 can be (i) increased by increasing the number of "deactivated" attenuation segments (thereby increasing the RF output signal level), or (ii) decreased by increasing the number of "activated" attenuation segments (thereby decreasing the RF output signal level). The number (s) of attenuation segments 330-1, . . . , 330-s that are implemented will depend on the desired range and resolution of gain adjustment.

As noted above, in the baseband signal input stage 310, the first differential transistor pair 310-1 is configured to receive the complementary in-phase baseband signals I(t) and $\overline{I(t)}$, and the second differential transistor pair 310-2 is configured to receive the complementary quadrature-phase baseband signals Q(t) and $\overline{Q(t)}$, and in response, the first and second differential transistor pairs 310-1 and 310-2 generate current mode signals that are applied to the current-commutating mixer stage 320. In this regard, in the baseband signal input stage 310, matching is critical between the first differential pair of transistors 311 and 312, and between the second differential pair of transistors 313 and 314. In addition, matching is critical between the first differential transistor pair 310-1 and the second differential transistor pair 310-2. In this regard, mismatches between the baseband input transistors in the baseband signal input stage 310 can cause an imbalance in the I/Q baseband current signals, which can lead to LO leakage and insufficient image rejection.

As noted above, an amplitude or phase imbalance between the I and Q signals can cause degradation in the image rejection performance, which leads to the presence of unwanted spur sidebands. Furthermore, an imbalance (e.g., DC offset) between positive and negative components (e.g., I$^+$ and I$^-$) in the same phase (I-phase) leads to an LO leakage spur. In a current mode RF signal generator system architecture (e.g., AWG system) such as that shown in FIG. 3A, imbalances between (i) the I and Q baseband currents, (ii) the I$^+$ and I$^-$ currents, and/or (iii) the Q$^+$ and Q$^-$ currents, can lead to degraded performance with regard to LO leakage and unwanted spurious sideband signals.

The exemplary calibration system shown in FIG. 3A is configured to correct imbalances in the static I/Q baseband currents. As noted above, in some embodiments, the output nodes INT_0 and INT_1 comprise intermediate nodes of the baseband I and Q signal paths which are tapped by the calibration system to measure I/Q baseband currents in the RF signal generator system 300 during a calibration process. In the exemplary embodiment of FIG. 3A the current measurement circuitry 350 comprises first and second inputs that are selectively coupled (via switches) to the respective output nodes INT_0 and INT_1 of the current-commutating mixer stage 320. During a calibration process, the current measurement circuitry 350 is activated and configured to perform DC measurements to sense the individual I-phase and Q-phase current signal components I$^+$, I$^-$, Q$^+$ and Q$^-$ at the output nodes INT_0 and INT_1.

More specifically, in some embodiments, a calibration is performed as follows. The RF signal generator system 300 is configured to operate in calibration mode. In calibration mode, the baseband input transistors 311, 312, 313, and 314 of the baseband signal input stage 310 are biased at their normal current levels (i.e., the same as those used in normal operating mode). The upstream circuitry (such as the first and second DAC circuits 121 and 122 in FIG. 1) is configured (programmed) so that zero differential voltage is applied to the in-phase inputs (I(t) and $\overline{I(t)}$) and to the quadrature-phase inputs (Q(t) and $\overline{Q(t)}$). In addition, the signal attenuation stage 330 is completely turned off by applying a constant DC voltage of the proper logic level to the gate terminals of the transistors in every attenuation segment 330-1, . . . 330-s to turn off all transistors in the signal attenuation stage 330. In this regard, completely turning off the signal attenuation stage 330 causes the DC currents, which are generated by the current-commutating mixer stage 320 during the calibration process and output to the intermediate nodes INT_0 and INT_1, to be routed to the inputs of the current measurement circuitry 350.

Furthermore, in calibration mode, the current-commutating mixer stage 320 can be configured to selectively output a desired one of the baseband currents I$^+$, I$^-$, Q$^+$, or Q$^-$ of a given baseband phase on one of the nodes INT_0 and INT_1 for input to the current measurement circuitry 350. In particular, to selectively output one of the baseband currents I$^+$, I$^-$, Q$^+$, or Q$^-$ at a given time for measurement, the I and Q mixer switching transistors are configured by applying a DC voltage of logic "1" or a DC voltage of logic "0" to the gate terminals of the I and Q mixer switching transistors, as needed, to selectively turn on one mixing transistor, while turning off other mixing transistors.

For example, to output the baseband current I$^+$ on the node INT_1, the mixing transistor 321 of the I mixer 320-1 is turned on, while all other mixing transistors 322, 323, 324, 325, 326, 327, and 328 are turned off. Moreover, to output the baseband current I$^-$ on the node INT_1, the mixing transistor 323 of the I mixer 320-1 is turned on, while all other mixing transistors 321, 322, 324, 325, 326, 327, and 328 are turned off. Further, to output the baseband current Q$^+$ on the node INT_1, the mixing transistor 325 of the Q mixer 320-2 is turned on, while all other mixing transistors 321, 322, 323, 324, 326, 327, and 328 are turned off. Moreover, to output the baseband current Q$^-$ on the node INT_1, the mixing transistor 327 of the Q mixer 320-2 is turned on, while all other mixing transistors 321, 322, 323, 324, 325, 326, and 328 are turned off. It is to be noted that in other embodiments, the individual I-phase and Q-phase current signal components I$^+$, I$^-$, Q$^+$ and Q$^-$ can be selectively output on the nodes INT_0 by selectively activating only one of the mixing transistors 322, 324, 326, or 328, at a given time.

In some embodiments, the current measurement circuitry 350 is configured to measure/estimate the DC baseband currents I$^+$, I$^-$, Q$^+$, and Q, and the control logic circuitry 360 is configured to determine a difference between the same phase pairs {I$^+$, I$^-$} and {Q$^+$, Q$^-$}, which provides an indication of DC offset. For example, the difference (imbalance) between the measured I$^+$ and I$^-$ baseband currents and/or the difference (imbalance) between the measured Q$^+$ and Q$^-$ baseband currents, represent DC offsets that lead to LO leakage. In addition, the control logic circuitry 360 is configured to determine a difference (imbalance) between the measured I$^+$ and Q$^+$ baseband currents, wherein an imbalance between the I$^+$ and Q$^+$ baseband currents can degrade image rejection, which results in the presence of unwanted sideband spurs.

The control logic circuitry 360 is configured to generate respective first and second digital control signals (e.g., n-bit control signals [n−1:0]) that are applied to the first and second DC offset compensation DACs 370 and 372, respectively. In some embodiments, the first control signal that is input to the first DC offset compensation DAC 370 provides an indication of the determined difference between the measured I$^+$ and I$^-$ baseband currents, and the second control signal that is input to the second DC offset compensation DAC 372 provides an indication of the determined difference between the measured Q$^+$ and Q$^-$ baseband currents.

As schematically shown in FIG. 3A, the first DC offset compensation DAC 370 comprises a first output terminal coupled to the drain terminal of the baseband input transistor 311, and a second output terminal coupled to the drain terminal of the baseband input transistor 312. The second DC offset compensation DAC 372 comprises a first output terminal coupled to the drain terminal of the baseband input transistor 313, and a second output terminal coupled to the drain terminal of the baseband input transistor 314.

In this exemplary configuration, in response to a control signal received from the control logic circuitry 360, the first DC offset compensation DAC 370 is configured to inject additional currents $I_{C\_1}$ and $I_{C\_2}$ into the I$^+$ and I$^-$ baseband signal paths, as needed. The additional currents $I_{C\_1}$ and $I_{C\_2}$ are added to the respective drain currents $I_{D\_1}$ and $I_{D\_2}$ of the respective baseband input transistors 311 and 312 to thereby equalize the I⁺ and I⁻ baseband currents and, thus, significantly reduce or eliminate DC offset between the I⁺ and I⁻ baseband currents that are applied to the input of the I-mixer 320-1. Similarly, in response to a control signal received from the control logic circuitry 360, the second DC offset compensation DAC 372 is configured to inject additional currents $I_{C\_3}$ and $I_{C\_4}$ into the Q⁺ and Q⁻ baseband signal paths, as needed. The additional currents $I_{C\_3}$ and $I_{C\_4}$ are added to the respective drain currents $I_{D\_3}$ and $I_{D\_4}$ of the baseband input transistors 313 and 314 to thereby equalize the Q⁺ and Q⁻ baseband currents and, thus, significantly reduce or eliminate DC offset between the Q⁺ and Q⁻ baseband currents that are applied to the input of the Q-mixer 320-2.

It is to be noted that imbalances between the baseband currents can be adjusted via the first and second DC offset compensation DACs 370 and 372, and/or the first and second DAC circuits 121 and 122 in FIG. 1. For example, utilizing the first and second DC offset compensation DACs 370 and 372 ensures that any imbalance (offsets) between the two baseband currents corresponding to a given phase, e.g., {I⁺ and I⁻}, and {Q⁺ and Q⁻} is minimized. On the other hand, the first and second DAC circuits 121 and 122 (FIG. 1) are preferably utilized to correct for an imbalance between the baseband currents I⁺ and Q⁺. Thus, utilizing the first and second DC offset compensation DACs 370 and 372, together with the first and second DAC circuits 121 and 122, provides the ability to correct for imbalances and ensures that all baseband currents I⁺, I⁻, Q⁺, and Q⁻ are essentially equal in magnitude.

The current measurement circuitry 350 of FIG. 3A can be implemented using exemplary techniques and circuit architectures as described herein. For example, FIG. 3B schematically illustrates an exemplary embodiment of the current measurement circuitry 350 which is implemented by a calibration system to measure I/Q baseband currents, according to an exemplary embodiment of the disclosure. The current measurement circuitry 350 comprises a first current sink circuit 351, a second current sink circuit 352, a transistor 355 (alternatively, mirror transistor 355), a current DAC circuit 356, a comparator 357, and a switch SW2. The first current sink circuit 351 comprises a first transistor 353 and a switch SW0. The second current sink circuit 352 comprises a second transistor 354 and a switch SW1. In some embodiments, the transistors 353, 354, and 355 are n-type MOS (NMOS) field-effect transistors.

In the first current sink circuit 351, the first transistor 353 has a drain terminal coupled to a first current sensing node INT_0 (e.g., the intermediate node INT_0 of FIG. 3A), a source terminal that is coupled to the negative power supply node VSS, and a gate terminal coupled to a first node N1. The switch SW0 is coupled to and between the drain terminal and the gate terminal of the first transistor 353. Further, in the second current sink circuit 352, the second transistor 354 has a drain terminal coupled to a second current sensing node INT_1 (e.g., the intermediate node INT_1 of FIG. 3A), a source terminal that is coupled to the negative power supply node VSS, and a gate terminal coupled to the first node N1. The switch SW1 is coupled to and between the drain terminal and the gate terminal of the second transistor 354.

The mirror transistor 355 comprises a gate terminal that is coupled to the first node N1, a drain terminal that is coupled a second node N2, and a source terminal that is coupled to the negative power supply node VSS. The current DAC circuit 356 comprises an output terminal that is coupled to the second node N2. The comparator 357 (e.g., voltage comparator circuit) comprises a non-inverting input terminal (+) which is coupled to the second node N2, an inverting input terminal (−) which is coupled to a voltage reference node $V_{REF}$, and an output terminal that is coupled to an input terminal of the calibration control circuitry (e.g., block 360, FIG. 3A; block 220, FIG. 2; block 192, FIG. 1). The switch SW2 is coupled to and between the first node N1 and the negative power supply node VSS.

The current DAC circuit 356 comprises a high-resolution current-output DAC which is configured to output a reference current $I_{REF}$ with a magnitude that can be adjusted under digital control by the calibration control circuitry (e.g., block 360, FIG. 3A; block 220, FIG. 2; block 192, FIG. 1, etc.). In some embodiments, the current DAC circuit 356 comprises a segmented DAC framework comprising an N-bit coarse binary-weighted current-output DAC, and a P-bit fine thermometer-coded current-output DAC. An exemplary embodiment of the current DAC circuit 356 will be discussed in further detail below in conjunction with FIGS. 4A, 4B, and 4C.

It is to be noted that the circuit components 351, 352, 355 and 357 of the current measurement circuitry 350 essentially comprise a current comparator circuit which is configured to receive an input baseband current to be measured (from one of the nodes INT_0 or INT_1), compare the input current with a reference current $I_{REF}$ (which is generated and output from the current DAC circuit 356), and generate a compare output signal (denoted Comp_Out). The current DAC circuit 356 is configured to increase or decrease the reference current $I_{REF}$ until the current comparator circuit generates a compare output signal which indicates that a magnitude of the reference current $I_{REF}$ is substantially equal to a magnitude of the input current.

More specifically, during a normal mode of operation of the RF signal generator system, the current measurement circuitry 350 is configured in a deactivated state, wherein the switches SW0 and SW1 are open (deactivated), and the switch SW2 is closed (activated). With the current measurement circuitry 350 in the deactivated state, the first node N1 is coupled to the negative supply voltage node VSS (e.g., ground). Since the gate terminals of the transistors 353, 354, and 355 are commonly coupled to the first node N1, the transistors 353, 354, and 355 are in cutoff mode and, thus, turned off. Further, with the switches SW0 and SW1 deactivated, the first and second nodes INT_0 and INT_1 are disconnected from the first node N1. In the deactivated state, the current measurement circuitry 350 provides a relatively small capacitive load (e.g., small parasitic capacitances of the first and second transistors 353 and 354 in cutoff mode) to the first and second nodes INT_0 and INT_1 of the current-commutating mixer stage 320 to avoid RF signal attenuation.

During a calibration mode, the current measurement circuitry 350 is configured to measure a DC current (e.g., I⁺, I⁻, Q⁺, Q⁻) on one of first and second output nodes INT_0 and INT_1. For example, to measure a baseband current on the first node INT_0, the switch SW0 is activated (closed), the switch SW1 remains deactivated (open), and the switch SW2 is deactivated (opened). In this configuration, the first current sink circuit 351 is activated where the first transistor 353 becomes a diode-connected MOSFET with its drain and gate terminals coupled together and to the first node N1. In addition, the first transistor 353 (in the diode-connected MOSFET configuration) and the mirror transistor 355 form a current mirror circuit. In some embodiments, the current mirror circuit, which is formed by the first transistor 353 (in the diode-connected configuration) and the mirror transistor 355, is configured to provide a 1:1 current mirror ratio (or current transfer ratio). In other embodiments, the current mirror circuit is configured to scale the input current by a factor of M, where M<1 or where M>1.

In calibration mode, the RF signal generator system is configured so that a DC current, which corresponds to one of the $I^+$, $I^-$, $Q^+$, or $Q^-$ baseband currents, flows from the first node INT_0 into the first current sink circuit 351 and through the first transistor 353. The current DAC circuit 356 outputs a reference current $I_{REF}$ that flows through the mirror transistor 355, and a voltage (denoted $V_{IN}$) is generated on the second node N2 which is applied to the non-inverting input (+) terminal of the comparator 357. In some embodiments, a reference voltage $V_{REF}=0.5*VDD$ is applied to the inverting input (−) terminal of the comparator 357. When the voltage $V_{IN}$ on the second node N2 is greater than $V_{REF}$, the output of the comparator 357 will be at a logic "1" level. When the voltage $V_{IN}$ on the second node N2 is less than $V_{REF}$, the output of the comparator 357 will be at a logic "0" level. In this exemplary configuration, the high output impedance of the node N2 is well suited for performing the comparison operation.

In operation, the DC baseband current which is being measured flows from the first node INT_0 into the first current sink circuit 351, and a DAC reference current (denoted $I_{REF}$), which corresponds to a given digital DAC code, is output from the current DAC circuit 356. If the DAC reference current is greater than the DC baseband current, the voltage $V_{IN}$ generated on the second node N2 will be greater than $V_{REF}$, which causes the output of the comparator 357 to be at logic "1" level. In response to the logic "1" output from the comparator 357, the calibration control logic will determine that the DC baseband current which is being measured is less than the DAC reference current and, in response, will generate a control code to cause the current DAC circuit 356 to reduce the DAC reference current.

On the other hand, if the DAC reference current is less than the DC baseband current, the voltage $V_{IN}$ generated on the second node N2 will be less than $V_{REF}$, which causes the output of the comparator 357 to be at logic "0" level. In response to the logic "0" output from the comparator 357, the calibration control logic will determine that the DC baseband current which is being measured is greater than the DAC reference current and, in response, will generate a control code to cause the current DAC circuit 356 to increase the DAC reference current.

In the exemplary configuration, the comparison results at the output of the comparator 357 are tracked by the calibration control logic as the DAC reference current $I_{REF}$ is adjusted (either increased or decreased). When the output of the comparator 357 toggles from 0→1 or from 1→0, this provides an indication that the latest DAC code corresponds to the DAC reference current $I_{REF}$ which is equal to, or substantially equal to, the DC baseband current that is being measured. In other words, the current DAC circuit 356 is adjusted to find a DAC code which makes the DAC reference current $I_{REF}$ to be as close as possible to the DC baseband current that is being measured, wherein the final code setting of the current DAC circuit 356 will provide an estimate of the magnitude of the DC baseband current.

Furthermore, in a similar manner, to measure a baseband current on the second node INT_1, the switch SW1 is activated (closed), the switch SW0 is deactivated (opened), and the switch SW2 is deactivated (opened). In this configuration, the second current sink circuit 352 is activated where the second transistor 354 becomes a diode-connected MOSFET with its drain and gate terminals coupled together and to the first node N1. In addition, the second transistor 354 (in the diode-connected MOSFET configuration) and the mirror transistor 355 form a current mirror circuit. In some embodiments, the current mirror circuit, which is formed by the second transistor 354 (in the diode-connected configuration) and the mirror transistor 355, is configured to provide a 1:1 current mirror ratio. In other embodiments, the current mirror circuit is configured to scale the input current by a factor of M, where M<1 or where M>1. In some embodiments, the current mirror circuit formed by the second transistor 354 (in the diode-connected configuration) and the mirror transistor 355 is configured to provide the same current mirror ratio as the current mirror circuit formed by the first transistor 353 (in the diode-connected configuration) and the mirror transistor 355.

In calibration mode, the RF signal generator system is configured so that a DC current, which corresponds to one of the $I^+$, $I^-$, $Q^+$, or $Q^-$ baseband currents, flows from the second node INT_1 into the second current sink circuit 352 and through the second transistor 354. The current measurement circuitry 350 compares the DC baseband current (being measured) with different DAC reference currents using the same process as discussed above to determine a DAC reference current $I_{REF}$ which is equal to, or substantially equal to, the DC baseband current that is being measured. An exemplary calibration process in this regard will be discussed in further detail below in conjunction with, e.g., FIG. 10.

The current DAC circuit 356 may be implemented using any high-resolution current-output DAC architecture, which is suitable for the given application. The general function of the current DAC circuit 356 is to convert a digital input code (provided from the calibration control logic) to an analog current (e.g., DAC reference current $I_{REF}$) which is output from the current DAC circuit 356. As is known in the art, a current mode DAC architecture replicates a reference current source in each branch of the DAC, wherein the current sources are connected parallel to each other. In addition, the current sources are connected to an output node via respective MOSFET switches which are controlled by the digital input code. Each branch current is switched off or on based on the digital input code, and the current output from each activated branch of the DAC is summed to generate the analog output current.

In some embodiments, as noted above, the current DAC circuit 356 comprises a segmented DAC framework comprising a coarse binary-weighted DAC segment, and a fine thermometer-coded DAC segment, which allows the analog output current of the current DAC circuit 356 to be digitally programmed using coarse bits and fine bits. The coarse binary-weighted DAC segment is utilized to generate an output current close to a target current level (e.g., the baseband current being measured), while the fine thermometer-coded DAC segment is utilized for fine-tune adjustment of the output current to converge closer to the target current level. It is to be noted that the current DAC circuit 356 can be designed with relaxed requirements in that, e.g., the least significant bit (LSB) size of the fine thermometer-coded DAC segment does not have to be critically related to the LSB size of the coarse binary-weighted DAC segment.

More specifically, since the current measurement circuitry 350 is configured as a current comparator circuit which compares the input baseband current to be measured with the DAC reference current $I_{REF}$, and adjusts the magnitude of the DAC reference current $I_{REF}$ until the DAC reference current $I_{REF}$ is determined to be equal or substantially equal to a magnitude of the input baseband current being measured, there is no requirement for correlating/calibrating the LSB sizes of the coarse and fine DAC segments. The coarse DAC segment is utilized to set the magnitude of the DAC reference current $I_{REF}$ within a tuning range of the fine DAC segment, while the fine DAC segment is utilized to fine tune the magnitude of the DAC reference current $I_{REF}$ to converge as close as possible to the magnitude of the baseband current being measured. As long as the coarse DAC segment can be used to set the magnitude of the DAC reference current $I_{REF}$ within the tuning range of the fine DAC segment, the DC baseband currents (e.g., $I^+$, $I^-$, $Q^+$, $Q^-$) can be compared against each other with high precision (resolution) by means of the current measurement circuitry 350.

Furthermore, in some embodiments, the current DAC circuit 356 is configured to have a programmable range control which is commensurate with the range of gain settings of the baseband signal input stage 310 (FIG. 3A). As noted above, in the exemplary embodiment of FIG. 3A, the effective widths of the transistors 311, 312, 313, and 314 of the baseband signal input stage 310 can be adjusted to increase or decrease the baseband current levels in the I/Q signal paths over a given range, where a highest baseband current level (e.g., 350 uA) is about 10× greater than a lowest baseband current level (e.g., 35 uA). In this regard, the current measurement range of the current measurement circuitry 350 can be scaled to match the baseband current levels that are generated by the baseband signal input stage 310.

For example, in some embodiments, the current DAC circuit 356 is configured to operate over the full range of baseband current levels that can be generated by the baseband signal input stage 310. The current DAC circuit 356 comprises a scaling tuning knob (e.g., a pre-scaler adjustment knob) to scale the current DAC circuit 356 to generate output current levels that are commensurate with the baseband current levels in the I/Q signals paths, which are generated for a given gain step setting of the baseband signal input stage 310. In some embodiments, the scaling of the current DAC circuit 356 is configured to track the scaling of the baseband signal input stage 310 using control signals that are "ganged" together such that when the gain of the baseband signal input stage 310 is adjusted, the DAC current output range of the current DAC circuit 356 is automatically scaled so that the current measurement range of the current measurement circuitry 350 is commensurate with the adjusted I/Q baseband current levels.

In some embodiments, the current DAC circuit 356 can be configured to enable scaling of the LSB size of the coarse DAC segment and/or the fine DAC segment. For example, if the baseband current levels increase or decrease by a given amount due to a change in the baseband gain setting, the LSB current can be adjusted by the same amount to scale the current output range of the current DAC circuit 356. The LSB size can be scaled using known techniques. For example, in embodiments wherein a DAC segment comprises an array of current sources which are biased using a current mirror having a diode-connected transistor coupled to mirror transistors (current sources) in the various DAC cells, the effective width of the diode-connected transistor can be scaled (increased or decreased) to change the current mirror ratio, and thus, change the amount of current generated by the mirror transistors. For example, if the effective width of the diode-connected transistor of the current mirror increases by a factor of 2 (2×), the amount of current generated by the mirror transistors (current sources) decreases by 2×.

Figure 4A:
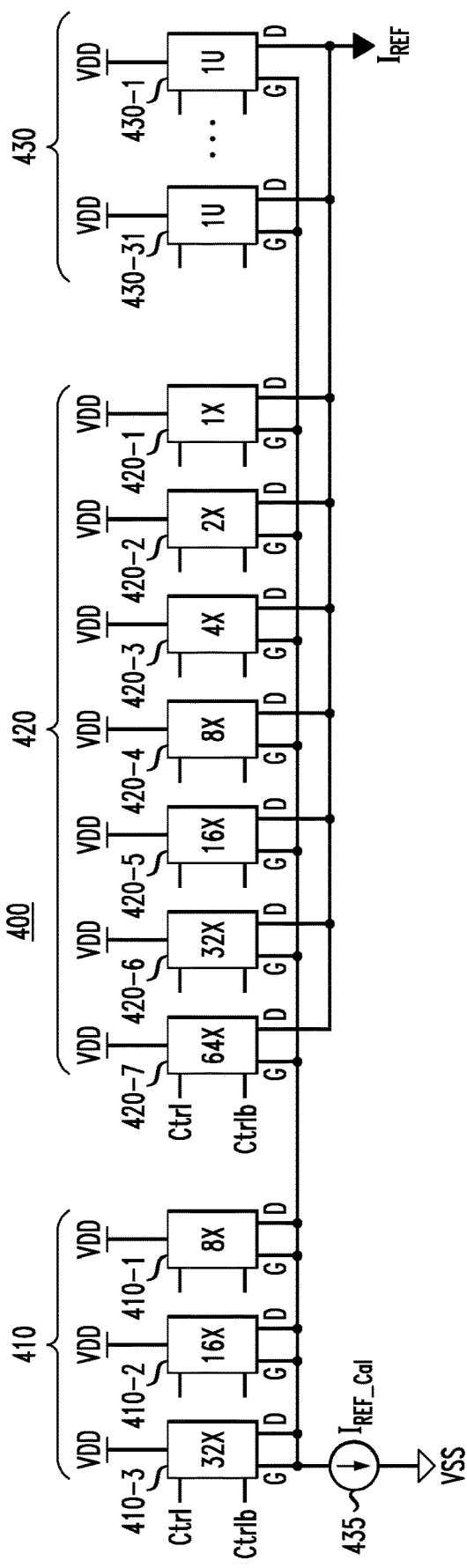
FIGS. 4A, 4B, and 4C schematically illustrate a current mode DAC which can be implemented in the current measurement circuitry of FIG. 3B, according to an exemplary embodiment of the disclosure.
Figure 4C:
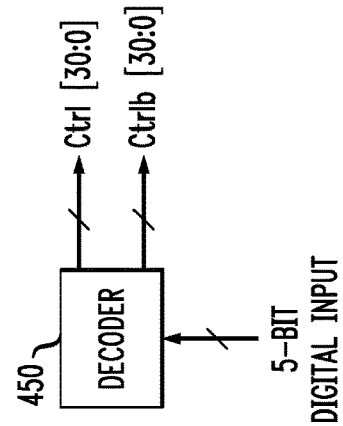
Figure 4B:
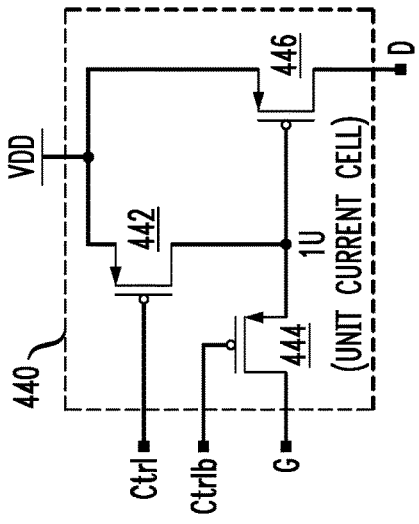

FIGS. 4A, 4B, and 4C schematically illustrate a current mode DAC 400 which can be implemented in the current measurement circuitry 350 of FIG. 3B, according to an exemplary embodiment of the disclosure. As shown in FIG. 4A, the current mode DAC 400 comprises a segmented DAC architecture comprising a prescaler DAC segment 410, a coarse DAC segment 420, a fine DAC segment 430, and a current source 435. The prescaler DAC segment 410 comprises a plurality (e.g., 3) of adjustable (i.e., selectable) diode-connected transistors 410-1, 410-2, and 410-3. The coarse DAC segment 420 comprises a plurality (e.g., 7) of current sources 420-1, 420-2, 420-3, 420-4, 420-5, 420-6, and 420-7. The fine DAC segment 430 comprises a plurality (e.g., 31) of current sources 430-1, ..., 430-31. The current source 435 provides an input current (denoted $I_{REF\_Cal}$) which sets the current through the diode-connected transistors 410-1, 410-2, and 410-3 of the prescaler DAC segment 410.

The prescaler DAC segment 410 operates as a diode-connected transistor that is used to develop a bias voltage for the DAC cells, with a width that is programmable with M-bit (e.g., M=3) resolution. The programmable width can be used to prescale the current output level of the current mode DAC 400 based on the gain setting of the baseband signal input stage 310. In some embodiments, the coarse DAC segment 420 comprises an N-bit (e.g., N=7) binary-weighted current DAC, and the fine DAC segment 430 comprises a P-bit (e.g., P=5) thermometer-coded current DAC (also referred to as unary-weighted). The output current of the current mode DAC 400 is a sum of the current outputs from the coarse DAC segment 420 and the fine DAC segment 430. For a given baseband gain setting, the setting of the prescaler DAC segment 410 remains fixed, while the current outputs of the coarse DAC segment 420 and fine DAC segment 430 are dynamically adjusted via digital control to adjust the magnitude of the DAC output current (e.g., reference current $I_{REF}$, FIG. 3B) to match the magnitude of the baseband current being measured.

In some embodiments, the DAC segments 410, 420, and 430 utilize a same unit current cell to reduce mismatches between the currents of the DAC segments 410, 420, and 430. FIG. 4B schematically illustrates a unit current cell (1U) 440 according to an exemplary embodiment of the disclosure, which is utilized to implement the respective unit cells of the DAC segments 410, 420, and 430. The unit current cell 440 comprises PMOS transistors 442, 444, and 446. The PMOS transistor 442 comprises a gate terminal that is coupled to a first control node Ctrl, a source terminal coupled to the positive power supply node VDD, and a drain terminal that is coupled to a gate terminal of the PMOS transistor 446. The PMOS transistor 444 comprises a gate terminal that is coupled to a second control node Ctrlb, a source terminal coupled to the gate terminal of the PMOS transistor 446, and a drain terminal coupled to a node G, which is a gate bias voltage node for the current mode DAC 400. The PMOS transistor 446 comprises a source terminal coupled to the positive power supply node VDD, and a drain terminal coupled to a current output node D. The control terminals Ctrl and Ctrlb receive complementary controls which enable or disable the unit cell.

As shown in FIG. 4A, the prescaler DAC segment 410 is configured to provide an adjustable reference current mirror circuit, wherein gate (G) and drain (D) terminals are connected to form an adjustable diode-connected transistor that is biased by a reference current $I_{REF}$_Cal. In some embodiments, each adjustable diode-connected transistor 410-1, 410-2, and 410-3 of the prescaler DAC segment 410 comprises a plurality of the unit current cells 440 of FIG. 4B connected in parallel. For example, in some embodiments, the smallest (e.g., least significant bit, 8×) adjustable diode-connected transistor 410-1 of the prescaler DAC segment 410 comprises eight (8) unit current cells 440 connected in parallel, and the remaining adjustable diode-connected transistors 410-2 and 410-3 are weighted by having an increasing number of the unit current cells 440. For example, the adjustable diode-connected transistor 410-2 (16×) comprises 16 of the unit current cells 440 connected in parallel, and so on.

Further, each current source 420-1, 420-2, 420-3, 420-4, 420-5, 420-6, and 420-7 of the coarse DAC segment 420 comprises a plurality of the unit current cells 440 of FIG. 4B connected in parallel. For example, in some embodiments, the smallest (e.g., least significant bit, 1×) current source 420-1 of the coarse DAC segment 420 comprises eight (8) unit current cells 440 connected in parallel, and the remaining binary-weighted current sources 420-2, 420-3, 420-4, 420-5, 420-6, and 420-7 have an increasing amount of the unit current cells 440. For example, the current source 420-2 (2×) comprises sixteen (16) of the unit current cells 440 connected in parallel, and so on.

Moreover, in some embodiments, each current source 430-1, ..., 430-31 of the fine DAC segment 430 comprises a single unit current cell 440 (1U). This configuration provides a 4× overlap (2 bits) between the binary-weighted coarse DAC segment 420 and the thermometer-coded fine DAC segment 430, enabling a 10-bit resolution for the current mode DAC 400, e.g., 7 bits (coarse DAC)+5 bits (fine DAC)−2 bits (overlap)=10 bits. In this exemplary configuration, while a 10-bit resolution is realized, a 12-bit control signal is applied to the current mode DAC 400 to take advantage of the 4× overlap and not depend on matching the LSB sizes of the coarse and fine DAC segments 420 and 430. As shown in FIG. 4C, the 5-bit digital control signal for the fine DAC segment 430 is input to a decoder 450 to generate a 31-bit control signal Ctrl [30:0] and a 31-bit complementary control signal Ctrlb [30:0], to selectively activate respective current sources 430-1, ..., 430-31 of the thermometer-coded fine DAC segment 430.

Figure 5:
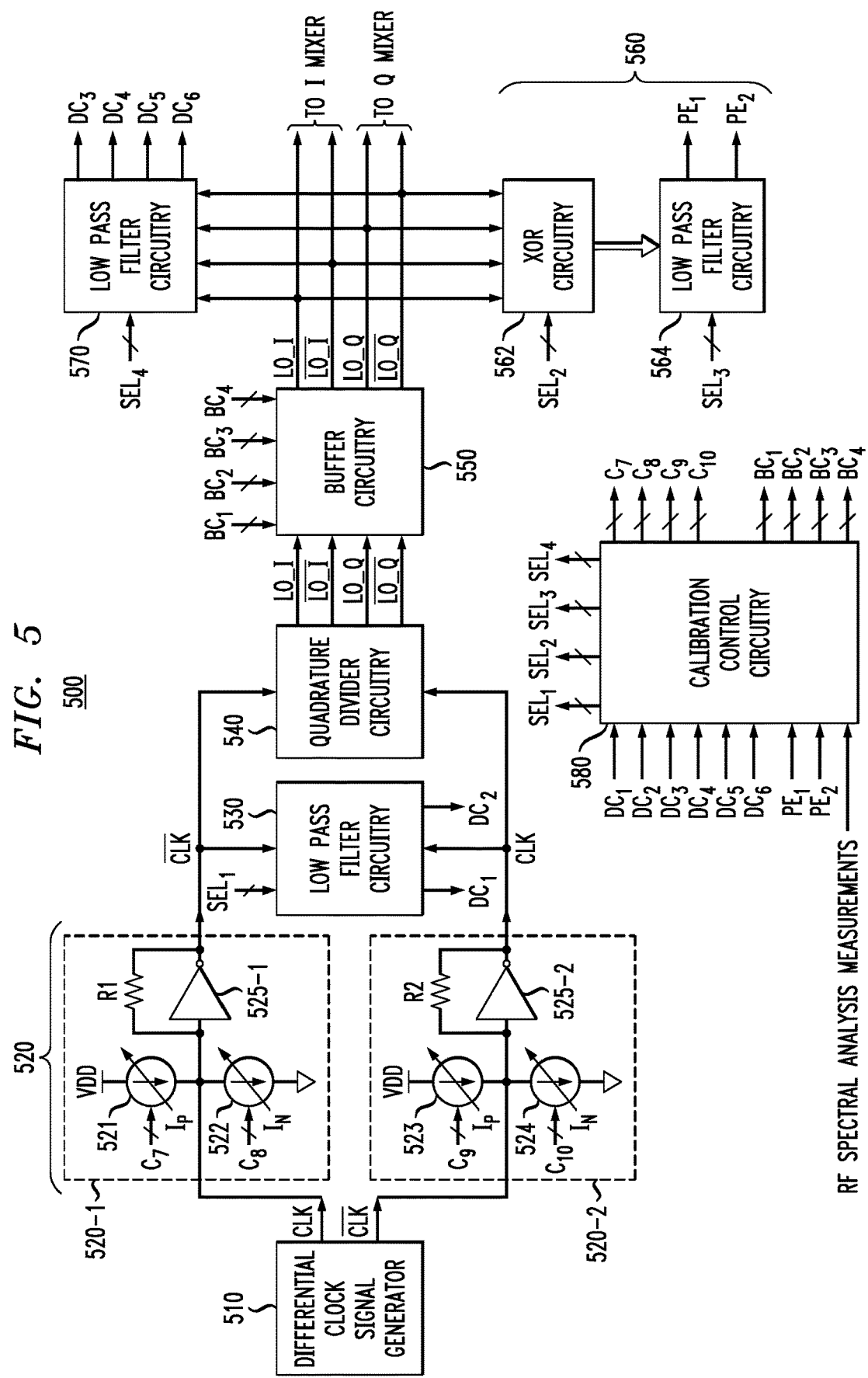
FIG. 5 schematically illustrates a quadrature LO signal generation and driver system which comprises actuator and sensor circuitry to enable phase error adjustment of quadrature LO signals in an RF signal generation system, according to an exemplary embodiment of the disclosure.

FIG. 5 schematically illustrates a quadrature LO signal generation and driver system which comprises actuator and sensor circuitry to enable phase error adjustment of quadrature LO signals in an RF signal generation system, according to an exemplary embodiment of the disclosure. In particular, FIG. 5 schematically illustrates a system 500 which comprises a differential clock generator 510, a clock receiver stage 520, a first sensor circuit comprising low pass filter circuitry 530 (alternatively, first sensor circuit 530), divider circuitry 540 (e.g., quadrature divider circuitry), buffer circuitry 550, a second sensor circuit 560 comprising eXclusive-OR (XOR) circuitry 562 and low pass filter circuitry 564, a third sensor circuit comprising low pass filter circuitry 570 (alternatively, a third sensor circuit 570), and calibration control logic 580.

The clock receiver stage 520 comprises a first clock receiver stage 520-1 and a second clock receiver stage 520-2. The first clock receiver stage 520-1 comprises current actuator circuits 521 and 522, and a first resistive feedback inverter circuit comprising an inverter 525-1 and feedback resistor R1. Similarly, the second clock receiver stage 520-2 comprises current actuator circuits 523 and 524, and a second resistive feedback inverter circuit comprising an inverter 525-2 and feedback resistor R2. In some embodiments, the current actuator circuits 521, 522, 523, and 524 are implemented using digitally programmable DAC circuits that are configured to generate respective pull up currents $I_P$ and pull-down currents $I_N$ for performing duty cycle calibration operations to adjust the duty cycles of differential clock signals generated by the differential clock signal generator 510, as discussed in further detail below. In some embodiments, the current actuator circuits 521, 522, 523, and 524 are implemented using digitally programmable resistive DAC circuits. In other embodiments, the current actuator circuits 521, 522, 523, and 524 are implemented using digitally programmable current mode DAC circuits.

In some embodiments, the differential clock signal generator 510, the clock receiver stage 520, and the divider circuitry 540 collectively comprise an exemplary embodiment of the LO signal generator circuitry 170 (FIG. 1), and the buffer circuitry 550 comprises an exemplary embodiment of the LO signal output driver circuitry 180 (FIG. 1). Further, in some embodiments, the first, second, and third sensor circuits 530, 560, and 570, the current actuator circuits 521, 522, 523, and 524, and the calibration control logic 580 collectively comprise components of an exemplary embodiment of the calibration system 190 (FIG. 1) which is configured to enable phase error correction of the quadrature LO signals that are applied to the I and Q mixers of the mixer stage 140 of the RF signal generator system 100.

The differential clock signal generator 510 is configured to generate a differential clock signal (CLK, $\overline{CLK}$) comprising a non-inverted clock signal CLK and an inverted clock signal $\overline{CLK}$, wherein the clock signals CLK and $\overline{CLK}$ ideally have the same frequency (e.g., 10 GHz) and magnitude, but with a 180-degree phase difference. The differential clock signal (CLK, $\overline{CLK}$) is input to the clock receiver stage 520 which is configured as an input buffer/driver stage to drive the input of the divider circuitry 540. In some embodiments, the divider circuitry 540 comprises a quadrature divider circuit that is configured to convert the differential clock signal (CLK, $\overline{CLK}$) into complementary quadrature LO signals LO_I, LO_Q, $\overline{LO\_I}$, and $\overline{LO\_Q}$ with respective phases 0°, 90°, 180°, and 270°, wherein the quadrature LO signals each have a frequency that is one-half (e.g., divide by 2) the frequency of the non-inverted and inverted clock signals CLK and $\overline{CLK}$. For example, in a non-limiting exemplary embodiment, the differential clock signal (CLK, $\overline{CLK}$) has a frequency of about 10 GHz, and the complementary quadrature LO signals LO_I, LO_Q, $\overline{LO\_I}$, and $\overline{LO\_Q}$ have a frequency of about 5 GHz. The buffer circuitry 550 is configured to drive the inputs of the I and Q mixers of the mixer stage with the complementary quadrature LO signals LO_I, LO_Q, $\overline{LO\_I}$, and $\overline{LO\_Q}$ that are output from the divider circuitry 540.

As noted above, the quadrature LO signal generation and driver system 500 comprises actuator and sensor circuitry that is utilized to enable phase error adjustment of the quadrature LO signals that are applied to the I/Q mixer stage of an RF signal generation system. As schematically illustrated in FIG. 5, the calibration control logic 580 generates various control signals to control the actuators and sensor circuits to perform duty cycle and phase error calibration operations. For example, in some embodiments, the calibration control logic 580 generates digital control signals $SEL_1$, $SEL_2$, $SEL_3$, and $SEL_4$ to control operation of the respective low pass filter circuits 530, 564, and 570, and the XOR circuitry 562 during calibration operations. Further, in some embodiments, the calibration control logic 580 generates digital calibration control signals such as (i) digital control signals $C_7$, $C_8$, $C_9$, and $C_{10}$ (referred to herein as duty cycle control signals) which are applied to the clock receiver stage 520 to perform duty cycle calibration operations, and (ii) digital control signals $BC_1$, $BC_2$, $BC_3$, and $BC_4$ (referred to herein as buffer control signals) which are applied to the buffer circuitry 550 to perform phase error calibration operations.

The calibration control logic 580 generates the digital calibration control signals for duty cycle and phase error calibration operations in response to sensor signals that are generated by the sensor circuitry. For example, in some embodiments, the calibration control logic 580 receives sensor signals $DC_1$ and $DC_2$ that are generated and output from the first sensor circuit 530, and sensor signals $DC_3$, $DC_4$, $DC_5$, and $DC_6$ that are generated and output from the third sensor circuit 570. Further, in some embodiments, the calibration control logic 580 receives sensor signals $PE_1$ and $PE_2$ that are generated and output from the second sensor circuit 560.

In some embodiments, phase error calibration of the quadrature LO signals is performed, at least in part, by calibrating the duty cycles of the differential clock signals CLK and $\overline{CLK}$ which are used to generate the quadrature LO signals. More specifically, in some embodiments, phase error calibration is achieved through operation of the current actuator circuits 521, 522, 523, and 524 of the first and second clock receiver stages 520-1 and 520-2, and the first sensor circuit 530 that is coupled to the outputs of the first and second clock receiver stages 520-1 and 520-2. The clock receiver stage 520 employs the current actuator circuits 521, 522, 523, and 524 as a mechanism to provide current adjustment for calibrating the duty cycles of the non-inverted and inverted clock signals CLK and $\overline{CLK}$ that are output from the clock receiver stage 520 to ensure that the non-inverted and inverted clock signals CLK and $\overline{CLK}$ each have a duty cycle of 50% (or substantially 50%). The first sensor circuit 530 is configured to detect the duty cycles of the non-inverted and inverted clock signals CLK and $\overline{CLK}$ that are output from the clock receiver stage 520, and generate the sensor signals $DC_1$ and $DC_2$ (e.g., DC voltage signals) which are indicative of the detected duty cycles of the non-inverted and inverted clock signals CLK and $\overline{CLK}$ that are output from the clock receiver stage 520.

More specifically, as schematically shown in FIG. 5, in the first clock receiver stage 520-1, the current actuator circuits 521 and 522 are digitally controlled by the respective duty cycle control signals $C_7$ and $C_8$ to controllably adjust the amount of pull up current $I_P$ and pull-down current $I_N$ output from the respective current actuator circuits 521 and 522. The magnitudes of the currents $I_P$ and $I_N$ are digitally controlled to set a switching threshold point of the resistive feedback inverter circuit of the first clock receiver stage 520-1 to achieve a 50% duty cycle (or nearly 50% duty cycle) for the clock signal that is output from the first clock receiver stage 520-1.

Similarly, in the second clock receiver stage 520-2, the current actuator circuits 523 and 524 are digitally controlled by the respective duty cycle control signals $C_9$ and $C_{10}$ to controllably adjust the amount of pull up current $I_P$ and pull-down current $I_N$ output from the respective current actuator circuits 523 and 524. The magnitudes of the currents $I_P$ and $I_N$ are digitally controlled to set a switching threshold point of the resistive feedback inverter circuit of the second clock receiver stage 520-2 to achieve a 50% duty cycle (or nearly 50% duty cycle) for the clock signal that is output from the second clock receiver stage 520-2.

In some embodiments, the first sensor circuit 530 comprises low pass filter circuitry (e.g., a low pass RC filter circuit) having a low cut-off frequency, which is configured to filter the clock signal waveforms output from the first and second clock receiver stages 520-1 and 520-2, and generate respective sensor signals $DC_1$ and $DC_2$ which are indicative of the duty cycles of the respective clock signals that are output from the first and second clock receiver stages 520-1 and 520-2. This configuration is based on the fact that an average DC voltage value (e.g., DC offset) of a clock signal waveform with a rail-to-rail swing is proportional to the duty cycle of the clock signal. In this regard, the first sensor circuit 530 is configured to low pass filter the clock signal waveform that is output from the first clock receiver stage 520-1 and generate the sensor signal $DC_1$ which comprises a DC voltage that is proportional to the duty cycle of the clock signal that is output from the first clock receiver stage 520-1. Similarly, the first sensor circuit 530 is configured to low pass filter the clock signal waveform that is output from the second clock receiver stage 520-2 and generate the sensor signal $DC_2$ which comprises a DC voltage that is proportional to the duty cycle of the clock signal that is output from the second clock receiver stage 520-2.

In some embodiments, the calibration control logic 580 is configured to process the sensor signals $DC_1$ and $DC_2$ (which are output from the first sensor circuit 530) to determine the presence, if any, of duty cycle errors of the complementary clock signals that are output from the clock receiver stage 520. A duty cycle of either >50% or <50% is indicative of a duty cycle error which needs to be corrected. The calibration control logic 580 processes the sensor signals $DC_1$ and $DC_2$ to determine whether or not the sensor signals $DC_1$ and $DC_2$ have the same (or substantially the same) DC voltage levels which is indicative of a 50% duty cycle of the clock signals that are output from the clock receiver stage 520. If the calibration logic 580 determines a duty cycle error, the calibration logic 580 generates the proper duty cycle control signals $C_7$, $C_8$, $C_9$, and $C_{10}$ to adjust the magnitude of the currents $I_P$ and $I_N$ that are output from the respective current actuator circuits 521, 522, 523, and 524, as needed, so that both sensor signals $DC_1$ and $DC_2$ have the same (or substantially the same) DC voltage level which is indicative of a 50% duty cycle for the (duty cycle adjusted) differential clock signals that are output from the clock receiver stage 520.

In some embodiments, the first sensor circuit 530 comprises a single low pass filter circuit that is selectively connected to the outputs of the first and second clock receiver stages 520-1 and 520-2 under control of the digital control signal $SEL_1$. In such embodiments, the digital control signal $SEL_1$ may comprise (i) a first digital value (e.g., 00) to deactivate the first sensor circuit 530 during normal operation, (ii) a second digital value (e.g., 01) to selectively connect the output of the first clock receiver stage 520-1 to an input of the low pass filter circuit to detect the duty cycle of the clock signal output from the first clock receiver stage 520-1 and generate the first sensor signal $DC_1$, and (iii) a third digital value (e.g., 10) to selectively connect the output of the second clock receiver stage 520-2 to an input of the low pass filter circuit to detect the duty cycle of the clock signal output from the second clock receiver stage 520-2 and generate the second sensor signal $DC_2$. In other embodiments, the first sensor circuit 530 comprises two low pass filter circuits, wherein a first low pass filter circuit is used to measure the duty cycle of the clock signal that is output from the first clock receiver stage 520-1, and a second low pass filter circuit is used to measure the duty cycle of the clock signal that is output from the second clock receiver stage 520-2.

It is to be noted that the duty cycle calibration of the differential clock signals CLK and $\overline{\text{CLK}}$, which is achieved through operation of the current actuator circuits 521, 522, 523, and 524 and the first sensor circuit 530, initially ensures a 50% duty cycle of the differential clock signals that are input to the divider circuitry 540. The initial duty cycle calibration serves to reduce phase error of the quadrature LO signals at the output of the buffer circuitry 550. In other embodiments, as explained in further detail below, the current actuator circuits 521, 522, 523, and 524 and the first sensor circuit 530 are further utilized to provide fine calibration of detected phase errors of the quadrature LO signals at the output of the buffer circuitry 550.

In some embodiments, coarse phase error calibration of the quadrature LO signals (which are input to the mixer stage) is achieved by operation of the buffer circuitry 550, the second sensor circuit 560, and (optionally), the third sensor circuit 570. In particular, in some embodiments, the buffer circuitry 550 comprises a segmented driver stage architecture comprising a plurality of digitally controlled driver stages that are configured to achieve coarse phase error adjustment (e.g., adjusting phase delay between the LO_I and LO_Q signals) by adjusting the drive strength of segmented buffer circuitry 550 to cover a wide range for delay correction without adversely affecting the load on the divider circuitry 540. Exemplary embodiments of the programmable buffer circuitry 550 will be discussed in further detail below in conjunction with FIGS. 6A, 6B, and 7A-7C.

The second sensor circuit 560 is configured to detect phase errors between the LO_I and LO_Q signals and between the $\overline{\text{LO\_I}}$ and $\overline{\text{LO\_Q}}$ signals and generate sensor signals $PE_1$ and $PE_2$ (or phase error signals) which indicate an amount of phase error between the LO_I and LO_Q signals and between the $\overline{\text{LO\_I}}$ and $\overline{\text{LO\_Q}}$ signals. As schematically shown in FIG. 5, the XOR circuitry 562 comprises inputs that receive the complementary quadrature LO signals LO_I, $\overline{\text{LO\_I}}$, LO_Q, and $\overline{\text{LO\_Q}}$, which are output from the buffer circuitry 550. The XOR circuitry 562 processes the complementary quadrature LO signals LO_I, $\overline{\text{LO\_I}}$, LO_Q, and $\overline{\text{LO\_Q}}$ to generate output signals that correspond to phase errors. The low pass filter circuitry 564 filters the output waveforms of the XOR circuitry 562 to generate the phase error signals $PE_1$ and $PE_2$ which comprise DC voltages that are proportional to the detected phase errors between the LO_I and LO_Q signals and between the $\overline{\text{LO\_I}}$ and $\overline{\text{LO\_Q}}$ signals.

The phase error signals $PE_1$ and $PE_2$ are processed by the calibration control circuitry 580. Depending on the amount of phase error detected, the calibration control circuitry 580 generates buffer control signals $BC_1$, $BC_2$, $BC_3$, and $BC_4$, as needed, to cause a coarse phase error adjustment of the complementary quadrature LO signals LO_I, $\overline{\text{LO\_I}}$, LO_Q, and $\overline{\text{LO\_Q}}$. Further, in some embodiments, following coarse phase error calibration, if there remains a small amount of residual phase error (as indicated by newly generated phase error signals $PE_1$ and $PE_2$), the calibration control circuitry 580 updates control signals $C_7$, $C_8$, $C_9$, and $C_{10}$, as needed, to adjust the magnitudes of the currents $I_P$ and $I_N$ that are output from the respective current actuator circuits 521, 522, 523, and 524, to slightly adjust the duty cycles of the differential clock signals at the output of the clock receiver stage 520, which causes a fine phase error adjustment of the complementary quadrature LO signals LO_I, $\overline{\text{LO\_I}}$, LO_Q, and $\overline{\text{LO\_Q}}$ that are output from the buffer circuitry 550 (with the buffer circuitry 550 programmed with the coarse phase error calibration settings). In this regard, while the programmable buffer circuitry 550 can be used to obtain coarse phase error adjustment (for range optimization), the current actuator circuits 521, 522, 523, and 524 in the clock receiver stage 520 can be used to obtain fine phase error adjustment (for resolution optimization).

As further schematically shown in FIG. 5, the third sensor circuit 570 comprises inputs which receive the complementary quadrature LO signals LO_I, $\overline{\text{LO\_I}}$, LO_Q, and $\overline{\text{LO\_Q}}$ that are output from the buffer circuitry 550. In some embodiments, the third sensor circuit 570 comprises low pass filter circuitry that is configured to low pass filter the complementary quadrature LO signals LO_I, $\overline{\text{LO\_I}}$, LO_Q, and $\overline{\text{LO\_Q}}$ to detect duty cycle errors, and generate sensor signals $DC_3$, $DC_4$, $DC_5$, and $DC_6$ which comprise DC voltages that are proportional to detected duty cycle errors of the respective signals LO_I, $\overline{\text{LO\_I}}$, LO_Q, and $\overline{\text{LO\_Q}}$. The sensor signals $DC_3$, $DC_4$, $DC_5$, and $DC_6$ are digitized by an analog-to-digital converter (ADC) circuit and the digitized signals are processed by the calibration control circuitry 580, wherein the calibration control circuitry 580 generates control signals that are input to actuator circuitry to adjust the duty cycles of one or more of the complementary quadrature LO signals LO_I, $\overline{\text{LO\_I}}$, LO_Q, and $\overline{\text{LO\_Q}}$, as needed. The duty cycle calibration of the complementary quadrature LO signals LO_I, $\overline{\text{LO\_I}}$, LO_Q, and $\overline{\text{LO\_Q}}$ can be implemented using different calibration techniques. For example, in some embodiments, duty cycle errors of the complementary quadrature LO signals LO_I, $\overline{\text{LO\_I}}$, LO_Q, and $\overline{\text{LO\_Q}}$ can be corrected using current actuator circuitry and techniques as discussed in further detail below in conjunction with FIG. 6C in which current is injected in the LO clock signal paths to adjust the duty cycles, as needed.

In other embodiments, as an alternative to correcting the duty cycles of the complementary quadrature LO signals LO_I, $\overline{\text{LO\_I}}$, LO_Q, and $\overline{\text{LO\_Q}}$ themselves, calibration techniques can be implemented to compensate for the effects of such duty cycle errors by configuring the calibration control circuitry 580 to generate control signals to adjust the reference currents of the first and second DAC circuits 121 and 122 in the I and Q signal paths. This calibration technique is based on the idea that in terms of system performance, duty cycle errors of the complementary quadrature LO signals LO_I, $\overline{\text{LO\_I}}$, LO_Q, and $\overline{\text{LO\_Q}}$ can improperly modulate the amplitudes of the upconverted RF signals, resulting in gain errors, where such errors can be compensated by changing the DAC reference currents. For example, in some embodiments, when one or more of the sensor signals $DC_3$, $DC_4$, $DC_5$, and $DC_6$ (which are output from the third sensor circuit 570) provide an indication of duty cycle error of one or more of the complementary quadrature LO signals LO_I, $\overline{\text{LO\_I}}$, LO_Q, and $\overline{\text{LO\_Q}}$, the calibration control circuitry 580 can generate and apply the first and second control signals $C_1$ and $C_2$ to the respective current actuator circuits 201 and 202, as needed, to adjust the reference current $(I_1-I)$ of the I DAC circuit 121 and/or adjust the reference current $(I_1-Q)$ of the Q DAC circuit 122, as needed, in order to compensate the effects of the duty cycle errors of the complementary quadrature LO signals LO_I, $\overline{\text{LO\_I}}$, LO_Q, and $\overline{\text{LO\_Q}}$.

Figure 6A:
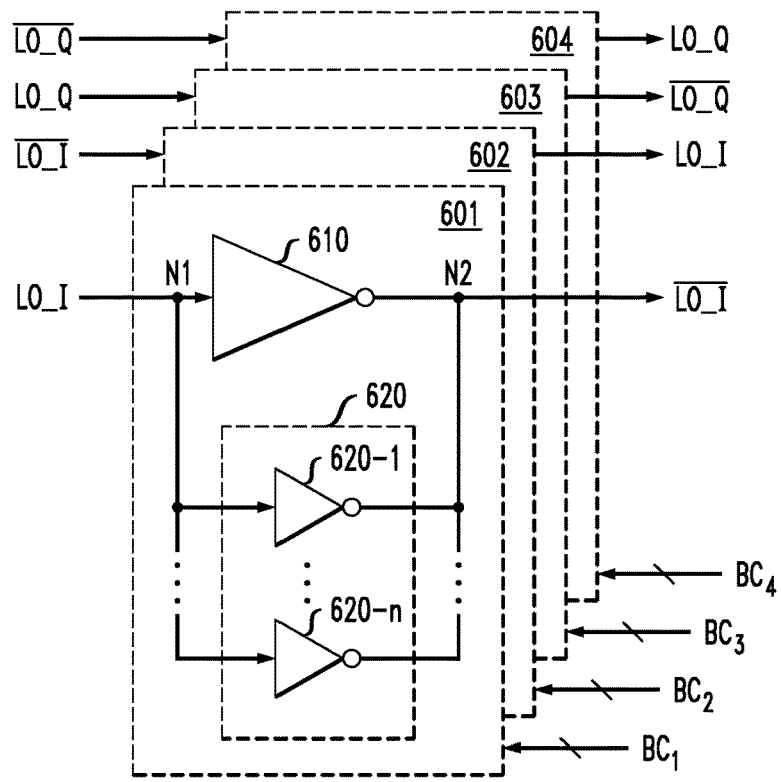
FIGS. 6A and 6B schematically illustrate programmable buffer circuitry which is configured to enable phase error calibration of quadrature LO signals, according to an exemplary embodiment of the disclosure.
Figure 6B:
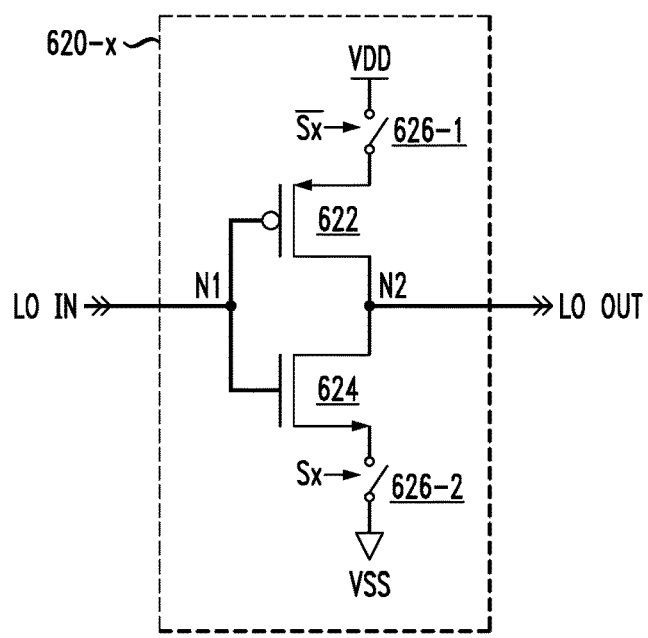

FIGS. 6A and 6B schematically illustrate buffer circuitry which is configured to enable phase error calibration of quadrature LO signals, according to an exemplary embodiment of the disclosure. In some embodiments, FIGS. 6A and 6B illustrate an exemplary embodiment for implementing the buffer circuitry 550 in FIG. 5. FIG. 6A schematically illustrates digitally programmable buffer circuitry 600 which comprises a plurality of LO driver stages 601, 602, 603, and 604 that are configured to drive respective phases of complementary quadrature LO signals LO_I, LO_Q, $\overline{LO\_I}$, and $\overline{LO\_Q}$. The LO driver stages 601, 602, 603, and 604 are digitally controlled by respective buffer control signals $BC_1$, $BC_2$, $BC_3$, and $BC_4$ to enable coarse phase error adjustment by adjusting drive strengths of the LO driver stages 601, 602, 603, and 604.

As schematically illustrated in FIG. 6A, the LO driver stage 601 comprises a segmented architecture which comprises a fixed buffer segment 610 and a programmable buffer segment 620. The fixed buffer segment 610 comprises a single buffer element coupled to and between an input node N1 and output node N2 of the LO driver stage 601. The programmable buffer segment 620 comprises a plurality of buffer elements 620-1, . . . , 620-n connected in parallel between the input node N1 and output node N2 of the LO driver stage 601. The fixed buffer segment 610 provides a fixed drive strength (or baseline strength) to which additional variable drive strength is added by selectively activating one or more of the buffer elements 620-1, . . . , 620-n. In some embodiments, the fixed buffer segment 610 comprises a CMOS inverter circuit. On the other hand, the programmable buffer segment 620 is responsive to a digital buffer control signal (e.g., $BC_1$) to selectively activate/deactivate the buffer elements 620-1, . . . , 620-n to adjust the drive strength of the LO driver stage 601, as needed, to provide coarse adjustment of the phase delay to the LO signal (e.g., LO_I) applied to the input node N1.

FIG. 6B schematically illustrates an exemplary architecture of each buffer element of the programmable buffer segment 620, according to an exemplary embodiment of the disclosure. In particular, FIG. 6B schematically illustrates a buffer element 620-x (where x=1, . . . , n) which incorporates a CMOS inverter having a PMOS transistor 622 and an NMOS transistor 624, which are serially connected between a positive supply voltage node VDD and a negative supply voltage node VSS. A source terminal of the PMOS transistor 622 is selectively connected to the positive supply voltage node VDD through a first switch 626-1. A source terminal of the NMOS transistor 624 is selectively connected to the negative supply voltage node VSS through a second switch 626-2. The PMOS and NMOS transistors 622 and 624 have commonly connected gate terminals which are coupled to the input node N1 of the LO driver stage 601. The PMOS and NMOS transistors 622 and 624 have commonly connected drain terminals which are connected to the output node N2 of the LO driver stage 601.

In some embodiments, the first switch 626-1 comprises a PMOS transistor which is controlled by a switch control signal $\overline{S_x}$ that is applied to a gate terminal thereof, and the second switch 626-2 comprises an NMOS transistor which is controlled by a switch control signal $S_x$ that is applied to a gate terminal thereof. In some embodiments, the switch control signals $S_x$ and $\overline{S_x}$ comprise a complementary pair of digital control signals such the first and second switches 626-1 and 626-2 are concurrently controlled. For example, when $S_x$ is asserted to a logic "1" level, $\overline{S_x}$ is asserted to a logic "0" level, and both switches 626-1 and 626-2 will be turned on (closed). On the other hand, when $S_x$ is asserted to a logic "0" level, $S_x$ is asserted to a logic "1" level, and both switches 626-1 and 626-2 will be turned off (open). In some embodiments, the switch control signals $S_x$ and $\overline{S_x}$ for the given buffer element 620-x are derived from the digital buffer control signal, e.g., $BC_1$, wherein $BC_1$ comprises an n-bit control signal [n:1] that is generated to selectively activate/deactivate the buffer elements 620-1, . . . , 620-n of the programmable buffer segment 620.

It is to be understood that while FIG. 6A depicts the exemplary circuit configuration of the first LO driver stage 601 for ease of illustration, the second LO driver stage 602, the third LO driver stage 603, and the fourth LO driver stage 604 have the same circuit configuration, and operate in a similar manner, as the first LO driver stage 601. Furthermore, FIG. 6B schematically illustrates an exemplary architecture of each buffer element of the programmable buffer segment 620 in each of the LO driver stages 601, 602, 603, and 604. However, programmable buffer segments 620 in the different LO driver stages 601, 602, 603, and 604 are individually controlled by the respective digital buffer control signals $BC_1$, $BC_2$, $BC_3$, and $BC_4$ to enable coarse adjustment of the phase delays of the complementary quadrature LO signals LO_I, $\overline{LO\_I}$, LO_Q, and $\overline{LO\_Q}$ for purposes of phase error calibration of the quadrature LO signals.

Figure 6C:
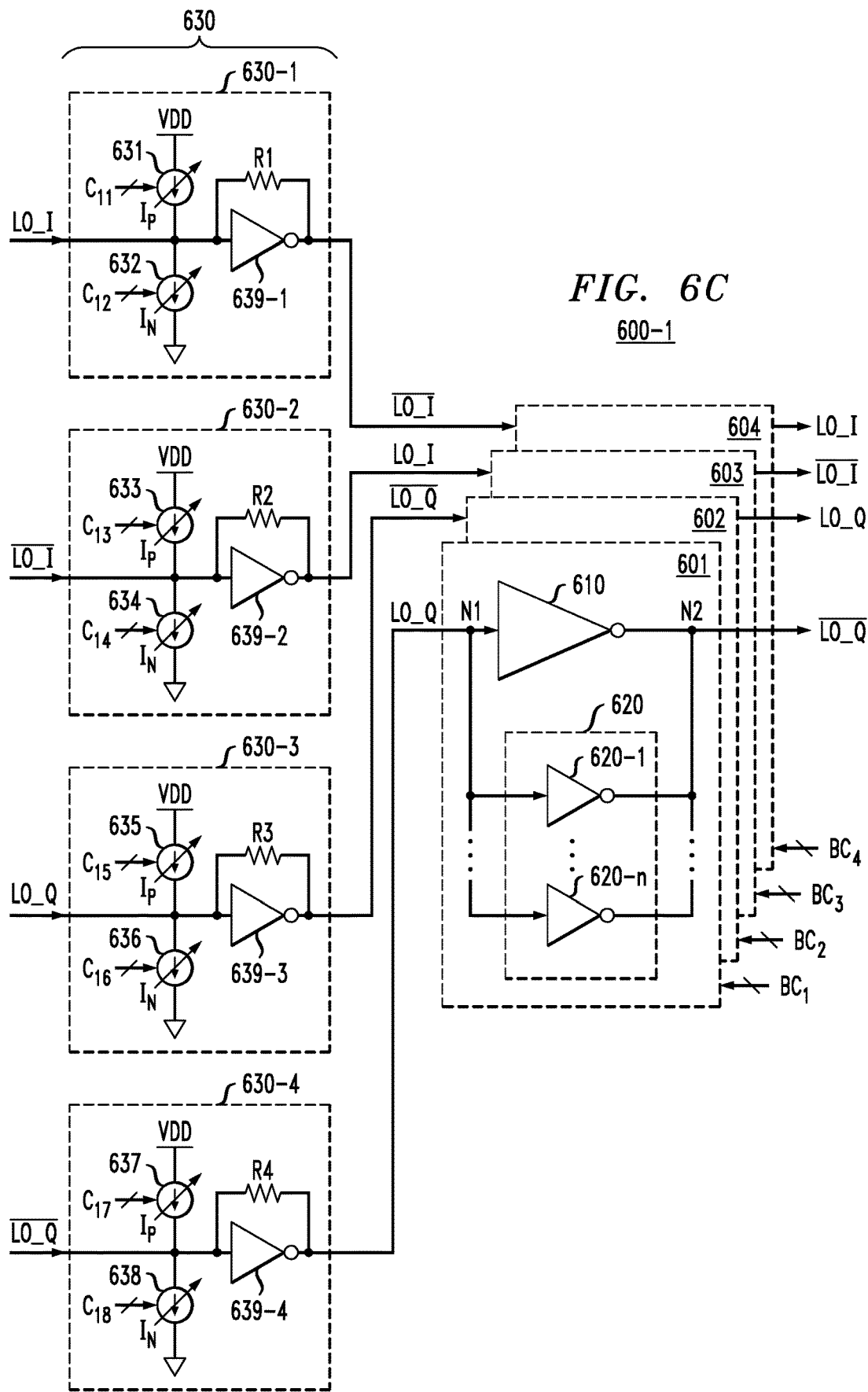
FIG. 6C schematically illustrates buffer circuitry which is configured to enable both phase error calibration and duty cycle calibration of quadrature LO signals, according to an exemplary embodiment of the disclosure.

FIG. 6C schematically illustrates buffer circuitry which is configured to enable both phase error calibration and duty cycle calibration of quadrature LO signals, according to an exemplary embodiment of the disclosure. In particular, FIG. 6C schematically illustrates buffer circuitry 600-1 which comprises the programmable buffer circuitry 600 and associated LO driver stages 601, 602, 603, and 604 (such as shown in FIGS. 6A and 6B), which are configured to provide coarse phase error adjustment of the complementary quadrature LO signals LO_I, LO_Q, $\overline{LO\_I}$, and $\overline{LO\_Q}$ which are output to the I and Q mixers. In addition, the buffer circuitry 600-1 comprises an LO clock receiver stage 630 which is configured to (i) receive and buffer the complementary quadrature LO signals LO_I, LO_Q, $\overline{LO\_I}$, and $\overline{LO\_Q}$ which are generated and output from the quadrature divider circuitry 540, (ii) utilize current actuation techniques as discussed above to inject currents into a first clock signal path (e.g., in-phase LO clock signal path) to correct duty cycle error of the differential in-phase LO signal, LO_I and $\overline{LO\_I}$, and (iii) inject currents into a second clock signal path (e.g., quadrature-phase LO clock signal path) to correct duty cycle error of the differential quadrature-phase LO signal, LO_Q and $\overline{LO\_Q}$.

More specifically, as schematically illustrated in FIG. 6C, the LO clock receiver stage 630 comprises a first LO clock receiver stage 630-1, a second LO clock receiver stage 630-2, a third LO clock receiver stage 630-3, and a fourth LO clock receiver stage 630-4. The first LO clock receiver stage 630-1 comprises current actuator circuits 631 and 632, and a first resistive feedback inverter circuit comprising an inverter 639-1 and a feedback resistor R1. The second LO clock receiver stage 630-2 comprises current actuator circuits 633 and 634, and a second resistive feedback inverter circuit comprising an inverter 639-2 and a feedback resistor R2. The third LO clock receiver stage 630-3 comprises current actuator circuits 635 and 636, and a third resistive feedback inverter circuit comprising an inverter 639-3 and a feedback resistor R3. The fourth LO clock receiver stage 630-4 comprises current actuator circuits 637 and 638, and a fourth resistive feedback inverter circuit comprising an inverter 639-4 and a feedback resistor R4.

In some embodiments, the current actuator circuits 631, 632, 633, 634, 635, 636, 637, and 638 are implemented using digitally programmable DAC circuits (e.g., resistive DAC circuits or current mode DAC circuits). The current actuator circuits 631, 632, 633, 634, 635, 636, 637, and 638 are responsive to respective digital control signals $C_{11}$, $C_{12}$, $C_{13}$, $C_{14}$, $C_{15}$, $C_{16}$, $C_{17}$, and Cis, which are generated by the calibration control circuitry 580 (FIG. 5) as needed, to adjust the magnitudes of the pull up and pull down currents $I_P$ and $I_N$ that are output from the respective current actuator circuits, to thereby adjust the duty cycles of the complementary quadrature LO signals LO_I, LO_Q, $\overline{LO\_I}$, and $\overline{LO\_Q}$ that are generated and output from the quadrature divider circuitry 540.

In the exemplary embodiment shown in FIG. 6C, the first and second LO clock receiver stages 630-1 and 630-2 are configured to inject currents into the in-phase LO clock signal path to correct duty cycle error of the differential in-phase LO signal, LO_I and $\overline{LO\_I}$. The third and fourth LO clock receiver stages 630-3 and 630-4 are configured to inject currents into the quadrature-phase LO clock signal path to correct duty cycle error of the differential quadrature-phase LO signal, LO_Q and $\overline{LO\_Q}$. It is to be noted that the LO clock receiver stages 630-1, 630-2, 630-3, and 630-4 operate in the same or similar manner as the clock receiver stages 520-1 and 520-2 as discussed above in conjunction with FIG. 5, the details of which will not be repeated. While FIG. 6C illustrates an exemplary embodiment in which the LO clock receiver stage 630 drives the input of the programmable buffer circuit 600, in other embodiments, the LO clock receiver stage 630 is coupled to the output of the programmable buffer circuit 600 and drives the LO inputs to the I and Q mixers.

Figure 7A:
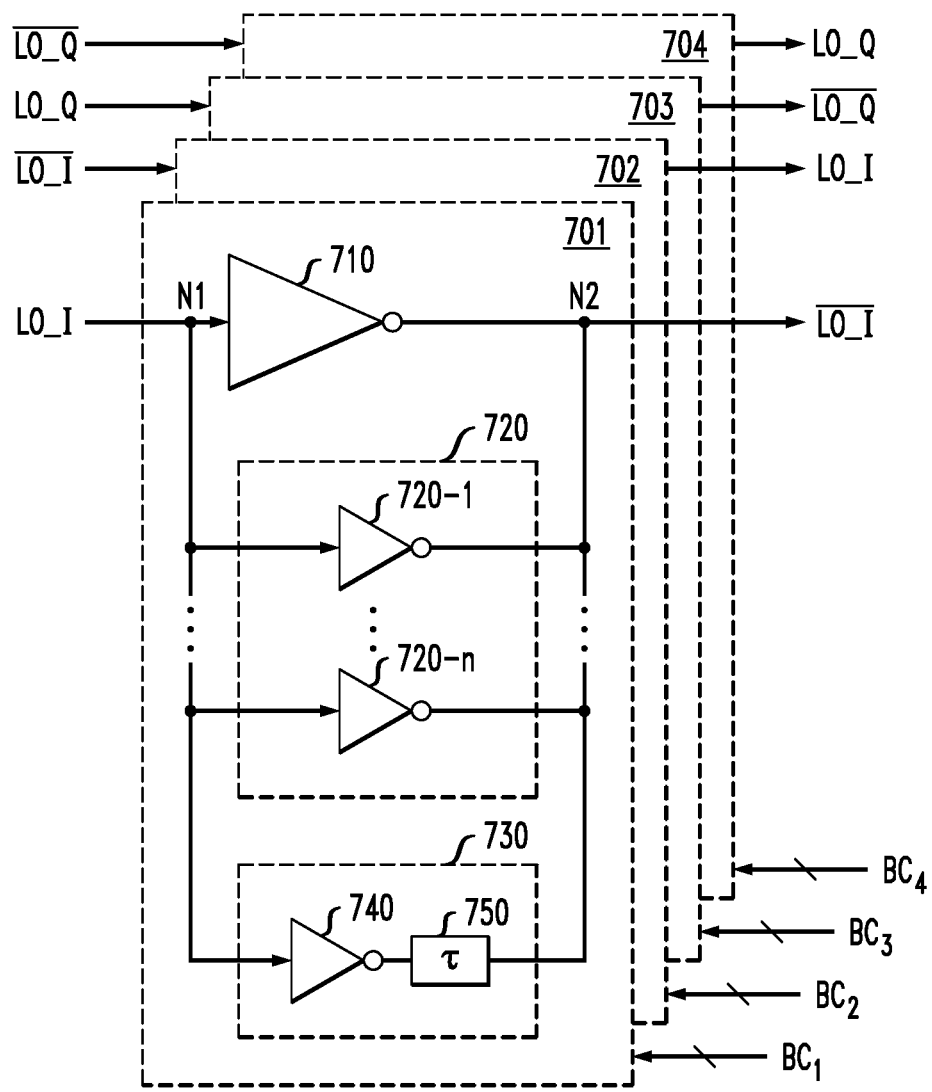
FIGS. 7A and 7B schematically illustrate buffer circuitry which is configured to enable phase error calibration of quadrature LO signals, according to another exemplary embodiment of the disclosure.
Figure 7B:
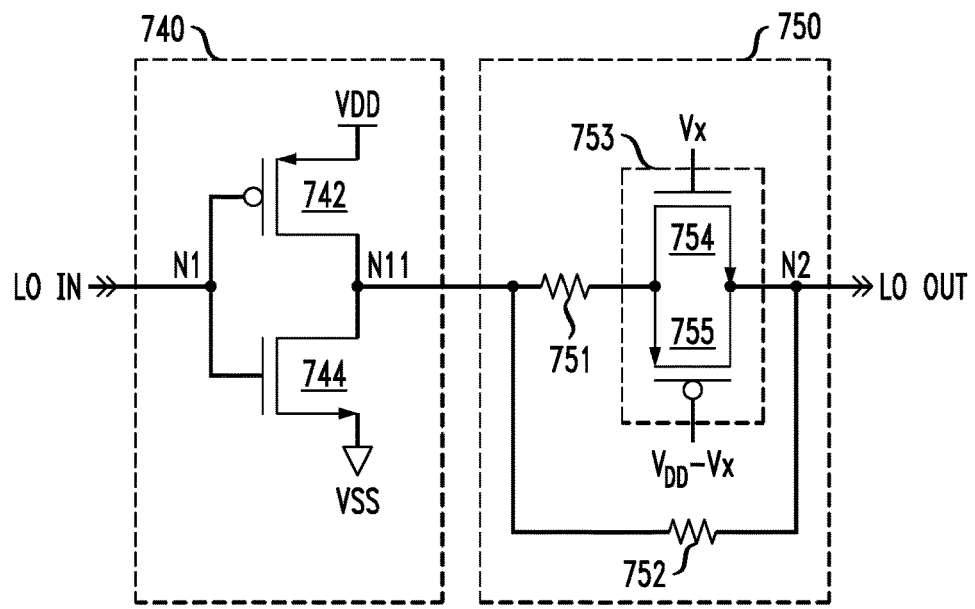

Next, FIGS. 7A and 7B schematically illustrate buffer circuitry which is configured to enable phase error calibration of quadrature LO signals, according to another exemplary embodiment of the disclosure. In some embodiments, FIGS. 7A and 7B schematically illustrate an exemplary embodiment for implementing the buffer circuitry 550 in FIG. 5. FIG. 7A schematically illustrates digitally programmable buffer circuitry 700 which is similar to the programmable buffer circuitry 600 of FIGS. 6A and 6B in that the programmable buffer circuitry 700 comprises a plurality of LO driver stages 701, 702, 703, and 704 that are configured to drive respective phases of complementary quadrature LO signals LO_I, LO_Q, $\overline{LO\_I}$, and $\overline{LO\_Q}$, and which are digitally controlled by respective buffer control signals $BC_1$, $BC_2$, $BC_3$, and $BC_4$ to enable coarse phase error adjustment by adjusting drive strengths of the LO driver stages 701, 702, 703, and 704.

In addition, similar to the programmable buffer circuitry 600 of FIGS. 6A and 6B, as schematically illustrated in FIG. 7A, the LO driver stage 701 comprises a segmented architecture which comprises a fixed buffer segment 710 and a programmable buffer segment 720. The fixed buffer segment 710 comprises a single buffer element coupled to and between an input node N1 and output node N2 of the LO driver stage 701. The programmable buffer segment 720 comprises a plurality of buffer elements 720-1, ..., 720-n connected in parallel between the input node N1 and output node N2 of the LO driver stage 701. The fixed buffer segment 710 and programmable buffer segment 720 in FIG. 7A operate in the same or similar manner as the fixed buffer segment 610 and the programmable buffer segment 620 (FIGS. 6A and 6B) as discussed above, the details of which will not be repeated.

The programmable buffer circuitry 700 further comprises a fine delay buffer segment 730 which comprises a fixed buffer element 740 and a delay element 750 serially coupled between the input node N1 and the output node N2 of the LO driver stage 701. In some embodiments, the delay element 750 comprises a variable resistance circuit which is digitally controlled to provide a variable resistance that is coupled to the output of the fixed buffer element 740 to provide a fine-tuning knob for adjusting the phase delay of the LO signal that is input to the LO driver stage 701 with higher resolution.

FIG. 7B schematically illustrates the fine delay buffer segment 730 of the programmable buffer circuitry 700 of FIG. 7A, according to an exemplary embodiment of the disclosure. In some embodiments, the fixed buffer element 740 comprises a CMOS inverter circuit comprising a PMOS transistor 742 and an NMOS transistor 744. The CMOS inverter circuit comprises an output node N11. The delay element 750 is coupled to and between the output node N11 of the buffer element 740 and the output node N2 of the LO driver stage. The delay element 750 comprises a first resistor 751, a second resistor 752, and a variable resistor 753. The first resistor 751 and variable resistor 753 are serially connected between the nodes N11 and N2. The second resistor 752 is coupled to the nodes N11 and N2 such that second resistor 752 is connected in parallel with the first resistor 751 and the variable resistor 753.

In some embodiments, the variable resistor 753 comprises an NMOS transistor 754 and a PMOS transistor 755. A drain terminal of the NMOS transistor 754 and a source terminal of the PMOS transistor 755 are commonly connected to a terminal of the first resistor 751. A source terminal of the NMOS transistor 754 and a drain terminal of the PMOS transistor 755 are commonly connected to the node N2. The NMOS transistor 754 comprises a gate terminal that receives a DC control voltage $V_X$, and the PMOS transistor 755 comprises a gate terminal that receives a DC control voltage $V_{DD}-V_X$. The variable resistor 753 serves as a voltage-variable resistance which is tuned by adjusting the control voltages $V_X$ and $V_{DD}-V_X$ to change the "On" channel resistances of the NMOS transistor 754 and the PMOS transistor 755. In some embodiments, the DC control voltages $V_X$ and $V_{DD}-V_X$ are generated using a voltage DAC that is digitally controlled.

Figure 7C:
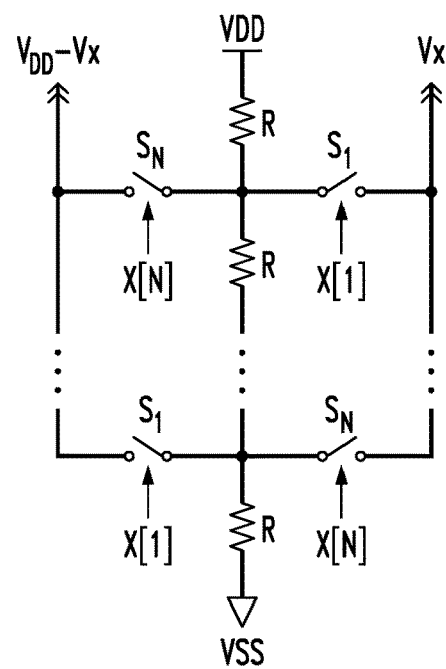
FIG. 7C schematically illustrates control circuitry that is configured to generate control signals for controlling operation of the buffer circuitry of FIGS. 7A and 7B, according to an exemplary embodiment of the disclosure.

For example, FIG. 7C schematically illustrates control circuitry that is configured to generate control voltages for controlling the fine delay buffer segment 730 of FIG. 7B, according to an exemplary embodiment of the disclosure. In particular, FIG. 7C schematically illustrates an exemplary embodiment of a voltage DAC circuit 760 which is configured to generate the DC control voltages $V_X$ and $V_{DD}-V_X$, which are applied to the gate terminals of the NMOS transistor 754 and the PMOS transistor 755, respectively, based on a digital control signal X[N:1]. The voltage DAC circuit 760 comprises a plurality of resistors R (which have a same resistance value) serially connected between the positive power supply node $V_{DD}$ and the negative power supply node VSS, which form a resistive ladder. The voltage DAC circuit 760 comprises a plurality of switches $S_1, \ldots, S_N$ which are configured to selectively connect a first control voltage node $V_X$ to nodes along the resistive ladder, and a plurality of complementary switches $S_1, \ldots, S_N$ which are configured to selectively connect a second control voltage node $V_{DD}-V_X$ to nodes along the resistive ladder. As schematically illustrated in FIG. 7C, the switches $S_1, \ldots, S_N$ are controlled by respective bits X[1], ..., X[N] of a digital control signal X[N:1] that is generated by the calibration control circuitry. The complementary switch configuration of FIG. 7C allows for complementary control voltages $V_X$ and $V_{DD}-V_X$ to be derived from the same resistive ladder (providing a low footprint configuration for the voltage DAC circuit 760).

It is to be appreciated that the exemplary embodiments of the programmable buffer circuits as shown in FIGS. 6A/6B and 7A/7B are configured to provide very low (fine) phase error between I and Q phases, e.g., less than 0.1 degrees for 60 dB image rejection. In some embodiments, the DC voltages (e.g., $PE_1$ and $PE_2$), which are generated by the low pass filter circuitry 564 filtering the output of the XOR circuitry 562, are applied to an ADC circuit of the calibration control circuitry 580. The ADC circuit digitizes the voltage signals $PE_1$ and $PE_2$ and the calibration control circuitry 580 processes the digitized signals to determine the digital codes (e.g., digital buffer control signals $BC_1$, $BC_2$, $BC_3$, and $BC_4$) that are to be applied to the segmented delay cells 620 and 720 of the LO driver stages to achieve phase error adjustment. For example, in some embodiments, the calibration control circuitry 580 comprises control logic that performs a signal averaging algorithm to determine the best possible codes (free of random noise) that need to be applied to the segmented delay cells 620 and 720 of the LO driver stages to achieve phase error adjustment. In some embodiments, coarse delay trimming is performed using the smallest possible transistor sizes in the technology that is implemented. In addition, for fine delay buffer segment 730 (FIGS. 7A and 7B), the calibration control circuitry generates the control voltages (e.g., $V_X$ and $V_{DD}-V_X$) to adjust the voltage-variable resistance to achieve fine-tune adjustment of phase delays.

Figure 8A:
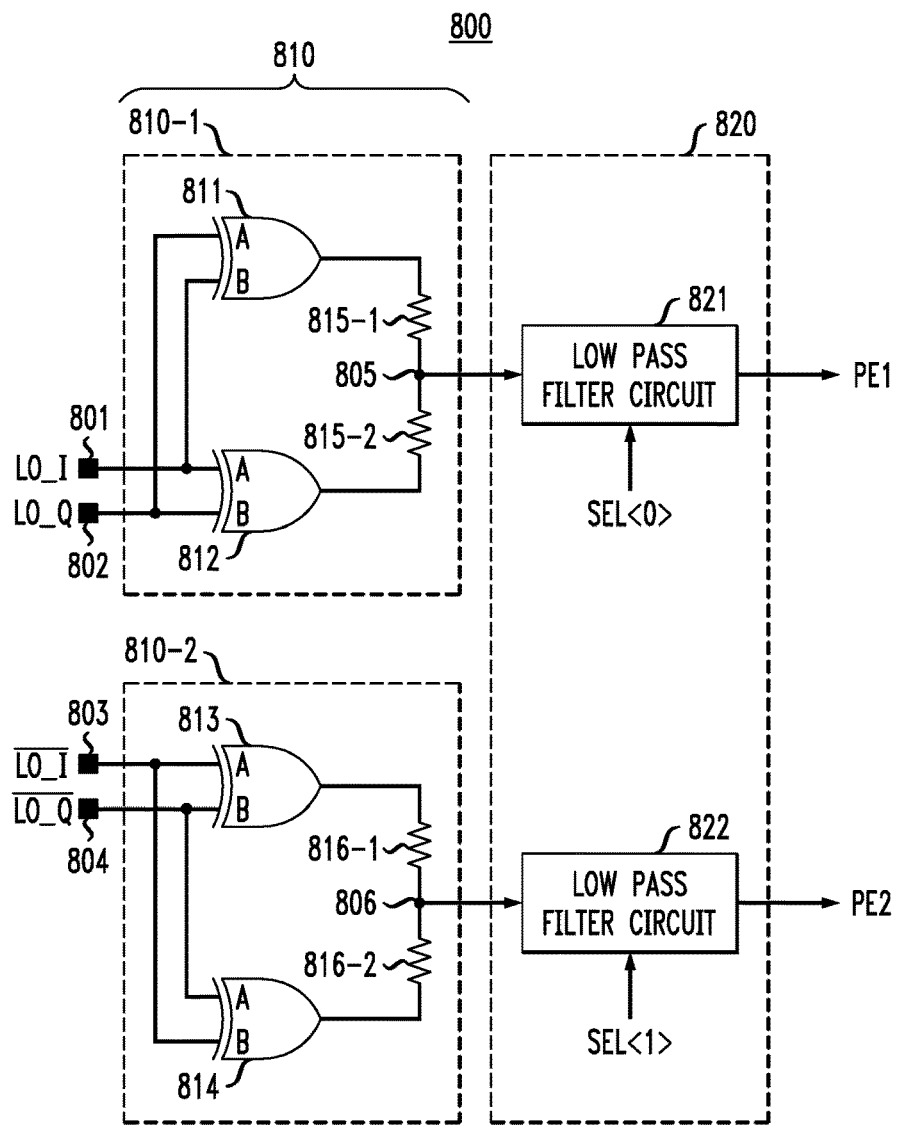
FIG. 8A schematically illustrates sensor circuitry which is configured to detect phase errors of quadrature LO signals, according to an exemplary embodiment of the disclosure.

FIG. 8A schematically illustrates sensor circuitry which is configured to detect phase errors of quadrature LO signals, according to an exemplary embodiment of the disclosure. More specifically, FIG. 8A schematically illustrates sensor circuitry 800 comprising XOR circuitry 810 and low pass filter circuitry 820. In some embodiments, FIG. 8A illustrates an exemplary configuration of the second sensor circuit 560 of FIG. 5. As shown in FIG. 8A, the XOR circuitry 810 comprises a first symmetric XOR circuit 810-1 and a second symmetric XOR circuit 810-2. The first symmetric XOR circuit 810-1 comprises a first XOR circuit 811, a second XOR circuit 812, and resistors 815-1 and 815-2 coupled to output terminals of the first and second XOR circuits 811 and 812, respectively. The first symmetric XOR circuit 810-1 further comprises a first input terminal 801, a second input terminal 802, and an output terminal 805. Similarly, the second symmetric XOR circuit 810-2 comprises a first XOR circuit 813, a second XOR circuit 814, and resistors 816-1 and 816-2 coupled to output terminals of the first and second XOR circuits 813 and 814, respectively. The second symmetric XOR circuit 810-2 further comprises a first input terminal 803, a second input terminal 804, and an output terminal 806.

The low pass filter circuitry 820 comprises a first low pass filter circuit 821 and a second low pass filter circuit 822. The first low pass filter circuit 821 has an input that is coupled to the output terminal 805 of the first symmetric XOR circuit 810-1. The second low pass filter circuit 822 has an input that is coupled to the output terminal 806 of the second symmetric XOR circuit 810-2. In some embodiments, the first low pass filter circuit 821 is controlled/enabled by a single bit SEL<0> of a digital control signal (e.g., SEL[5:0]), and the second low pass filter circuit 822 is controlled/enabled by a single bit SEL<1> of the digital control signal (e.g., SEL[5:0]).

As further shown in FIG. 8A, the LO_I and LO_Q signals (which are output from the buffer circuitry) are input to the first input terminal 801 and the second input terminal 802, respectively, of the first symmetric XOR circuit 810-1. The first input terminal 801 is coupled to a B input of the XOR circuit 811 and to an A input of the XOR circuit 812. The second input terminal 802 is coupled to an A input of the XOR circuit 811 and to a B input of the XOR circuit 812. In this configuration, the first symmetric XOR circuit 810-1 essentially comprises a multiplication circuit that is configured to multiply the LO_I and LO_Q signals and generate a signal on the output node 805 which has a frequency that is 2× the frequency of the LO_I and LO_Q signals. Further, in instances where the LO_I and LO_Q signals are not orthogonal (i.e., the phase difference between the LO_I and LO_Q signals is greater than or less than 90°), the output signal that is generated at the output node 805 will also have a DC component which represents a phase error between the LO_I and LO_Q signals. The first low pass filter circuit 821 filters the output signal generated at the output node 805 of the first symmetric XOR circuit 810-1 to generate the sensor signal $PE_1$ which, as noted above, comprises a DC voltage that is proportional to a phase error between the LO_I and LO_Q signals.

Moreover, the $\overline{LO\_I}$ and $\overline{LO\_Q}$ signals (which are output from the buffer circuitry) are input to the first input terminal 803 and the second input terminal 804, respectively, of the second symmetric XOR circuit 810-2. The first input terminal 803 is coupled to an A input of the XOR circuit 813 and to a B input of the XOR circuit 814. The second input terminal 804 is coupled to a B input of the XOR circuit 813 and to an A input of the XOR circuit 814. In this configuration, the second symmetric XOR circuit 810-2 essentially comprises a multiplication circuit that is configured to multiply the $\overline{LO\_I}$ and $\overline{LO\_Q}$ signals and generate a signal on the output node 806 which has a frequency that is 2× the frequency of the $\overline{LO\_I}$ and $\overline{LO\_Q}$ signals. Further, in instances where the $\overline{LO\_I}$ and $\overline{LO\_Q}$ signals are not orthogonal (i.e., the phase difference between the $\overline{LO\_I}$ and $\overline{LO\_Q}$ signals is greater than or less than 90°), the output signal that is generated at the output node 806 will also have a DC component which represents a phase error between the $\overline{LO\_I}$ and $\overline{LO\_Q}$ signals. The second low pass filter circuit 822 filters the output signal generated at the output node 806 of the second symmetric XOR circuit 810-2 to generate the sensor signal $PE_2$ which, as noted above, comprises a DC voltage that is proportional to a phase error between the $\overline{LO\_I}$ and $\overline{LO\_Q}$ signals.

It is to be noted that implementing a symmetric XOR configuration of the first and second symmetric XOR circuits 810-1 and 810-2, as shown in FIG. 8A, enables high precision detection of phase error, as compared to using a single XOR circuit to detect phase error. In particular, for a single XOR circuit, there can be a slight difference between (i) the propagation delay from the A input to the output and (ii) the propagation delay from the B input to the output. This difference in the propagation delay characteristics of the A and B inputs of the XOR circuit can degrade the accuracy of the sensor circuitry 800, as the delay difference will be misinterpreted as an extra phase error between the quadrature LO signals that are input to the single XOR circuit (e.g., a difference of 2 picoseconds in propagation delay translates to a few degrees of phase error).

In this regard, to equalize the differences of the A and B inputs in the first symmetric XOR circuit 810-1, the LO_I signal is applied to the B and A inputs of the respective first and second XOR circuits 811 and 812, and the LO_Q signal is applied to the A and B inputs of the respective first and second XOR circuits 811 and 812. The output signals of the first and second XOR circuits 811 and 812 are combined at the output terminal 805, wherein the first and second resistors 815-1 and 815-2 essentially form a resistive summation network that is configured to combine the output signals of the first and second XOR circuits 811 and 812 at the output terminal 805. In order to combine the output signals of the first and second XOR circuits 811 and 812 with equal weighting, the first and second resistors 815-1 and 815-2 are designed to have equal resistance values.

Similarly, to equalize the differences of the A and B inputs in the second symmetric XOR circuit 810-2, the $\overline{LO\_I}$ signal is applied to the A and B inputs of the respective first and second XOR circuits 813 and 814, and the $\overline{LO\_Q}$ signal is applied to the B and A inputs of the respective first and second XOR circuits 813 and 814. The output signals of the first and second XOR circuits 813 and 814 are combined at the output terminal 806, wherein the first and second resistors 816-1 and 816-2 essentially form a resistive summation network that is configured to combine (with equal weighting) the output signals of the first and second XOR circuits 813 and 814 at the output terminal 806.

It is to be noted that FIG. 8A illustrates an exemplary embodiment in which the resistive summation networks at the outputs of the XOR circuits 811, 812, 813, and 814 are utilized for CMOS logic applications to combine the signal outputs of the XOR circuits 811 and 812, and the signal outputs of the XOR circuits 813 and 814. However, other suitable techniques can be utilized to combine the signal outputs of the XOR circuits 811 and 812, and the signal outputs of the XOR circuits 813 and 814. For example, for current mode logic (CML) circuitry, the outputs of the XOR circuits 811 and 812 would be directly connected together, and to a first terminal of a common load resistor having a second terminal coupled to a power supply node and, similarly, the outputs of the XOR circuits 813 and 814 would be directly connected together, and to a first terminal of another common load resistor having a second terminal coupled to the power supply node.

It is to be further noted that in some embodiments, the complementary quadrature LO signals LO_I, LO_Q, $\overline{LO\_I}$, and $\overline{LO\_Q}$ are directly coupled to the input terminals of the first and second symmetric XOR circuits 810-1 and 810-2. In other embodiments, the complementary quadrature LO signals LO_I, LO_Q, $\overline{LO\_I}$, and $\overline{LO\_Q}$ can be capacitively coupled to the input terminals of the first and second symmetric XOR circuits 810-1 and 810-2 through a level restoring buffer circuit in instances where CML level signals are used for driving the mixers to ensure that the signals have a common mode of half the power supply rail.

Figure 8B:
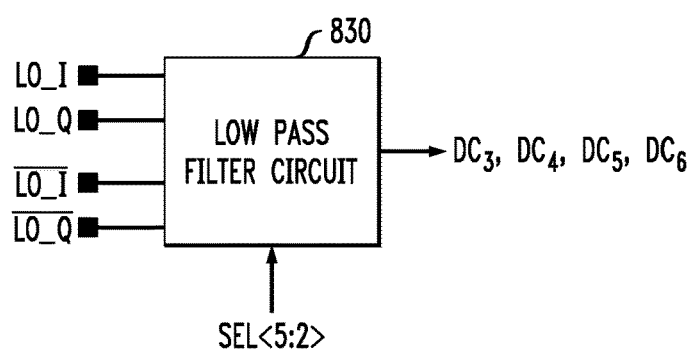
FIG. 8B schematically illustrates sensor circuitry which is configured to detect duty cycle errors of quadrature LO signals, according to an exemplary embodiment of the disclosure.

FIG. 8B schematically illustrates sensor circuitry which is configured to detect duty cycle errors of quadrature LO signals, according to an exemplary embodiment of the disclosure. More specifically, FIG. 8B schematically illustrates sensor circuitry comprising low pass filter circuitry 830. In some embodiments, FIG. 8B illustrates an exemplary configuration of the third sensor circuit 570 of FIG. 5. The low pass filter circuitry 830 comprises a plurality of input terminals that are configured to receive as input the complementary quadrature LO signals LO_I, LO_Q, $\overline{LO\_I}$, and $\overline{LO\_Q}$ which are output from the buffer circuitry. In some embodiments, the low pass filter circuitry 830 comprises a single low pass filter circuit which selectively receives as input, one of the complementary quadrature LO signals LO_I, LO_Q, $\overline{LO\_I}$, and $\overline{LO\_Q}$ at a given time, and outputs a corresponding sensor signal $DC_3$, $DC_4$, $DC_5$, and $DC_6$. As noted above, the sensor signals $DC_3$, $DC_4$, $DC_5$, and $DC_6$ that are generated by the low pass filter circuit 830 comprise DC voltages that are proportional to the detected duty cycles of the complementary quadrature LO signals LO_I, LO_Q, $\overline{LO\_I}$, and $\overline{LO\_Q}$. In some embodiments, as shown in FIG. 8B, the low pass filter circuit 830 is controlled/enabled by four (4) control bits SEL<5:2> of the digital control signal (e.g., SEL[5:0]), wherein each control bit of the four (4) control bits SEL<5:2> is selectively enabled to cause the low pass filter circuit 830 to selectively filter a corresponding one of the complementary quadrature LO signals LO_I, LO_Q, $\overline{LO\_I}$, and $\overline{LO\_Q}$ at different times, thereby allowing sharing of the single low pass filter circuit to detect duty cycle errors of the complementary quadrature LO signals LO_I, LO_Q, $\overline{LO\_I}$, and $\overline{LO\_Q}$.

Figure 9:
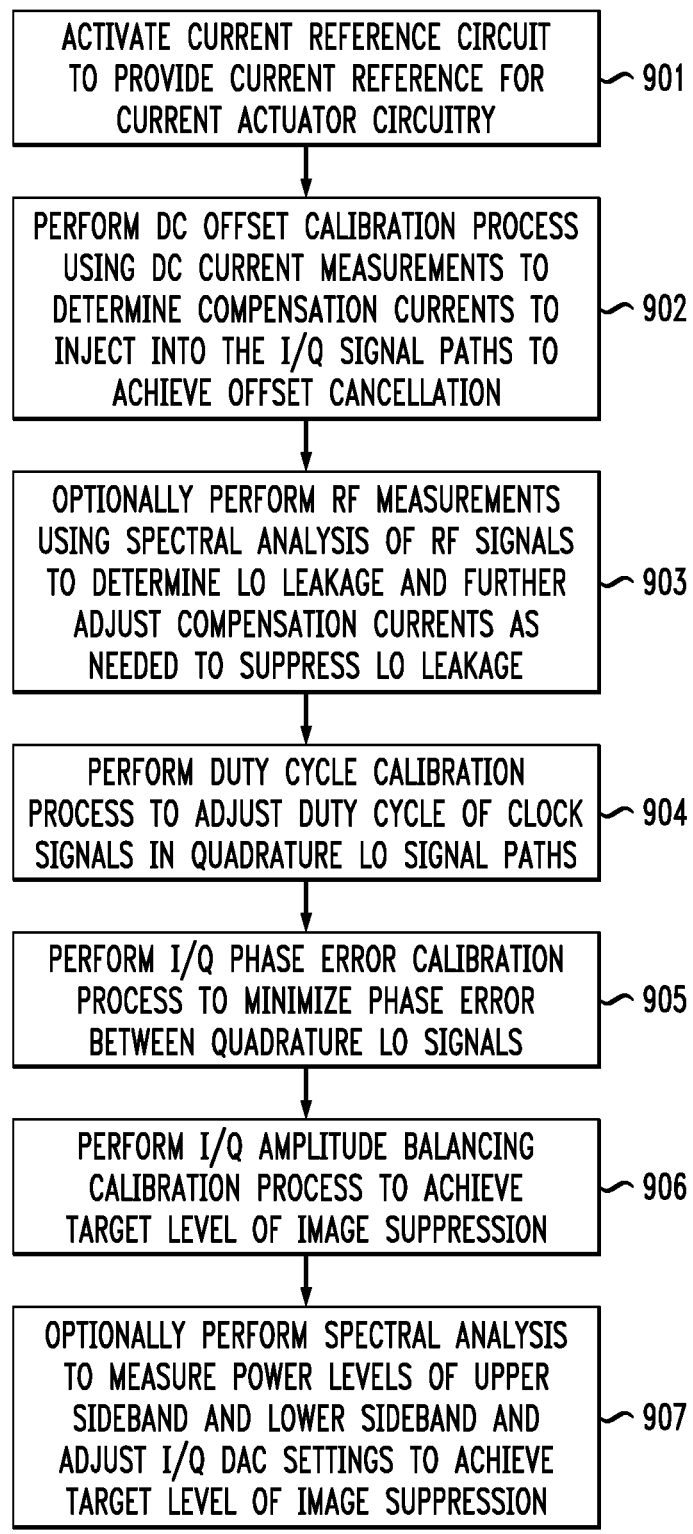
FIG. 9 illustrates a calibration process for suppressing LO spurs and unwanted sideband images in an RF signal generator system, according to an exemplary embodiment of the disclosure.

FIG. 9 illustrates a calibration process for suppressing LO spurs and unwanted sideband images in an RF signal generator system, according to an exemplary embodiment of the disclosure. More specifically, FIG. 9 illustrates an exemplary sequence of calibration procedures for controlling actuators in the I/Q signal paths and LO signal paths to perform various signal calibration operations as discussed herein. As noted above, in some embodiments, calibration is performed by controlling actuators in the I/Q signal paths and/or LO signal paths based on DC measurements obtained from sensor circuits disposed in low temperature or cryogenic temperature environments. Further, in some embodiments, calibration is performed by controlling actuators in the I/Q signal paths and/or LO signal paths based on RF measurements obtained by performing spectral analysis of RF signals at a MIX-AMP interface and/or at an output (RF_OUT) of the RF signal generator system (see FIG. 1), wherein the RF measurements are performed using an off-chip or an on-chip RF spectrum analysis system in room temperature or low/cryogenic temperature environments. Moreover, in some embodiments, calibration is performed by controlling actuators in the I/Q signal paths and/or LO signal paths based on a combination of DC and RF measurements.

Referring to FIG. 9, the calibration process includes an initial phase of activating a current reference circuit to provide an accurate reference current that is used by the current actuator circuitry that is distributed at various points in the I/Q and LO signal paths of the RF signal generator system (block 901). For example, as noted above in conjunction with FIG. 1, the calibration system 190 implements current reference circuitry 198 to provide an accurate reference current for the current mode actuator circuits of the actuator circuitry 196. The current reference circuit can be implemented in a room temperature environment.

An initial step of the calibration procedure comprises performing a DC offset calibration process using DC current measurements of current signals in the I/Q signal paths of the RF signal generator system to determine compensation currents to inject into the I/Q signal paths to achieve offset cancellation (block 902). An exemplary process for performing the DC offset calibration process (block 902) will be described in further detail below with reference to FIG. 10.

A next optional step following the DC offset calibration process is to perform RF measurements (e.g., at room temperature) through spectral analysis of RF signals in the I/Q signal paths (e.g., at the MIX-AMP interface or at the output RF_OUT) to determine an amount of residual LO leakage and further adjust the compensation currents that are injected into the I/Q signal paths, as needed, to further suppress LO leakage (block 903). In some embodiments, the current signals in the I/Q signal path can be routed from the low temperature/cryogenic environment to a spectrum analyzer system that is disposed in a room temperature environment.

A next step in the calibration procedure comprises performing a duty cycle calibration process to adjust the duty cycles of the differential clock signals used to generate the complementary quadrature LO signals (block 904). For example, in some embodiments, as discussed above in conjunction with FIG. 5, the low pass filter circuitry 530 is utilized to generate DC voltage signals $DC_1$ and $DC_2$ which are proportional to the duty cycles of the differential clock signals, wherein the calibration control circuitry 580 processes the DC voltage signals $DC_1$ and $DC_2$ to generate control signals to adjust the currents that are generated by the current actuator circuits 521, 522, 523, and 524 of the clock receiver stage 520 in order to calibrate the duty cycles of the differential clock signals to achieve 50% (or near 50%) duty cycles.

Further, as a next step in the calibration procedure, a phase error calibration process is performed to minimize or substantially remove phase error between the complementary quadrature LO signals (block 905). For example, in some embodiments, as discussed above in conjunction with FIG. 5, the second sensor circuit 560 (comprising the XOR circuitry 562 and the low pass filter circuitry 564) is utilized to generate sensor signals $PE_1$ and $PE_2$, wherein $PE_1$ comprises a DC voltage that is proportional to a phase error between the LO_I and LO_Q signals, and where the sensor signal $PE_2$ comprises a DC voltage that is proportional to a phase error between the $\overline{LO\_I}$ and $\overline{LO\_Q}$ signals. The calibration control circuitry 580 processes the sensor signals $PE_1$ and $PE_2$ to generate control signals to control the buffer circuitry 550 to adjust the phase difference of the complementary quadrature LO signals, as needed, to minimize or substantially eliminate quadrature phase error between the I/Q LO signals.

A next step in the calibration procedure comprises performing an I/Q amplitude balancing calibration process to achieve a target level of image suppression (block 906). In some embodiments, the I/Q amplitude calibration process is performed using DC current measurements to determine the amplitude I and Q baseband signals in the I/Q signal paths. As noted above, a difference in magnitude between the DC currents $I^+$ and $Q^+$ leads to an I/Q amplitude imbalance that degrades image rejection. To correct an I/Q imbalance between the $I^+$ and $Q^+$ currents as discussed above in conjunction with FIG. 2, the calibration control circuitry can generate control signals $C_1$ and $C_2$ to adjust magnitudes of the reference currents of the I/Q DAC circuits 121 and 122 to achieve a balance in the magnitudes of the I and Q baseband currents.

A next optional step comprises performing a spectral analysis of RF output signal (RF_OUT) that is generated by the RF signal generator system to measure the power levels of the upper sideband and lower sideband signals in the RF_OUT signal and adjust the settings of the I/Q DAC circuits 121 and 122, as needed, to achieve a target image suppression (block 907). An exemplary process flow for performing the RF measurements (block 907) will be discussed in further detail below in conjunction with FIG. 11.

Figure 10:
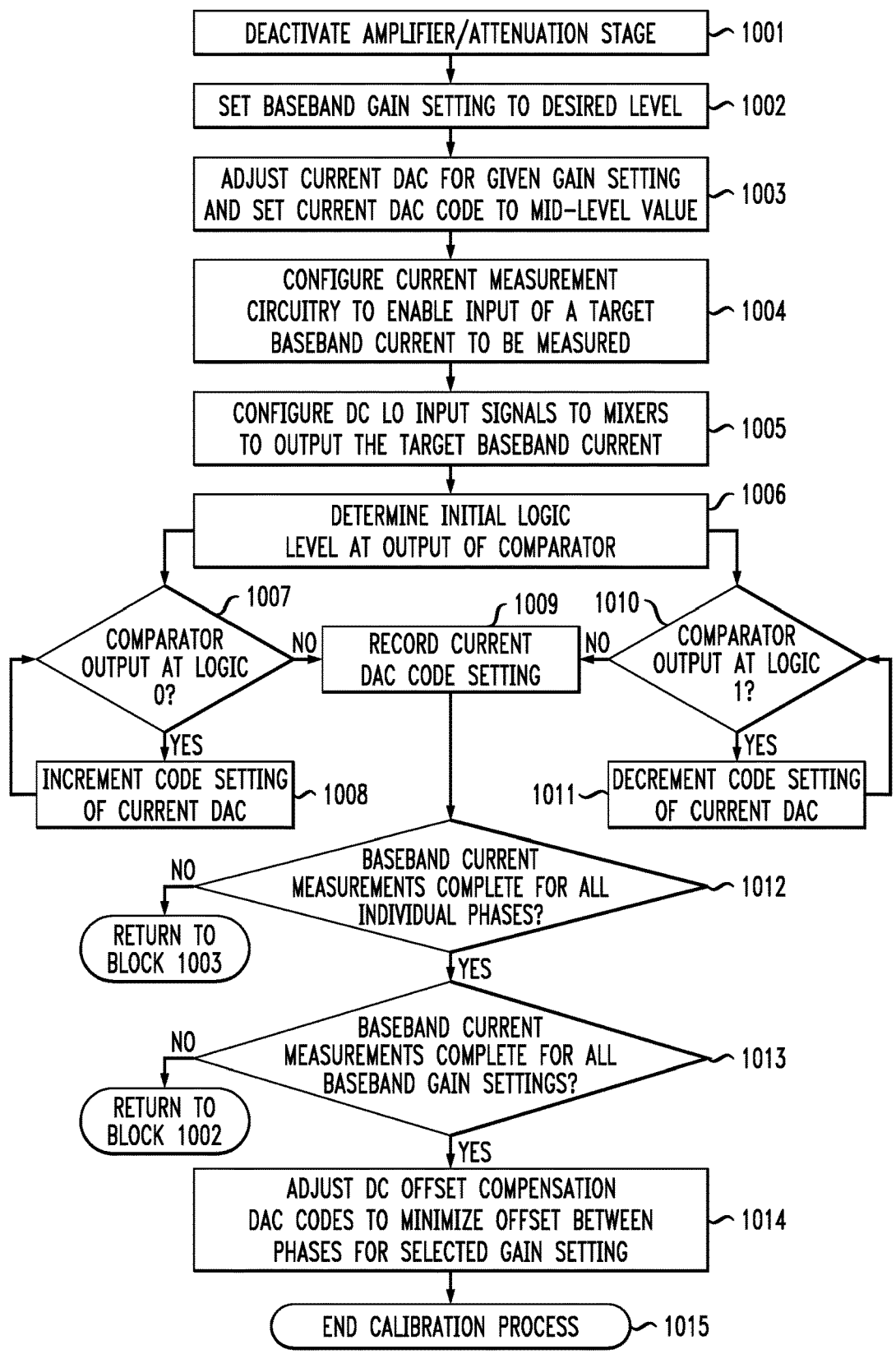
FIG. 10 illustrates a process for calibrating baseband currents in a radio frequency signal generator system, according to an exemplary embodiment of the disclosure.

FIG. 10 illustrates a process for calibrating baseband currents in an RF signal generator system, according to an exemplary embodiment of the disclosure. For purposes of illustration, FIG. 10 may be explained in the context of the exemplary embodiments of the RF signal generator and calibration systems shown in FIGS. 3A and 3B. Referring to FIG. 10, a calibration process is commenced by the calibration system (block 1000) to calibrate baseband signals (e.g., I/Q signals) of the RF signal generation system. Depending on the given application of the RF signal generator system, a calibration process can be automatically commenced by the calibration system upon power-up of the RF signal generator system. Further, in some embodiments, a calibration process can be performed automatically or manually anytime during an idle mode of operation of the RF signal generator system.

The calibration process comprises an initialization phase in which various settings are applied to configure a calibration mode of the RF signal generator system and the calibration system. For example, digital control signals are applied to the amplifier/attenuation stage at the output of the mixer stage to turn off all transistors in the amplifier/attenuation stage and thus shut off the amplifier/attenuation stage (step 1001). In particular, in the exemplary embodiment of FIG. 3A, as discussed above, a DC voltage of logic "1" is applied to the gate terminals of all transistors in the signal attenuation stage 330 to turn off all transistors, which results in completely turning off the signal attenuation stage 330 so that the DC baseband currents $I^+$, $I^-$, $Q^+$, and $Q^-$ to be measured are routed from the output of the current-commutating mixer stage 320 into the current measurement circuitry 350.

Furthermore, the initialization phase comprises setting a baseband gain of the baseband input stage to a desired level (block 1002). As noted above, in the exemplary embodiment of FIG. 3A, the baseband signal input stage 310 comprises variable-width transistors 311, 312, 313, and 314, which can be configured to adjust the baseband signal gain in the I/Q signal paths. For example, as noted above, in some embodiments, the DC baseband currents can be adjusted to one of various target current levels over a given range wherein a highest baseband current level is about 10× greater than a lowest baseband current level (e.g., a range from about 35 uA to about 350 uA), to provide 20 dB of gain variation. For the initial setting and baseband signal measurements, the transistors 311, 312, 313, and 314 of the baseband signal input stage 310 can be set to the lowest gain setting (e.g., smallest width setting for lowest baseband current).

In addition, the initialization phase comprises adjusting the current DAC segments of the current measurement circuitry 350 based on the current gain setting of the baseband signal input stage 310 and setting the initial code of the current mode DAC to the mid-value level (block 1003). As noted above, in some embodiments, the current mode DAC (which is implemented in the current measurement circuitry) is configured to operate over the full range of the current levels of the DC baseband signals (that is dependent on baseband signal gain) to be measured. In this regard, depending on the gain setting of the baseband signal input stage 310, the current sources of the coarse and fine segments of the current DAC can be scaled (e.g., increased or decreased) according to the baseband gain setting to enable proper and accurate measurement of the DC baseband currents.

Next, the calibration process configures the current measurement circuitry to enable input of a target baseband current to be measured from a given output node of the mixer stage (block 1004). For example, in the exemplary embodiment shown in FIGS. 3A and 3B, the current measurement circuitry 350 can be configured to input a baseband current on the output node INT_0 by activating the switch SW0 of the first current sink circuit 351 (while keeping the switch SW1 turned off) and deactivating the switch SW2 to thereby configure an active current mirror circuit comprising the transistor 353 (in a diode-connected transistor configuration) and the mirror transistor 355. Alternatively, the current measurement circuitry 350 can be configured to input a baseband current on the output node INT_1 by activating the switch SW1 of the second current sink circuit 352 (while keeping the switch SW0 turned off) and deactivating the switch SW2 to thereby configure an active current mirror circuit comprising the transistor 354 (in a diode-connected transistor configuration) and the mirror transistor 355.

In addition, the LO signal inputs, which are applied to the mixers in the mixer stage, are configured with the proper DC voltages so that the mixer stage outputs the target DC baseband current to be measured on the target output node (block 1005). For example, as noted above, in some embodiments, the mixing transistors of the differential I and Q mixers 320-1 and 320-2 in the current-commutating mixer stage 320 (FIG. 3A) are selectively activated/deactivated by applying DC LO voltages (logic High or logic Low) to the gate terminals of the mixing transistors, as needed, in order to output the target DC baseband current to be measured on one of the output nodes INT_0 or INT_1 of the current-commutating mixer stage 320. For example, the DC baseband current $I^+$ can be generated and output to the node INT_1 by applying a DC LO voltage of logic "0" (Low) to the LO_I inputs of the differential I mixer 320-1, and applying a DC LO voltage of logic "1" to the LO_I, LO_Q and LO_Q inputs of the differential I and Q mixers 320-1 and 320-2. With the INT_1 input of the second current sink circuit 352 enabled, the DC baseband current $I^+$ will be measured by the current measurement circuitry 350.

When the DC baseband current flows into the current measurement circuitry 350, the comparator 357 will compare the voltage ($V_{IN}$) generated on the high impedance node N2 with the reference voltage $V_{REF}$ (e.g., ½ $V_{DD}$), and the control process will determine the initial logic level that is generated at the output of the comparator 357 (block 1006). If the comparator output is determined (in block 1006) to be at an initial logic "0" level, this is an indication that the DC baseband current is greater than the DAC reference current $I_{REF}$ being output from the current DAC circuit 356 (at the mid-point code setting). In response, the control process will adjust (e.g., increment) the code setting of the current DAC circuit 356 to increase the level of reference current $I_{REF}$ that is generated and output from the current DAC circuit 356 (block 1008). In some embodiments, the DAC code is adjusted using a suitable binary search process to select a next code setting of the current DAC circuit 356. After incrementing the code setting of the current DAC circuit 356, the control process will determine whether or not the comparator output is still at the initial logic "0" level (block 1007).

The code setting of the current DAC circuit 356 is incrementally adjusted while the comparator output remains at the initial logic "0" level (repeat blocks 1007 and 1008) until the output of the comparator 357 switches from the initial logic "0" level to a logic "1" level. When the control process determines that the output of the comparator 357 is no longer at the initial logic "0" level (negative determination in block 1007), the control process will determine that the reference current $I_{REF}$ output from the current DAC circuit 356 is equal to, or at least substantially equal to, the DC baseband current being measured and the control process will record (e.g., store) the current DAC code setting (block 1009), wherein the recorded code setting represents the measurement for the DC baseband current.

On the other hand, if the comparator output is determined (in block 1006) to be at an initial logic "1" level, this is an indication that the DC baseband current is less than the DAC reference current $I_{REF}$ being output from the current DAC circuit 356 (at the mid-point code setting). In response, the control process will adjust (e.g., decrement) the code setting of the current DAC circuit 356 to decrease the level of reference current $I_{REF}$ that is generated and output from the current DAC circuit 356 (block 1011). In some embodiments, the DAC code is adjusted using a suitable binary search process to select a next code setting of the current DAC circuit 356. After decrementing the code setting of the current DAC circuit 356, the control process will determine whether or not the comparator output is still at the initial logic "1" level (block 1010).

The code setting of the current DAC circuit 356 is decrementally adjusted while the comparator output remains at the initial logic "1" level (repeat blocks 1010 and 1011) until the output of the comparator 357 switches from the initial logic "1" level to a logic "0" level. In particular, when the control process determines that the output of the comparator 357 is no longer at the initial logic "1" level (negative determination in block 1010), the control process will determine that the reference current $I_{REF}$ output from the current DAC circuit 356 is equal to, or at least substantially equal to, the DC baseband current being measured and the control process will record (e.g., store) the current DAC code setting (block 1009), wherein the recorded code setting represents the measurement for the DC baseband current.

Once the code setting has been recorded for the measured DC baseband current, the control process will determine if the baseband current measurements are complete for all individual I-phase and Q-phase baseband components $I^+$, $I^-$, $Q^+$, and $Q^-$ for the given baseband gain setting (block 1012). If there are one or more additional DC baseband currents to be measured (negative determination in block 1012), the calibration process flow returns to block 1003, wherein the current DAC circuit 356, the current sink circuits 351 and 352, and the DC LO inputs to the mixer stage are initialized and configured, as needed, to measure the next selected DC baseband current using the same measurement process (blocks 1006-1011) as discussed above.

When the DC baseband current measurements have been completed for all individual I-phase and Q-phase baseband components $I^+$, $I^-$, $Q^+$, and $Q^-$ for the given baseband gain setting (affirmative determination in block 1012), the control process will determine if the DC baseband current measurements (for all individual I-phase and Q-phase baseband components $I^+$, $I^-$, $Q^+$, and $Q^-$) are complete for all baseband gain step settings (block 1013). If there are one or more additional baseband gain step settings for the DC baseband currents that need to be measured (negative determination in block 1013), the calibration process flow returns to block 1002, wherein the baseband gain setting is set to the next gain step setting, and the current DAC circuit 356, the current sink circuits 351 and 352, and the DC LO inputs to the mixer stage, are initialized and configured, as needed, to measure the first selected DC baseband current for the new baseband gain setting, using the same measurement process (blocks 1006-1011) as discussed above.

When the DC baseband current measurements (for all individual I-phase and Q-phase baseband components $I^+$, $I^-$, $Q^+$, and $Q^-$) are complete for all baseband gain step settings (affirmative determination in block 1013), the calibration database will have recently recorded current DAC code settings for each measured DC baseband current $I^+$, $I^-$, $Q^+$, and $Q^-$ for each baseband gain step setting. The control process will then proceed to adjust the code settings of the first and second DC offset compensation DACs 370 and 372 (FIG. 3A), as needed, to minimize offset (imbalance) between (i) the DC baseband currents $I^+$ and $I^-$, (ii) the DC baseband currents $Q^+$ and $Q^-$, and (iii) the DC baseband currents for $I^+$ and $Q^+$, for a selected baseband gain setting (block 1014), at which time the calibration process terminates (block 1015). If the baseband gain setting is subsequently adjusted (increased or decreased), the calibration system can access the calibration database to determine the recently recorded current DAC codes for the measured DC baseband currents $I^+$, $I^-$, $Q^+$, and $Q^-$ for the newly adjusted baseband gain setting.

After the measurements, four digital codes representing the individual DC baseband currents for the four I-phase and Q-phase baseband components ($I^+$, $I^-$, $Q^+$, $Q^-$) are obtained, and the differences between the codes represent the imbalances contributing to spurs (e.g., an offset between $I^+$ and $I^-$ represents DC offset leading to LO leakage, and offset between $I^+$ and $Q^+$ represents the amplitude imbalance that degrades image rejection). In this manner, both the image rejection and the LO leakage can be improved through calibration to provide an RF signal generator system with superior spur performance.

Figure 11:
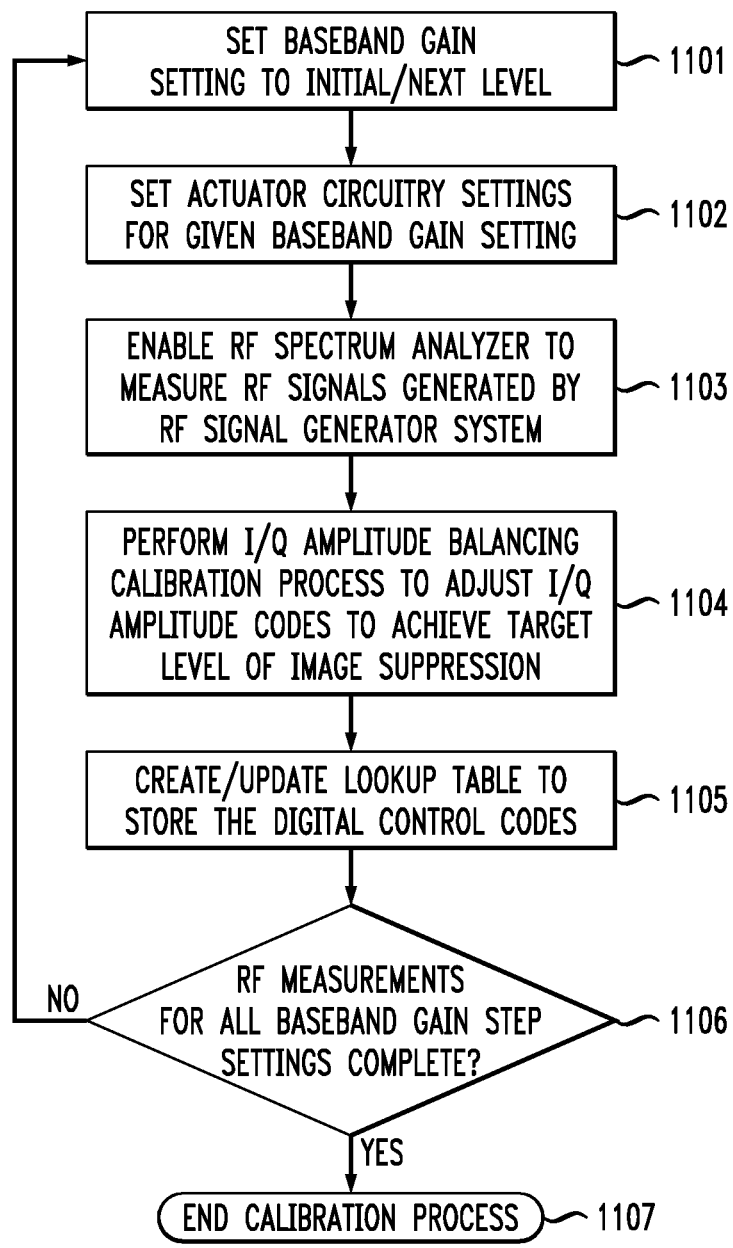
FIG. 11 illustrates a calibration process for performing RF measurements to control actuators in baseband and LO signal paths based on the RF measurement to achieve sideband image suppression in an RF signal generator system, according to an exemplary embodiment of the disclosure.

FIG. 11 illustrates a calibration process 1100 for performing RF measurements to control actuators in baseband and LO signal paths based on the RF measurements to achieve sideband image suppression in an RF signal generator system, according to an exemplary embodiment of the disclosure. In some embodiments, the calibration process 1100 comprises an exemplary procedure for performing the RF measurement and analysis in block 907 of FIG. 9. An initial step of the exemplary calibration process 1100 involves setting a baseband gain setting (e.g., gain step setting) to an initial level (block 1101). In some embodiments, the initial step also involves setting an RF gain setting (e.g., RF gain step setting) in instances wherein the RF signals are measured at the output RF_OUT of the RF signal generator circuit, as compared to measuring the RF signals at the output of the mixer stage before the amplifier/attenuator stage.

Next, the calibration process proceeds to set the actuator circuitry settings of the actuator circuits in the baseband and LO signal paths, based on the given baseband setting (block 1102). For example, the current actuator circuits in the I/Q signal paths are programmed to inject the previously determined compensation currents into the I/Q signal paths (e.g., to achieve DC offset compensation) for the given baseband gain setting, and the actuator circuitry in the LO signal paths are set with the proper phase codes previously determined to minimize the phase error of the complementary quadrature LO signals.

Next, an RF spectrum analyzer is enabled to measure RF signals that are generated by the RF signal generator system for the given settings (block 1103). In some embodiments, the RF measurements are obtained by performing spectral analysis of RF signals at a MIX-AMP interface and/or at an output (RF_OUT) of the RF signal generator system (see FIG. 1). The RF measurements can be performed using an off-chip or an on-chip RF spectrum analysis system in room temperature or low/cryogenic temperature environments. In some embodiments, the calibration process 1100 is performed to achieve a target level of sideband suppression (e.g., 60 dB).

Next, the RF measurements are utilized to determine an amount of image suppression achieved for the given code settings, and an I/Q amplitude balancing calibration process is performed to adjust the I/Q amplitude codes, as needed, to achieve the target level of sideband suppression (block 1104). The calibration control process then continues to create/update a lookup table in memory to store the final adjusted digital codes for the given baseband setting (block 1105). If the RF measurements for all baseband gain settings is not yet complete (negative determination in block 1106), the process is repeated (blocks 1101-1105), otherwise the RF measurements and calibration procedure terminates (block 1107).

It is to be appreciated that the exemplary calibration systems, circuitry, and methods as discussed herein provide significant advantages over conventional techniques that are commonly utilized to calibrate RF signal generators, etc. For example, as noted above, conventional techniques include RF measurement techniques which utilize on-chip or off-chip instrumentation that is configured to analyze the RF signals that are generated by the RF signal generator using, e.g., a complex spectrum analyzer, or a down-conversion receiver (in feedback loops) to extract the baseband signal components from the RF signal, and calibrate the DACs to compensate for imbalances that are detected in the extracted baseband signal components. The conventional RF measurement techniques are costly in terms of complexity, resource usage, and area overhead needed for on-chip implementation. In addition, such conventional RF techniques consume a significant amount of power, which is prohibitive at cryogenic temperatures.

In contrast to conventional calibration techniques which perform RF measurements, the exemplary calibration techniques as disclosed herein utilize DC measurements (e.g., static current measurements, and DC sensor signal measurements) which are much easier to perform and are less time consuming than RF measurements. In addition, the exemplary DC measurement techniques as discussed herein are significantly less costly in terms of hardware complexity and resources as compared to using on-chip spectrum analyzers or loopback receivers to detect signal imbalances. In addition, the DC measurement hardware, actuator circuitry (e.g., current mode actuators), and other calibration-related hardware can operate at very low power (e.g., order of milliwatts), and such hardware has a relatively low footprint (occupies small chip area), which is advantageous for on-chip implementation.

Another advantage to be noted is that current imbalances in the I/Q baseband signal paths which result in, e.g., a DC offset of a differential in-phase (I) signal in the I baseband signal path, a DC offset of a differential quadrature-phase (Q) signal in the Q baseband signal path, and an amplitude imbalance between the I and Q baseband signals in the baseband signal paths, can be readily detected using static current measurements, and adjusted by injecting static currents into the I and Q baseband signal paths using DC current mode actuation circuitry.

In particular, as noted above, current mode actuation circuitry can be distributed along the I and Q signal paths at one or more current mode interfaces between current mode components in the signal paths of an RF signal generator system (e.g., AWG system) to provide compensation currents to adjust DC offsets of the differential current signals in the I and Q baseband signal paths. In addition, an amplitude imbalance between the I and Q baseband signals in the baseband signal paths can be readily adjusted by injecting static currents into the I and Q signal paths through current mode actuation circuitry which adjusts the reference currents used by current DACs to generate the analog I/Q baseband signals.

In addition, current mode actuation circuitry can be utilized to inject DC compensation currents into clock signal paths of clock signal circuitry (which is utilized to generate complementary quadrature LO signals) to achieve duty cycle calibration of differential clock signals and fine phase error adjustment of I/Q LO signals that are used to drive an upconverting mixer of the RF signal generator. Advantageously, the current mode actuation circuitry for DC offset calibration, I/Q amplitude calibration, I/Q LO signal calibration, etc., is programmatically controlled using digital control signals to achieve fine current adjustment resolution for precise DC offset, amplitude balance, and I/Q phase error adjustments to achieve high-precision LO leakage and image suppression through low power DC actuation and sensor circuitry, and digital control.

Another advantage to be noted is that the same current measurement hardware (e.g., the current measurement circuitry such as shown in FIGS. 3A and 3B) is utilized to measure all components $I^+$, $I^-$, $Q^+$, $Q^-$ of the differential in-phase and differential quadrature-phase baseband signal components. In this regard, the current measurements are not sensitive to the intrinsic offset of the current measurement instrumentation, whereby inaccuracies of the current measurement hardware will not adversely impact the accuracy of the measurements. For example, since the same current measurement hardware is utilized to measure the DC currents for all components $I^+$, $I^-$, $Q^m$, $Q^-$, in the absence of drift, any intrinsic offset in the circuitry, e.g., comparator offset, will be applied to all the DC current measurements, which, effectively cancels out such intrinsic errors in the DC current measurements. In this regard, the measuring instrumentation does not need high absolute accuracy to ensure that all baseband currents are equal to one another, as any intrinsic error in the measurements will not affect the ability of the calibration process to correct imbalances in the I/Q baseband currents by equalizing the baseband currents for $\{I^+, I^-\}$, $\{Q^+, Q^-\}$, and $\{I^+, Q^+\}$.

Moreover, the same calibration hardware is utilized to calibrate both LO leakage and image rejection. In addition, since the same hardware is utilized to measure DC currents for all I-phase and Q-phase baseband components $I^+$, $I^-$, $Q^+$, $Q^-$ so that imbalances can be corrected, the overall area needed for the calibration instrumentation is significantly reduced. For example, for on-chip instrumentation, utilizing the same calibration hardware to measure all I-phase and $Q^-$ phase baseband components $I^+$, $I^-$, $Q^+$, $Q^-$ allows for reduced area overhead needed for the on-chip instrumentation, e.g., less than 10%.

Another advantage to be noted is that the static currents for the $I^+$, $I^-$, $Q^+$, and $Q^-$ signal paths are sensed at low impedance nodes (e.g., nodes INT_0 and INT_1, FIG. 3A) at the output of a current mode stage of the RF signal generator system, which serves to minimize the loading effects of the current measurement circuitry, and thus minimize any reduction in bandwidth during normal mode operation of the RF signal generator system. In addition, in the exemplary embodiment of FIG. 3A, where the current measurement circuitry is coupled to the output nodes of the current-commutating mixer stage 320, the voltage headroom across the transistors in the baseband signal input stage 310 and the transistors in the current-commutating mixer stage 320 can be maintained largely the same, ensuring that in a calibration mode, the DC baseband currents are measured under conditions that match those under normal operating mode. In other words, the current mode architecture shown in FIG. 3A maintains a similar voltage headroom across the baseband and mixer transistors in both the normal and the calibration modes.

Another advantage to be noted is that the current measurement circuitry utilizes a wide range, high-resolution current mode DAC (e.g., as shown in FIGS. 4A, 4B, and 4C) having coarse and fine DAC segments for generating a reference current $I_{REF}$ with a desired resolution, over a wide range of reference currents $I_{REF}$, to perform current comparison between a baseband current being measured and the reference current with high accuracy. In addition, as noted above, to support wide range scaling, the current mode DAC implements a prescaler DAC segment that is used to scale the output range of the current mode DAC so that the output reference current $I_{REF}$ generated by the current mode DAC can be scaled to be commensurate with the amplitude levels of the baseband currents to be measured and thereby allow DC measurements to be performed at higher and lower amplitude levels (e.g., variation is performed over a 10× range such as from 35 µA to 350 µA).

Another advantage to be noted is that the exemplary calibration circuitry as described herein is configured to operate at low power (e.g., milliwatt range) and low area overhead, which allows such calibration circuitry to be readily implemented as on-chip calibration instrumentation to calibrate cryo-electronics used for quantum computing applications and other applications or systems which operate at cryogenic temperatures. For example, in the context of quantum computing systems which implement superconducting qubits and other components, the exemplary calibration circuitry as described herein can be readily implemented on-chip with an AWG system. In such embodiments, the on-chip calibration instrumentation is utilized to calibrate the AWG system to generate high-fidelity RF control pulses to control superconducting qubits and thereby achieve high-fidelity qubit gate operations (e.g., single-qubit gate operations, entanglement gate operations, etc.). In particular, the exemplary calibration techniques as discussed herein can be utilized to generate high-fidelity RF control pulses having no, or significantly suppressed, LO leakage and sideband image spurs, which would otherwise lead to lower fidelity gate operations.

Figure 12:
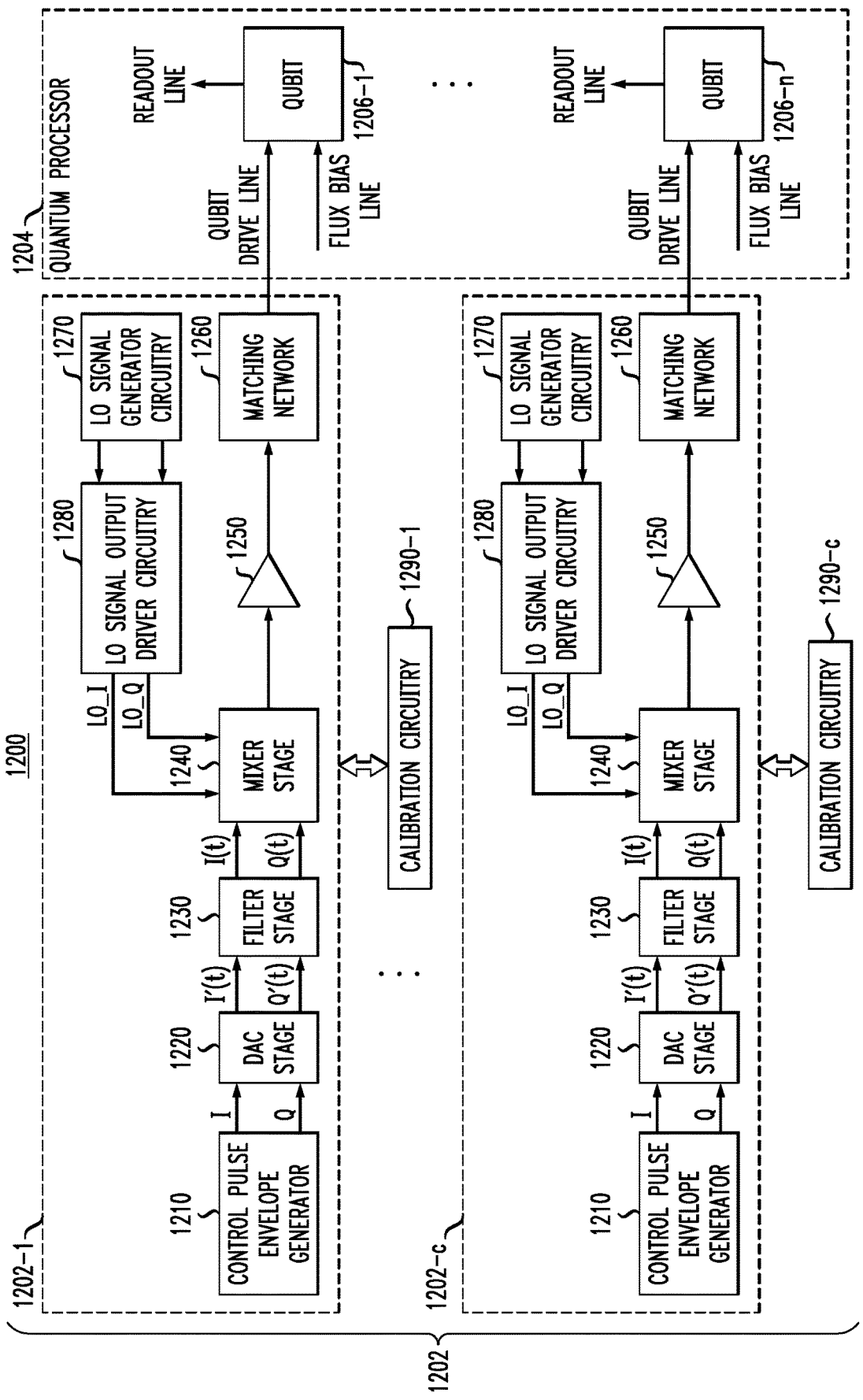
FIG. 12 schematically illustrates a quantum computing system which implements an arbitrary waveform generator system and calibration circuitry, according to an exemplary embodiment of the disclosure.

FIG. 12 schematically illustrates a quantum computing system 1200 which implements an arbitrary waveform generator system and calibration circuitry, according to an exemplary embodiment of the disclosure. The quantum computing system 1200 comprises an arbitrary waveform generator system 1202 (or AWG system 1202) and a quantum processor 1204. The quantum processor 1204 comprises a plurality (n) of superconducting qubits 1206-1, . . . , 1206-n. The superconducting qubits 1206-1, . . . , 1206-n may comprise superconducting transmon qubits, superconducting fluxonium qubits, superconducting multi-mode qubits, and other types, or combinations of different types, of superconducting qubits, which are suitable for a given application. Further, in some embodiments, the quantum processor 1204 comprises coupler circuits (e.g., passive coupler circuits and/or active coupler circuits), wherein a given coupler circuit is configured to couple a pair of superconducting qubits to implement entanglement gate operations (e.g., two-qubit gate operations).

The quantum processor 1204 further comprises a plurality of control lines (e.g., transmission line resonators) including, but not limited to, qubit drive lines, flux bias lines, state readout lines, and active coupler drive lines, etc. In some embodiments, the qubit drive lines are coupled (e.g., capacitively coupled) to respective ones of the superconducting qubits 1206-1, . . . 1206-n. The qubit drive lines are configured to apply RF control pulses (which are generated by the AWG system 1202) to the respective superconducting qubits 1206-1, . . . , 1206-n to independently change the states of the respective superconducting qubits (e.g., single-qubit gate operations), e.g., change the state of a given superconducting qubit to be in, e.g., a ground state |0⟩, an excited state |1⟩, or a superposition state. As is known in the art, the state of a superconducting qubit can be changed by applying an RF control pulse with a center frequency that is equal to a transition frequency (denoted $f_{01}$) of the qubit, wherein the transition frequency $f_{01}$ corresponds to an energy difference between the ground state $|0\rangle$ and excited state $|1\rangle$ of the qubit. In some embodiments, the superconducting qubits 1206-1, ..., 1206-n are configured to have different operating frequencies (transition frequencies) so that the transition frequencies of neighboring qubits are detuned.

The state readout lines are coupled to respective ones of the superconducting qubits 1206-1, ..., 1206-n to read the states of the superconducting qubits using known techniques (e.g., dispersive readout). In embodiments where the superconducting qubits comprise frequency-tunable qubits (e.g., flux-tunable transmon qubits or fluxonium qubits, etc.), the flux bias control lines would be coupled (e.g., inductively coupled) to respective superconducting qubits to apply flux bias control signals to tuning structures of the superconducting qubits to tune the operating frequencies of the tunable qubits, as needed for a given application. In addition, for active coupler circuits, coupler drive lines would be coupled (e.g., capacitively coupled) to respective coupler circuits, wherein each coupler circuit would have an operating frequency or transition frequency. A given coupler circuit would be driven by an RF control pulse generated by the AWG system 1202, or some other pulse signal generator, to enable exchange coupling between superconducting qubits that are coupled through the given coupler circuit and implement a two-qubit gate operation.

As shown in FIG. 12, the AWG system 1202 comprises a multi-channel AWG framework which comprises a plurality of AWG channels 1202-1, ..., 1202-c. The AWG channels 1202-1, ..., 1202-c are configured to generate RF control pulses that are applied on the qubit drive lines to control respective ones of the superconducting qubits 1206-1, ..., 1206-n. Although not specifically shown in FIG. 12, in some embodiments, the AWG system 1202 would include AWG channels to generate control signals that are applied to the coupler drive lines to control active coupler devices of the quantum processor 1204.

The AWG channels 1202-1, ..., 1202-c each comprise a respective control pulse envelope generator 1210, a DAC stage 1220, a baseband filter stage 1230, an I/Q mixer stage 1240, an amplifier/attenuator stage 1250, a matching network 1260, an LO signal generator circuit 1270, and an LO signal output driver circuit 1280. The control pulse envelope generators 1210 are configured to implement pulse-shaping techniques to generate RF control pulses with desired control pulse envelope shapes (e.g., Gaussian pulses, cosine pulses (e.g., sum of half cosines), hyperbolic secant pulses, etc.), which are applied to superconducting qubits or active qubit coupler circuits to perform single qubit gate operations, entanglement gate operations, etc. The shaped control pulses are calibrated to drive $f_{01}$ transitions of the qubits, while suppressing $f_{12}$ and higher transitions. Essentially, such pulse shaping techniques suppress/reduce the transients associated with turning the control pulses on and off. In addition, pulse-shaping techniques include DRAG (derivative removal by adiabatic gate) correction pulses, which can be used in conjunction with shaped pulses (such as Gaussian pulses, cosine pulses, or hyperbolic secant pulses) to further suppress unwanted state transitions, while maintaining a same pulse envelope area (or integral of pulse envelope).

In each AWG channel of the AWG system 1202, the digital control pulse envelope signals (digital I and Q components) are converted to analog control pulse envelope signals (analog baseband I/Q signals), and the I/Q mixer stage 1240 modulates the quadrature LO signals using the baseband I/Q signals by performing, e.g., SSB modulation, as discussed above, to generate a modulated signal in the form of an RF control pulse that is applied, e.g., on a qubit drive line to control a given qubit. The functions of the various stages 1220, 1230, 1250, 1260, 1270, and 1280 are the same or similar to the corresponding stages in FIG. 1, FIG. 2, etc., the details of which will not be repeated.

As further shown in FIG. 12, in some embodiments, each AWG channel 1202-1, ..., 1202-c of the AWG system 1202 comprises dedicated calibration circuitry 1290-1, ..., 1290-c, which is implemented on-chip with the AWG system 1202. The calibration circuitry 1290-1, ..., 1290-c is configured to calibrate the I/Q signal currents for the respective AWG channel 1202-1, ..., 1202-c of the AWG system 1202, when the AWG channels 1202-1, ..., 1202-c are configured in calibration mode, as discussed above. The calibration circuitry 1290-1, ..., 1290-c comprises the hardware control and logic circuitry (e.g., current measurement circuits, current mode DACs, control logic circuitry, current imbalance correction circuitry, etc.) as discussed above. In some embodiments, the calibration circuitry 1290-1, ..., 1290-c is controlled by software running on a computing platform that controls the quantum computing system 1200.

Figure 13:
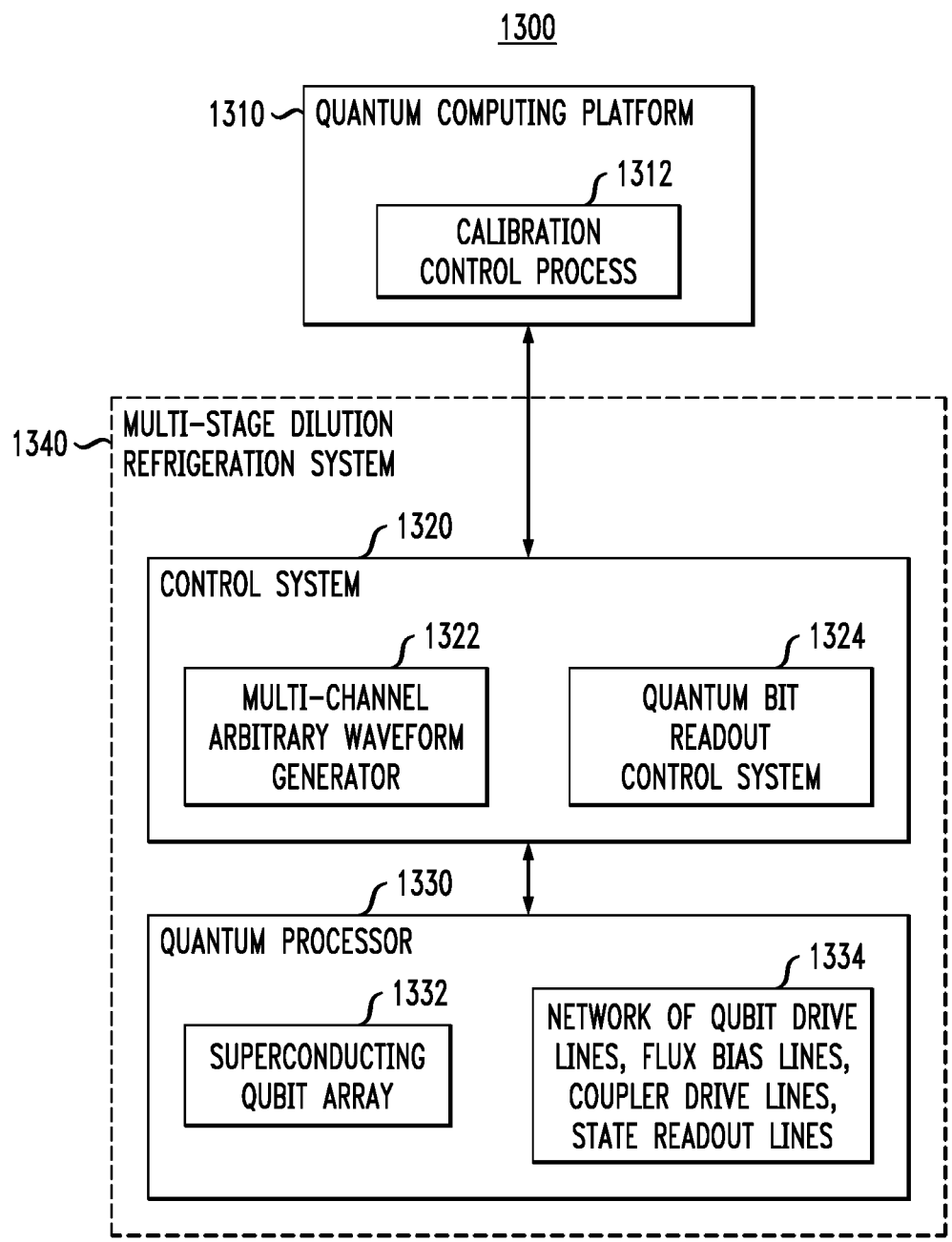
FIG. 13 schematically illustrates a quantum computing system, according to another exemplary embodiment of the disclosure.

FIG. 13 schematically illustrates a quantum computing system, according to another exemplary embodiment of the disclosure. In particular, FIG. 13 schematically illustrates a quantum computing system 1300 which comprises a quantum computing platform 1310, a control system 1320, and a quantum processor 1330. In some embodiments, the quantum computing platform 1310 implements software control programs such as a calibration control process 1312 which performs functions such as configuring the AWG system and calibration circuit to be in calibration mode, controlling the execution of high-level functions of the calibration processes, etc.

Furthermore, the quantum computing platform 1310 executes calibration procedures that are periodically performed on a quantum system such as a quantum processor to calibrate various quantum elements such as readout resonators, data qubits, and coupler circuitry, etc., to enable high-fidelity gate operations (e.g., single-qubit gate operations and entanglement gate operations). For example, various types of in-situ calibration procedures are periodically performed to, e.g., determine the resonant frequencies of readout resonators, determine the transition frequencies of qubits, determine coherence times ($T_1$) of the qubits (where the coherence time $T_1$ of a given qubit denotes the time it takes for the qubit state to decay from the excited state to the ground state), determine transverse relaxation times ($T_2$) of the qubits (or dephasing time), calibrate RF control pulses that are applied to qubits to perform single-qubit gate operations, calibrate RF control pulses that are applied to active coupler circuits to perform entanglement gate operations, etc. The calibration procedures result in determining various control parameters that are maintained in a calibration database and periodically updated on the order of seconds, minutes, hours, days, etc., as needed, depending on the type of quantum element and the operating characteristics of the quantum computing system, and other factors as is understood by those of ordinary skill in the art.

In some embodiments, the control system 1320 comprises a multi-channel arbitrary waveform generator 1322, and a quantum bit readout control system 1324 (wherein FIG. 12 schematically illustrates an exemplary AWG system 1202 which can be implemented for block 1322 of the control system 1320). The quantum processor 1330 comprises a solid-state semiconductor chip having a superconducting qubit array 1332 and a network 1334 of qubit drive lines, coupler drive lines, and qubit state readout lines, and other circuit QED components that may be needed for a given application or quantum system configuration.

In some embodiments, the control system 1320 and the quantum processor 1330 are disposed in a dilution refrigeration system 1340 which can generate cryogenic temperatures that are sufficient to operate components of the control system 1320 for quantum computing applications. For example, the quantum processor 1330 may need to be cooled down to near-absolute zero, e.g., 10-15 millikelvin (mK), to allow the superconducting qubits to exhibit quantum behaviors. In some embodiments, the dilution refrigeration system 1340 comprises a multi-stage dilution refrigerator where the components of the control system 1320 can be maintained at different cryogenic temperatures, as needed. For example, while the quantum processor 1330 may need to be cooled down to, e.g., 10-15 mK, the circuit components of the control system 1320 may be operated at cryogenic temperatures greater than 10-15 mK (e.g., cryogenic temperatures in a range of 3K-4K), depending on the configuration of the quantum computing system.

In some embodiments, the superconducting qubit array 1332 comprises a plurality of superconducting transmon qubits and superconducting tunable coupler qubits, in which each pair of superconducting qubits is connected by a respective superconducting qubit coupler, using techniques as discussed herein. The network 1334 of qubit drive lines, flux bias lines, coupler drive lines, and qubit state readout lines, etc., are configured to apply microwave control signals to superconducting qubits and coupler circuitry in the superconducting qubit array 1332 to perform various types of gate operations, e.g., single-gate operations, entanglement gate operations, etc., as well as read the quantum states of the superconducting qubits. The network 1334 of qubit drive lines, flux bias lines, coupler drive lines, and qubit state readout lines, etc., is coupled to the control system 1320 through a suitable hardware input/output (I/O) interface, which couples I/O signals between the control system 1320 and the quantum processor 1330. For example, the hardware I/O interface may comprise various types of hardware and components, such as RF cables, wiring, RF elements, optical fibers, heat exchanges, filters, amplifiers, isolators, etc.

Figure 14:
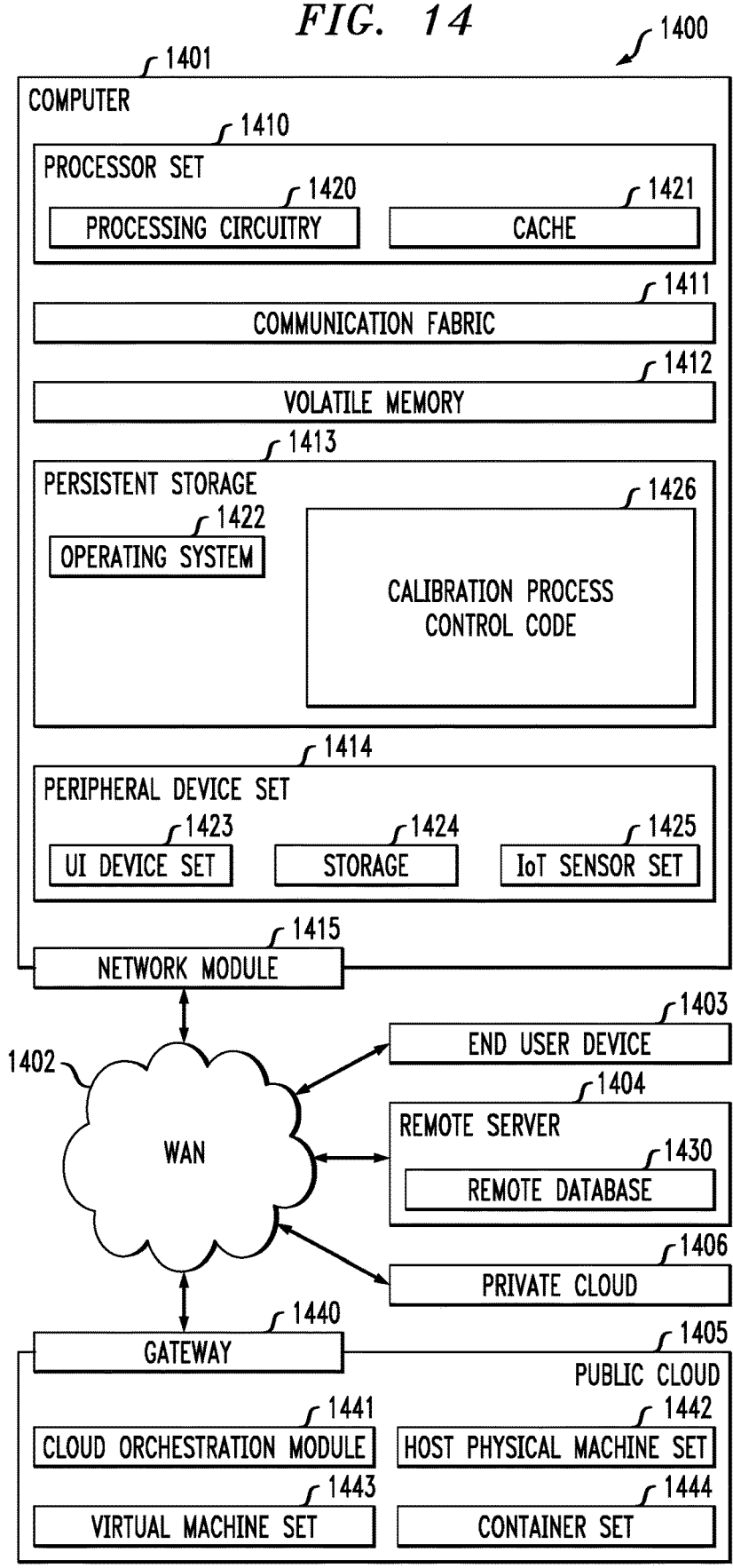
FIG. 14 schematically illustrates an exemplary computing environment which is configured to execute program instructions for controlling calibration processes of a calibration system, according to an exemplary embodiment of the disclosure.

The quantum computing platform 1310 comprises a software and hardware platform which comprises various software layers that are configured to perform various functions, including, but not limited to, generating and implementing various quantum applications using suitable quantum programming languages, configuring and implementing various quantum gate operations, compiling quantum programs into a quantum assembly language, implementing and utilizing a suitable quantum instruction set architecture (ISA), performing calibration operations to calibrate the quantum circuit elements and gate operations, etc. In addition, the quantum computing platform 1310 comprises a hardware architecture of processors, memory, etc., which is configured to control the execution of quantum applications, and interface with the control system 1320 to (i) generate digital control signals that are converted to analog microwave control signals by the control system 1320, to control operations of the quantum processor 1330 when executing a given quantum application, and (ii) to obtain and process digital signals received from the control system 1320, which represent the processing results generated by the quantum processor 1330 when executing various gate operations for a given quantum application. In some exemplary embodiments, the quantum computing platform 1310 of the quantum computing system 1300 may be implemented using any suitable computing system architecture (e.g., as shown in FIG. 14) which is configured to implement methods to support quantum computing operations by executing computer readable program instructions that are embodied on a computer program product which includes a computer readable storage medium (or media) having such computer readable program instructions thereon for causing a processor to perform control methods as discussed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1400 contains an example of an environment for the execution of at least some of the computer code involved in performing the inventive methods, such as calibration process control code 1426 for controlling various calibration processes, such as shown in FIGS. 9, 10, and 11. In addition to block 1426, computing environment 1400 includes, for example, computer 1401, wide area network (WAN) 1402, end user device (EUD) 1403, remote server 1404, public cloud 1405, and private cloud 1406. In this embodiment, computer 1401 includes processor set 1410 (including processing circuitry 1420 and cache 1421), communication fabric 1411, volatile memory 1412, persistent storage 1413 (including operating system 1422 and block 1426, as identified above), peripheral device set 1414 (including user interface (UI), device set 1423, storage 1424, and Internet of Things (IoT) sensor set 1425), and network module 1415. Remote server 1404 includes remote database 1430. Public cloud 1405 includes gateway 1440, cloud orchestration module 1441, host physical machine set 1442, virtual machine set 1443, and container set 1444.

Computer 1401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1430. As is well understood in the art of computer technology, and depending upon the technology, performance of a computer-implemented method may be distributed among multiple computers and/or between multiple locations. On the other hand, in this presentation of computing environment 1400, detailed discussion is focused on a single computer, specifically computer 1401, to keep the presentation as simple as possible. Computer 1401 may be located in a cloud, even though it is not shown in a cloud in FIG. 14. On the other hand, computer 1401 is not required to be in a cloud except to any extent as may be affirmatively indicated.

Processor set 1410 includes one, or more, computer processors of any type now known or to be developed in the future. Processing circuitry 1420 may be distributed over multiple packages, for example, multiple, coordinated integrated circuit chips. Processing circuitry 1420 may implement multiple processor threads and/or multiple processor cores. Cache 1421 is memory that is located in the processor chip package(s) and is typically used for data or code that should be available for rapid access by the threads or cores running on processor set 1410. Cache memories are typically organized into multiple levels depending upon relative proximity to the processing circuitry. Alternatively, some, or all, of the cache for the processor set may be located "off chip." In some computing environments, processor set 1410 may be designed for working with qubits and performing quantum computing.

Computer readable program instructions are typically loaded onto computer 1401 to cause a series of operational steps to be performed by processor set 1410 of computer 1401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1421 and the other storage media discussed below. The program instructions, and associated data, are accessed by processor set 1410 to control and direct performance of the inventive methods. In computing environment 1400, at least some of the instructions for performing the inventive methods may be stored in block 1426 in persistent storage 1413.

Communication fabric 1411 is the signal conduction paths that allow the various components of computer 1401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 1412 is any type of volatile memory now known or to be developed in the future. Examples include dynamic type random access memory (RAM) or static type RAM. Typically, the volatile memory is characterized by random access, but this is not required unless affirmatively indicated. In computer 1401, the volatile memory 1412 is located in a single package and is internal to computer 1401, but, alternatively or additionally, the volatile memory may be distributed over multiple packages and/or located externally with respect to computer 1401.

Persistent storage 1413 is any form of non-volatile storage for computers that is now known or to be developed in the future. The non-volatility of this storage means that the stored data is maintained regardless of whether power is being supplied to computer 1401 and/or directly to persistent storage 1413. Persistent storage 1413 may be a read only memory (ROM), but typically at least a portion of the persistent storage allows writing of data, deletion of data and re-writing of data. Some familiar forms of persistent storage include magnetic disks and solid-state storage devices. Operating system 1422 may take several forms, such as various known proprietary operating systems or open source Portable Operating System Interface type operating systems that employ a kernel. The code included in block 1426 typically includes at least some of the computer code involved in performing the inventive methods.

Peripheral device set 1414 includes the set of peripheral devices of computer 1401. Data communication connections between the peripheral devices and the other components of computer 1401 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1423 may include components such as a display screen, speaker, microphone, wearable devices (such as goggles and smart watches), keyboard, mouse, printer, touchpad, game controllers, and haptic devices. Storage 1424 is external storage, such as an external hard drive, or insertable storage, such as an SD card. Storage 1424 may be persistent and/or volatile. In some embodiments, storage 1424 may take the form of a quantum computing storage device for storing data in the form of qubits. In embodiments where computer 1401 is required to have a large amount of storage (for example, where computer 1401 locally stores and manages a large database) then this storage may be provided by peripheral storage devices designed for storing very large amounts of data, such as a storage area network (SAN) that is shared by multiple, geographically distributed computers. IoT sensor set 1425 is made up of sensors that can be used in Internet of Things applications. For example, one sensor may be a thermometer and another sensor may be a motion detector.

Network module 1415 is the collection of computer software, hardware, and firmware that allows computer 1401 to communicate with other computers through WAN 1402. Network module 1415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1415 are performed on the same physical hardware device. In other embodiments (for example, embodiments that utilize software-defined networking (SDN)), the control functions and the forwarding functions of network module 1415 are performed on physically separate devices, such that the control functions manage several different network hardware devices. Computer readable program instructions for performing the inventive methods can typically be downloaded to computer 1401 from an external computer or external storage device through a network adapter card or network interface included in network module 1415.

WAN 1402 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 1403 is any computer system that is used and controlled by an end user (for example, a customer of an enterprise that operates computer 1401), and may take any of the forms discussed above in connection with computer 1401. EUD 1403 typically receives helpful and useful data from the operations of computer 1401. For example, in a hypothetical case where computer 1401 is designed to provide a recommendation to an end user, this recommendation would typically be communicated from network module 1415 of computer 1401 through WAN 1402 to EUD 1403. In this way, EUD 1403 can display, or otherwise present, the recommendation to an end user. In some embodiments, EUD 1403 may be a client device, such as thin client, heavy client, mainframe computer, desktop computer and so on.

Remote server 1404 is any computer system that serves at least some data and/or functionality to computer 1401. Remote server 1404 may be controlled and used by the same entity that operates computer 1401. Remote server 1404 represents the machine(s) that collect and store helpful and useful data for use by other computers, such as computer 1401. For example, in a hypothetical case where computer 1401 is designed and programmed to provide a recommendation based on historical data, then this historical data may be provided to computer 1401 from remote database 1430 of remote server 1404.

Public cloud 1405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1405 is performed by the computer hardware and/or software of cloud orchestration module 1441. The computing resources provided by public cloud 1405 are typically implemented by virtual computing environments that run on various computers making up the computers of host physical machine set 1442, which is the universe of physical computers in and/or available to public cloud 1405. The virtual computing environments (VCEs) typically take the form of virtual machines from virtual machine set 1443 and/or containers from container set 1444. It is understood that these VCEs may be stored as images and may be transferred among and between the various physical machine hosts, either as images or after instantiation of the VCE. Cloud orchestration module 1441 manages the transfer and storage of images, deploys new instantiations of VCEs and manages active instantiations of VCE deployments. Gateway 1440 is the collection of computer software, hardware, and firmware that allows public cloud 1405 to communicate through WAN 1402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 1406 is similar to public cloud 1405, except that the computing resources are only available for use by a single enterprise. While private cloud 1406 is depicted as being in communication with WAN 1402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1405 and private cloud 1406 are both part of a larger hybrid cloud.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device, comprising:
   a radio frequency signal generator which is configured to upconvert a baseband signal to a radio frequency signal using a first local oscillator signal and a second local oscillator signal, the radio frequency signal generator comprising a first signal path to process a first differential signal, and a second signal path to process a second differential signal; and a calibration system configured to calibrate the radio frequency signal generator, wherein the calibration system comprises calibration control circuitry and actuator circuitry which comprises a plurality of digitally controllable current actuator circuits which are coupled to the first signal path and to the second signal path;

wherein in response to digital control signals generated by the calibration control circuitry, the actuator circuitry is configured to:
  inject currents into the first signal path and into the second signal path to adjust an offset of the first differential signal, to adjust an offset of the second differential signal, and to adjust amplitudes of the first differential signal and the second differential signal to balance the amplitudes; and
  adjust at least one of: respective duty cycles of the first local oscillator signal and the second local oscillator signal; and a phase difference between the first local oscillator signal and the second local oscillator signal.

2. The device of claim 1, wherein the plurality of digitally controllable current actuator circuits comprises:
  a first plurality of digitally controllable current actuator circuits which are coupled to the first signal path and to the second signal path at least at one of (i) a first current mode interface between a baseband digital-to-analog converter stage and a baseband filter stage of the radio frequency signal generator and (ii) a second current mode interface between the baseband filter stage and a mixer stage of the radio frequency signal generator, and which are configured to inject the currents into the first signal path and the second signal path to adjust the offset of the first differential signal and the offset of the second differential signal; and
  a second plurality of digitally controllable current actuator circuits which are configured to adjust reference currents of the baseband digital-to-analog converter stage to balance the amplitudes of the first differential signal and the second differential signal.

3. The device of claim 1, wherein the actuator circuitry further comprises digitally controllable current actuator circuits which are configured to inject currents into a first local oscillator clock signal path and a second local oscillator clock signal path to adjust the respective duty cycles of the first local oscillator signal and the second local oscillator signal.

4. The device of claim 1, wherein:
  the actuator circuitry comprises a plurality of digitally controllable segmented driver actuator circuits which are included in buffer circuitry for driving local oscillator inputs of a mixer stage of the radio frequency signal generator with the first local oscillator signal and the second local oscillator signal; and
  the plurality of digitally controllable segmented driver actuator circuits are selectively controlled in response to digital control signals generated by the calibration control circuitry to adjust a drive strength of the buffer circuitry and thereby adjust the phase difference between the first local oscillator signal and the second local oscillator signal.

5. The device of claim 1, wherein:
  the calibration system further comprises a current measurement circuit which is configured, during a calibration process, to measure a first current and a second current in the first signal path, and to measure a first current and a second current in the second signal path;
  the calibration control circuitry is configured to determine a difference between the measured first current and the measured second current in the first signal path, and generate a first digital control signal based on the determined difference between the measured first current and the measured second current in the first signal path;
  the calibration control circuitry is configured to determine a difference between the measured first current and the measured second current in the second signal path, and generate a second digital control signal based on the determined difference between the measured first current and the measured second current in the second signal path;
  the calibration control circuitry is configured to determine a difference between the measured first current in the first signal path and the measured first current in the second signal path, and generate a third digital control signal based on the determined difference between the measured first current in the first signal path and the measured first current in the second signal path; and
  in response to at least one of the first digital control signal, the second digital control signal, and the third digital control signal, the actuator circuitry generates the currents that are injected into the first signal path and the second signal path to at least one of:
  compensate for the determined difference between the measured first current and the measured second current in the first signal path and thereby adjust the offset of the first differential signal;
  compensate for the determined difference between the measured first current and the measured second current in the second signal path and thereby adjust the offset of the second differential signal; and
  compensate for the determined difference between the measured first current in the first signal path and the measured first current in the second signal path and thereby adjust and balance the amplitudes of the first differential signal and the second differential signal.

6. The device of claim 1, further comprising:
  first sensor circuitry comprising low pass filter circuitry, which is configured to measure the duty cycle of the first local oscillator signal and to measure the duty cycle of the second local oscillator signal and generate first sensor signals which comprise direct current voltages that are proportional to the respective measured duty cycles of the first local oscillator signal and the second local oscillator signal; and
  second sensor circuitry comprising exclusive-OR circuitry and low pass filter circuitry, which is configured to measure the phase difference between the first local oscillator signal and the second local oscillator signal and generate a second sensor signal which comprises a direct current voltage that is proportional to the measured phase difference;
  wherein the calibration control circuitry is configured to process the first sensor signals and the second sensor signal and generate one or more digital control signals to cause the actuator circuitry to at least one of: adjust the duty cycles of the first local oscillator signal and the second local oscillator signal; and adjust the phase difference between the first local oscillator signal and the second local oscillator signal.

7. The device of claim 1, further comprising:
local oscillator signal generator circuitry comprising clock receiver circuitry and divider circuitry;
wherein the clock receiver circuitry is configured to receive and buffer a differential clock signal comprising a non-inverted clock signal and an inverted clock signal, and to drive an input of the divider circuitry;
wherein the divider circuitry is configured to receive the differential clock signal output from the clock receiver circuitry and convert the differential clock signal into quadrature local oscillator signals comprising the first local oscillator signal and the second local oscillator signal; and
wherein the clock receiver circuitry comprises a plurality of digitally controllable current actuator circuits which are configured to inject current into a first clock signal path to adjust a duty cycle of the non-inverted clock signal, and to inject current into a second clock signal path to adjust a duty cycle of the inverted clock signal.

8. The device of claim 7, further comprising:
a first sensor comprising low pass filter circuitry which is coupled to outputs of the clock receiver circuitry and configured to measure the respective duty cycles of the non-inverted clock signal and the inverted clock signal of the differential clock signal and generate first sensor signals which comprise direct current voltages that are proportional to the respective measured duty cycles of the non-inverted clock signal and the inverted clock signal of the differential clock signal;
wherein the calibration control circuitry is configured to process the first sensor signals and generate digital control signals to cause the plurality of digitally controllable current actuator circuits of the clock receiver circuitry to inject currents into the first clock signal path and the second clock signal path, as needed, to adjust the respective duty cycles of the non-inverted clock signal and the inverted clock signal of the differential clock signal.

9. The device of claim 7, further comprising:
buffer circuitry coupled to an output of the divider circuitry, and configured to drive local oscillator inputs of a mixer stage of the radio frequency signal generator with the first local oscillator signal and the second local oscillator signal;
wherein the buffer circuitry comprises a plurality of digitally controllable segmented driver actuator circuits that are selectively controlled in response to digital control signals generated by the calibration control circuitry to adjust a phase difference between the first local oscillator signal and the second local oscillator signal to obtain substantially orthogonal phases between the first local oscillator signal and the second local oscillator signal.

10. The device of claim 1, wherein the calibration control circuitry is configured to receive and process spectral analysis measurements of radio frequency signals generated by the radio frequency signal generator, and generate the digital control signals to control the actuator circuitry based at least in part on the spectral analysis measurements, wherein the spectral analysis measurements are provided from a radio frequency spectrum analyzer circuit.

11. A system, comprising:
a quantum processor comprising at least one superconducting quantum bit;
an arbitrary waveform generator system comprising at least one arbitrary waveform generator channel configured to utilize a first local oscillator signal and a second local oscillator signal to convert a baseband signal to a radio frequency control pulse which controls the at least one superconducting quantum bit, the at least one arbitrary waveform generator channel comprising a first signal path to process a first differential signal, and a second signal path to process a second differential signal, wherein the first differential signal comprises a differential in-phase signal component of the baseband signal, and the second differential signal comprises a differential quadrature-phase signal component of the baseband signal; and
a calibration system configured to calibrate the at least one arbitrary waveform generator channel, wherein the calibration system comprises calibration control circuitry and actuator circuitry;
wherein in response to digital control signals generated by the calibration control circuitry, the actuator circuitry is configured to:
inject currents into the first signal path and into the second signal path to adjust an offset of the first differential signal, to adjust an offset of the second differential signal, and to adjust amplitudes of the first differential signal and the second differential signal to balance the amplitudes; and
adjust at least one of: respective duty cycles of the first local oscillator signal and the second local oscillator signal; and a phase difference between the first local oscillator signal and the second local oscillator signal.

12. The system of claim 11, wherein the actuator circuitry comprises:
a first plurality of digitally controllable current actuator circuits which are coupled to the first signal path and to the second signal path at least at one of (i) a first current mode interface between a baseband digital-to-analog converter stage and a baseband filter stage of the at least one arbitrary waveform generator channel and (ii) a second current mode interface between the baseband filter stage and a mixer stage of the at least one arbitrary waveform generator channel, and which are configured to inject the currents into the first signal path and the second signal path to adjust the offset of the first differential signal and the offset of the second differential signal; and
a second plurality of digitally controllable current actuator circuits which are configured to adjust reference currents of the baseband digital-to-analog converter stage to balance the amplitudes of the first differential signal and the second differential signal.

13. The system of claim 11, wherein the actuator circuitry comprises a plurality of digitally controllable current actuator circuits which are configured to inject currents into a first local oscillator clock signal path and a second local oscillator clock signal path to adjust the duty cycles of the first local oscillator signal and the second local oscillator signal.

14. The system of claim 11, wherein:
the actuator circuitry comprises a plurality of digitally controllable segmented driver actuator circuits which are included in buffer circuitry for driving local oscillator inputs of a mixer stage of the at least one arbitrary waveform generator channel with the first local oscillator signal and the second local oscillator signal; and
the plurality of digitally controllable segmented driver actuator circuits are selectively controlled in response to digital control signals generated by the calibration control circuitry to adjust a drive strength of the buffer circuitry and thereby adjust the phase difference between the first local oscillator signal and the second local oscillator signal.

15. The system of claim 11, wherein:
the calibration system further comprises a current measurement circuit which is configured, during a calibration process, to measure a first current and a second current in the first signal path, and to measure a first current and a second current in the second signal path;
the calibration control circuitry is configured to determine a difference between the measured first current and the measured second current in the first signal path, and generate a first digital control signal based on the determined difference between the measured first current and the measured second current in the first signal path;
the calibration control circuitry is configured to determine a difference between the measured first current and the measured second current in the second signal path, and generate a second digital control signal based on the determined difference between the measured first current and the measured second current in the second signal path;
the calibration control circuitry is configured to determine a difference between the measured first current in the first signal path and the measured first current in the second signal path, and generate a third digital control signal based on the determined difference between the measured first current in the first signal path and the measured first current in the second signal path; and
in response to at least one of the first digital control signal, the second digital control signal, and the third digital control signal, the actuator circuitry generates the currents that are injected into the first signal path and the second signal path to at least one of:
compensate for the determined difference between the measured first current and the measured second current in the first signal path and thereby adjust the offset of the first differential signal;
compensate for the determined difference between the measured first current and the measured second current in the second signal path and thereby adjust the offset of the second differential signal; and
compensate for the determined difference between the measured first current in the first signal path and the measured first current in the second signal path and thereby adjust and balance the amplitudes of the first differential signal and the second differential signal.

16. The system of claim 11, further comprising:
first sensor circuitry comprising low pass filter circuitry, which is configured to measure the duty cycle of the first local oscillator signal and to measure the duty cycle of the second local oscillator signal and generate first sensor signals which comprise direct current voltages that are proportional to the respective measured duty cycles of the first local oscillator signal and the second local oscillator signal; and
second sensor circuitry configured to measure the phase difference between the first local oscillator signal and the second local oscillator signal and generate a second sensor signal which comprises a direct current voltage that is proportional to the measured phase difference;
wherein the calibration control circuitry is configured to process the first sensor signals and the second sensor signal and generate one or more digital control signals to cause the actuator circuitry to at least one of: adjust the duty cycles of the first local oscillator signal and the second local oscillator signal; and adjust the phase difference between the first local oscillator signal and the second local oscillator signal.

17. The system of claim 11, further comprising:
local oscillator signal generator circuitry comprising clock receiver circuitry and divider circuitry, wherein the clock receiver circuitry is configured to receive and buffer a differential clock signal comprising a non-inverted clock signal and an inverted clock signal, and to drive an input of the divider circuitry, wherein the divider circuitry is configured to receive the differential clock signal output from the clock receiver circuitry and convert the differential clock signal into quadrature local oscillator signals comprising the first local oscillator signal and the second local oscillator signal, wherein the clock receiver circuitry comprises a plurality of digitally controllable current actuator circuits which are configured to inject current into a first clock signal path to adjust a duty cycle of the non-inverted clock signal, and to inject current into a second clock signal path to adjust a duty cycle of the inverted clock signal; and
a first sensor comprising low pass filter circuitry which is coupled to outputs of the clock receiver circuitry and configured to measure the duty cycles of the differential clock signals and generate first sensor signals which comprise direct current voltages that are proportional to the respective measured duty cycles of the differential clock signals;
wherein the calibration control circuitry is configured to process the first sensor signals and generate digital control signals to cause the plurality of digitally controllable current actuator circuits of the clock receiver circuitry to inject currents into the first clock signal path and the second clock signal path, as needed, to adjust the duty cycles of the differential clock signals.

18. A method, comprising:
performing a calibration process to calibrate a radio frequency signal generator which is configured to upconvert a baseband signal to a radio frequency signal using a first local oscillator signal and a second local oscillator signal, the radio frequency signal generator comprising a first signal path to process a first differential signal, and a second signal path to process a second differential signal;
wherein performing the calibration process comprises:
measuring a first current and a second current in the first signal path to determine an offset of the first differential signal based on a difference between the measured first current and the measured second current in the first signal path;
measuring a first current and a second current in the second signal path to determine an offset of the second differential signal based on a difference between the measured first current and the measured second current in the second signal path;
determining a difference between an amplitude of the first differential signal and an amplitude of the second differential signal based on a difference between the measured first current in the first signal path and the measured first current in the second signal path; and
injecting currents into the first signal path and into the second signal path to at least one of: adjust the offset of the first differential signal; adjust the offset of the second differential signal; and balance the amplitudes of the first differential signal and the second differential signal.

19. The method of claim 18, wherein performing the calibration process further comprises:

receiving and buffering a differential clock signal comprising a non-inverted clock signal and an inverted clock signal, wherein the differential clock signal is utilized to generate quadrature local oscillator signals comprising the first local oscillator signal and the second local oscillator signal;

determining a duty cycle of the non-inverted clock signal and a duty cycle of the inverted clock signal;

injecting current into a first clock signal path to adjust the duty cycle of the non-inverted clock signal; and injecting current into a second clock signal path to adjust a duty cycle of the inverted clock signal.

20. The method of claim 19, wherein performing the calibration process further comprises:

measuring a phase difference between the first local oscillator signal and the second local oscillator signal to determine a phase error; and correcting the phase error by at least one of:

injecting current into at least one of the first clock signal path and the second clock signal path to adjust the duty cycle of at least one of the non-inverted clock signal and the inverted clock signal of the differential clock signal; and adjusting a drive strength of buffer circuitry, which drives local oscillator signal inputs of a mixer stage with the first local oscillator signal and the second local oscillator signal, to adjust a phase delay of at least one of the first local oscillator signal and the second local oscillator signal and thereby adjust a phase difference between the first local oscillator signal and the second local oscillator signal to correct the phase error.

* * * * *